(12) United States Patent
Anvari

(10) Patent No.: US 11,386,775 B1
(45) Date of Patent: Jul. 12, 2022

(54) STRUCTURE OF AN OBJECT CONTROL SYSTEM (OCS) FOR NAVIGATION OF MOVING OBJECTS

(71) Applicant: Kiomars Anvari, Walnut Creek, CA (US)

(72) Inventor: Kiomars Anvari, Walnut Creek, CA (US)

(73) Assignee: Kiomars Anvari, Walnut Creek, CA (US)

( * ) Notice: Subject to any disclaimer, the term of this patent is extended or adjusted under 35 U.S.C. 154(b) by 0 days.

(21) Appl. No.: 17/542,457

(22) Filed: Dec. 5, 2021

Related U.S. Application Data

(63) Continuation-in-part of application No. 17/516,841, filed on Nov. 2, 2021, and a continuation-in-part of application No. 17/398,771, filed on Aug. 10, 2021, now Pat. No. 11,250,696, and a continuation-in-part of application No. 17/367,406, filed on Jul. 4, 2021, now Pat. No. 11,249,195.

(51) Int. Cl.
| | |
|---|---|
| *G08G 1/01* | (2006.01) |
| *H04L 67/125* | (2022.01) |
| *H04W 4/40* | (2018.01) |
| *H04W 4/44* | (2018.01) |

(52) U.S. Cl.
CPC ......... *G08G 1/0116* (2013.01); *G08G 1/0133* (2013.01); *G08G 1/0141* (2013.01); *H04L 67/125* (2013.01); *H04W 4/40* (2018.02); *H04W 4/44* (2018.02)

(58) Field of Classification Search
CPC .. G08G 1/0116; G08G 1/0133; G08G 1/0141; H04L 67/125; H04W 4/40; H04W 4/44
USPC .......................................................... 701/522
See application file for complete search history.

(56) References Cited

U.S. PATENT DOCUMENTS

| | | | |
|---|---|---|---|
| 2017/0012947 A1* | 1/2017 | Lee ....................... | H04W 76/10 |
| 2017/0280279 A1* | 9/2017 | Ghosh ................... | H04W 4/02 |
| 2018/0084517 A1* | 3/2018 | Do ........................ | H04W 4/029 |
| 2019/0042867 A1* | 2/2019 | Chen ..................... | G06V 10/20 |
| 2019/0045515 A1* | 2/2019 | Kwasnick ............. | H04W 12/12 |
| 2019/0052995 A1* | 2/2019 | Agrawal ............... | H04B 17/30 |

FOREIGN PATENT DOCUMENTS

CN 111669703 * 9/2020

* cited by examiner

*Primary Examiner* — Muhammad Shafi

(57) ABSTRACT

This application discloses the structure of an object control system (OCS) for navigation of moving objects. The structure consists of cells that have circular, square, or hexagonal shape. The cells are identical with the same square meter (feet) area or in certain areas accommodate smaller cells within them. All cells have an operation frame with the same duration and a time of day for the start of first frame. All objects within a cell function as an IoT device and use a time slot within the operation frame to broadcast a time stamp, the operation frame structure and object's location coordinates.

10 Claims, 24 Drawing Sheets

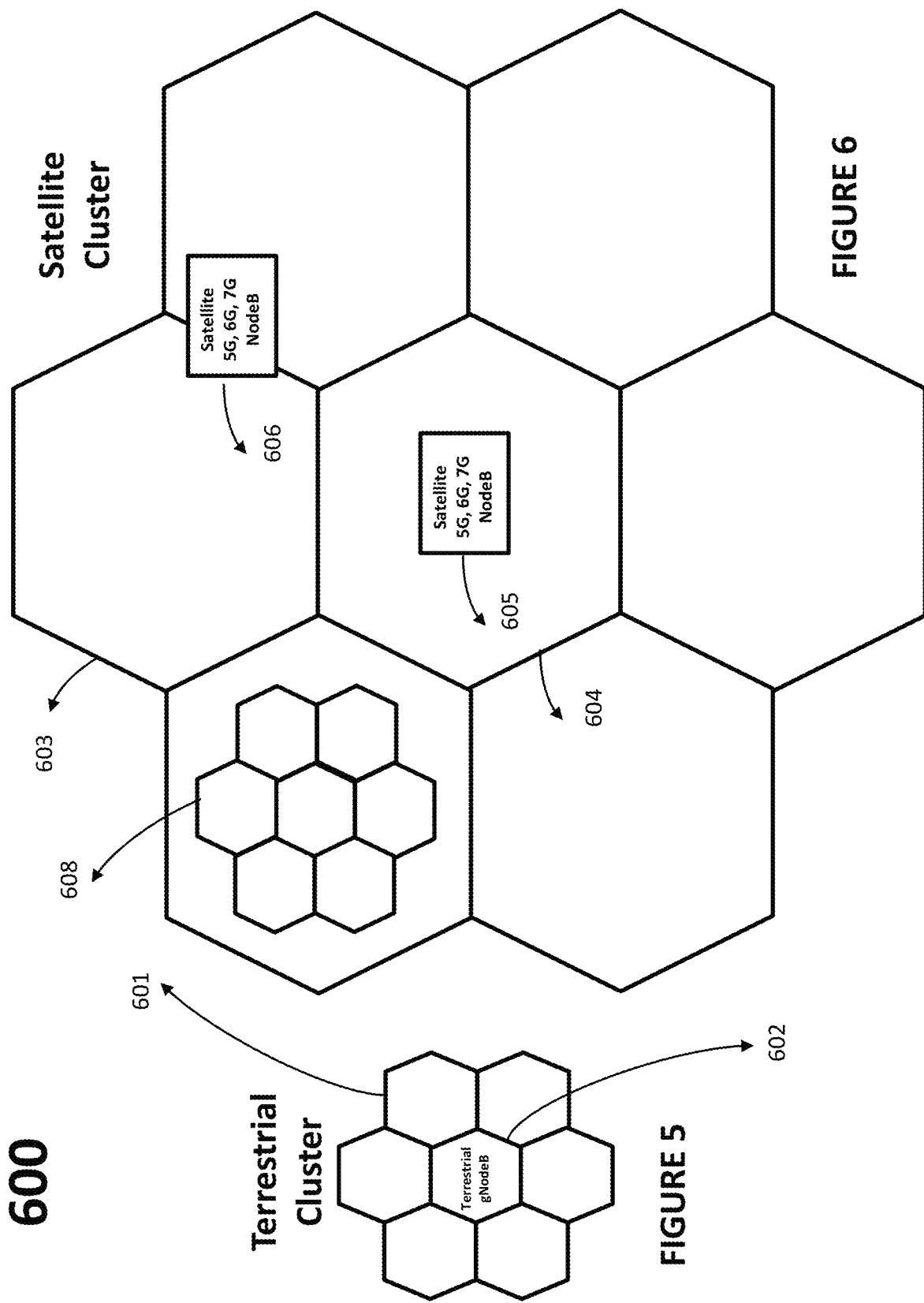

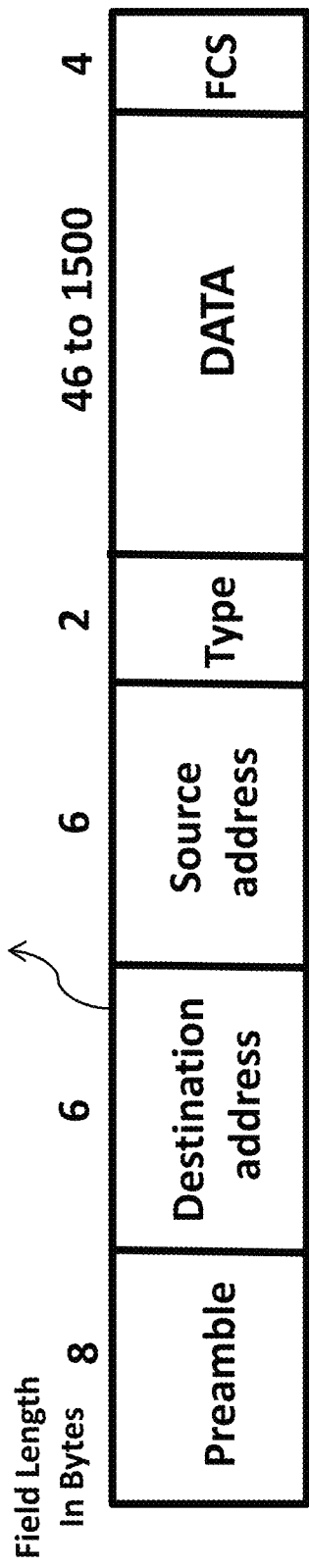
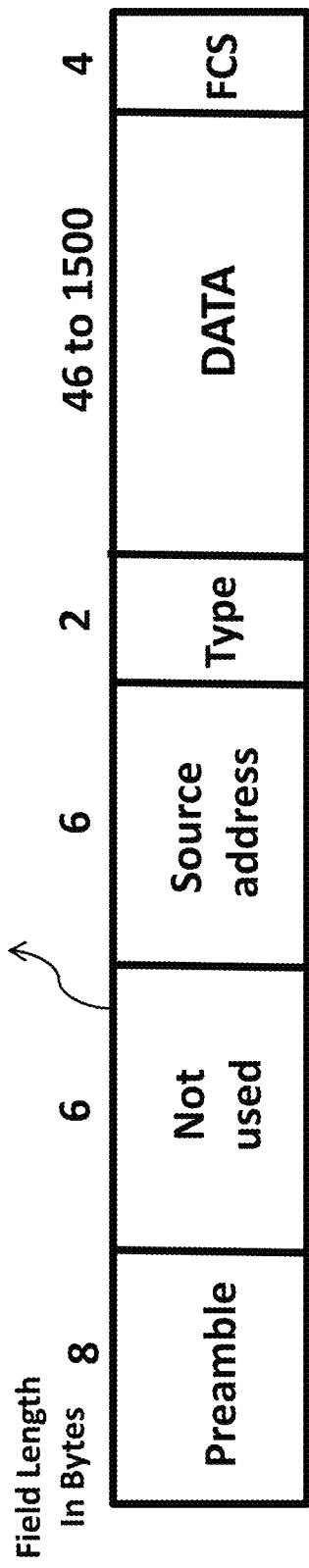
Figure 10A

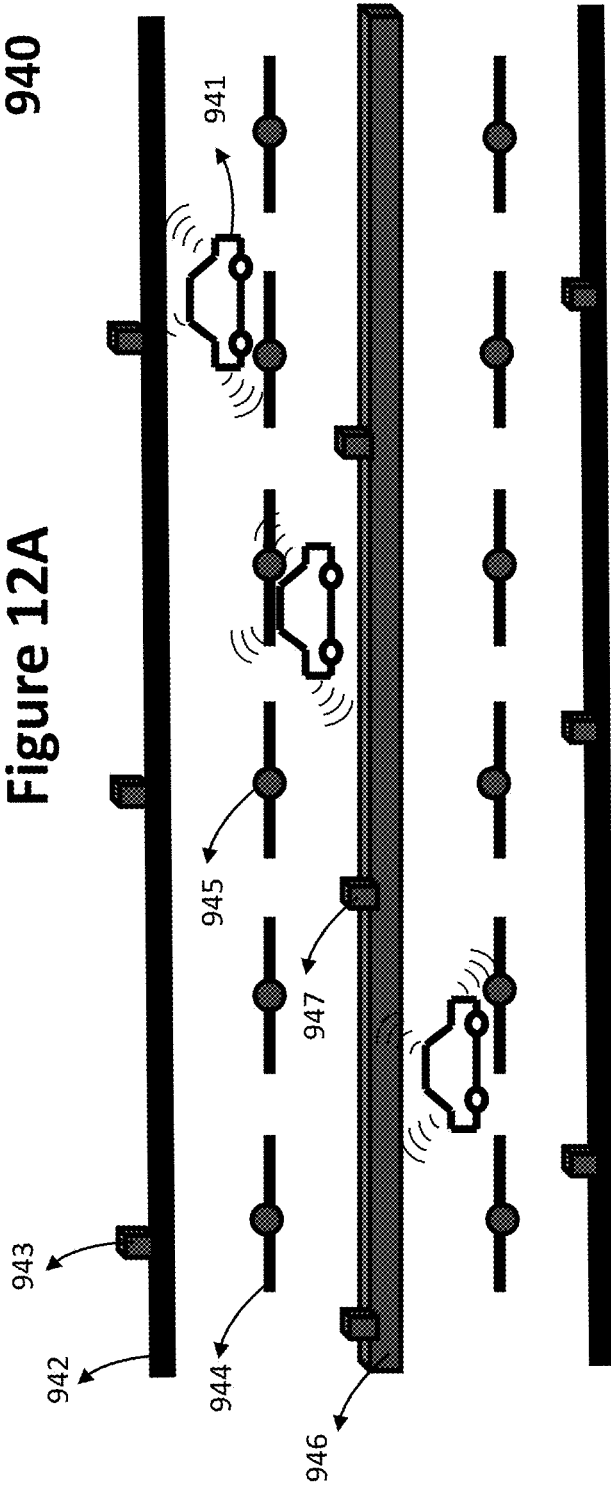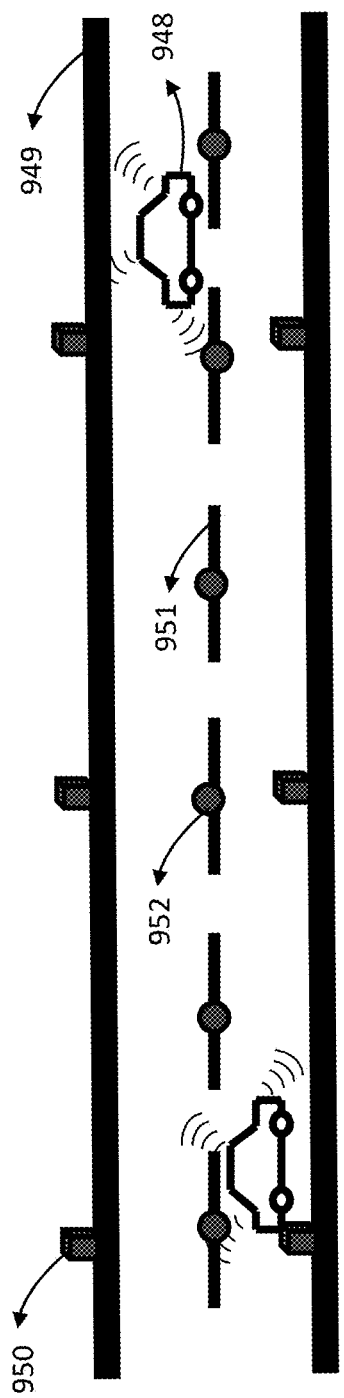

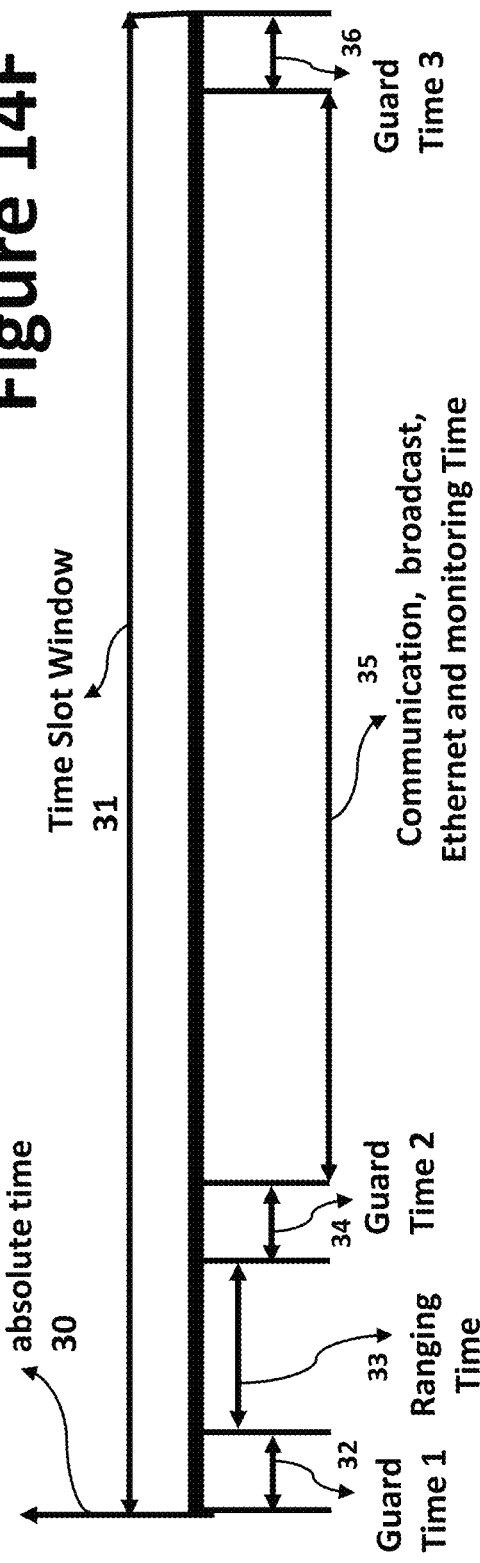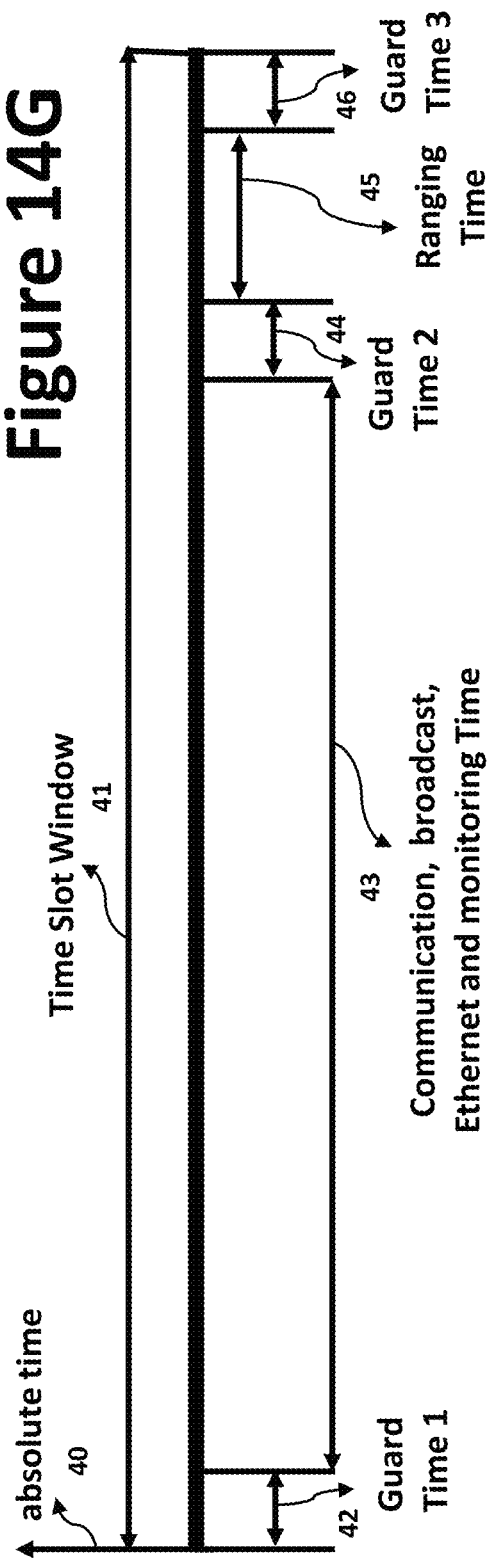

STRUCTURE OF AN OBJECT CONTROL SYSTEM (OCS) FOR NAVIGATION OF MOVING OBJECTS

The application claims priority to the following related applications and included here are as a reference.
Application: U.S. patent application Ser. No. 17/516,841 filed Nov. 2, 2021.
Application: U.S. patent application Ser. No. 17/398,771 filed Aug. 10, 2021.
Application: U.S. patent application Ser. No. 17/145,151 filed Jan. 8, 2021.
Application: U.S. patent application Ser. No. 17/106,137 filed Nov. 29, 2020.
Application: U.S. patent application Ser. No. 17/367,406 filed Jul. 4, 2021.
Application: U.S. patent application Ser. No. 17/187,691 filed Feb. 26, 2021.
Application: U.S. patent application Ser. No. 17/246,682 filed May 2, 2021.
Application: U.S. patent application Ser. No. 16/984,995 filed Aug. 4, 2020.
Application: U.S. patent application Ser. No. 16/743,354 filed Jan. 15, 2020.
Application: U.S. patent application Ser. No. 16/386,124 filed Apr. 16, 2019.
Application: U.S. patent application Ser. No. 15/888,175 filed Feb. 5, 2018.
Application: U.S. patent application Ser. No. 15/193,373 filed Jun. 27, 2016

BACKGROUND

Developing intelligent systems which take into consideration the economical, environmental, and safety factors of the modern society, is one of the main challenges of this century. Progress in the fields of mobile robots, control architectures, artificial intelligence, advanced technologies, and computer vision allows us to now envisage a smart environment future.

It is safe to say that we are at the start of another industrial revolution. The rise of the connected objects known as the "Internet of Things" (IoT) will rival past technological marvels, such as the printing press, the steam engine, and electricity. From the developed world to developing world, every corner of the planet will experience profound economic resurgence. Even more remarkable is the speed with which this change will happen. A decade ago, there were about one billion devices connected to internet. Today, there are close to 20 billion. In five years, it could be close to 50 billion.

The rise of IoT also means we are at the start of a new age of data. Two chief components of an "IoT object" are its ability to capture data via sensors and transmit data via the Internet. The declining cost of sensors since the start of the new millennium has been a main driver in the rise of IoT. In short, sensors are dirt cheap today. This has profound implications on the ability to capture data.

The Internet of Things (IoT) describes a worldwide network of intercommunicating devices. Internet of Things (IoT) has reached many different players and gained further recognition. Out of the potential Internet of Things application areas, Smart Cities (and regions), Smart Car and mobility, Smart Home and assisted living, Smart Industries, Public safety, Energy & environmental protection, Agriculture and Tourism as part of a future IoT Ecosystem have acquired high attention.

The Internet of Everything (IoE) is a concept that aims to look at the bigger picture in which the Internet of Things fits. Yet, when you look deeper at IoE, you'll notice it really is also about the vision of a distributed network with a growing focus on the edge in times of ongoing decentralization, some digital transformation enablers and a focus on IoT business outcomes.

While the Internet of Things today mainly is approached from the perspective of connected devices, their sensing capabilities, communication possibilities and, in the end, the device-generated data which are analyzed and leveraged to steer processes and power numerous potential IoT use cases, the Internet of Everything concept wants to offer a broader view.

The IoT based smart environments represent the next evolutionary development step in industries such as construction, manufacturing, transportation systems and even in sporting goods equipment. Like any functioning organism, the smart environment relies first and foremost on IoT sensor data from the real world. Sensory data comes from multiple sensors of different modalities in distributed locations. The smart environment needs information about all its surroundings as well as about its internal workings.

The challenge is determining the prioritized hierarchy of: (1) detecting the relevant quantities, (2) monitoring and collecting the data, (3) assessing and evaluating the information, and (4) performing decision-making actions. The information needed by smart environments is provided by Distributed Sensor Systems, which are responsible for sensing as well as for the first stages of the processing hierarchy.

New types of applications can involve the electric vehicle and the smart house, in which appliances and services that provide notifications, security, energy-saving, automation, telecommunication, computers and entertainment are integrated into a single ecosystem with a shared user interface. Obviously, not everything will be in place straight away. Developing the technology, demonstrating, testing, and deploying products, it will be much nearer to implementing smart environments by 2020. In the future computation, storage and communication services will be highly pervasive and distributed: people, smart objects, machines, platforms, and the surrounding space (e.g., with wireless/wired sensors, M2M devices, etc.). The "communication language" will be based on interoperable protocols, operating in heterogeneous environments and platforms. IoT in this context is a generic term and all objects can play an active role thanks to their connection to the Internet by creating smart environments, where the role of the Internet has changed.

$5^{th}$ generation low earth satellite wireless systems are on the horizon and IoT is taking the center stage as devices are expected to form a major portion of this 5G network paradigm. IoT technologies such as machine to machine communication complemented with intelligent data analytics are expected to drastically change landscape of various industries. The emergence of cloud computing and its extension to fog paradigm with proliferation of intelligent 'smart' devices is expected to lead further innovation in IoT.

The existing 5G (fifth generation wireless) networks have been widely used in the Internet of Things (IoT) and are continuously evolving to match the needs of the future Internet of Things (IoT) applications. The 5G (fifth generation) networks are expected to massive expand today's IoT that can boost cellular operations, IoT security, and network challenges and driving the Internet future to the edge. The existing IoT solutions are facing a number of challenges such as large number of connection of nodes, security, and new standards.

The drive to minimize human interaction in transportation vehicles is stronger than ever, especially in public transportation, automobiles, etc. For instant, just a few years ago, automobiles seldom had very sophisticated safety systems. Now, it is rare to find an automobile without various safety and protection systems. And now new technology is evolving to the point of being able to offer preventive methods to better manage and dissipate sudden impact energy to the vehicle.

Today internet of things is a new revolution of the internet. A world where the real, digital and the virtual are converging to create smart environments that make energy, transport, cities, and many other areas more intelligent. Different types of application like water monitoring, water pollution, air pollution, forest fire detection, smart homes, smart cities where each thing can connect from anywhere to anyplace to make our life easier.

To understand what the constituents of IoE are we will need to dive into the core parts of IoE. IoE is an umbrella term combining the following 4 properties in one place:

1. People:

People are the humans using connected devices to deliver insights about their personal and professional self. This data can include interests, preferences, work, personal health, etc. Connecting this data to enterprise needs can provide insights relating the needs and desires of prospects for businesses. Additionally, this can be used to track performance and pain points of human resources.

2. Process:

The process is the way to ensure deliverability of right data at the right time to the right person or machine. Here data is more about insightful information or an action than just random chunk. Figuring out a way to decipher the right flow of information is a key to making the best use of big data.

3. Data:

With the increase in sources and types of data, we will also need to classify the information and analyze it to bring useful insights. Data alone is nothing but once combined with analytics and analysis this new data can help businesses in decision making and managing the organization.

4. Things:

This is where we come across the term Internet of Things (IoT). Internet of things is the interconnectivity of devices that send and receive information across networks like the internet. With every signal injected into the network, data is generated which needs to be collected, summarized, and analyzed efficiently.

This application discloses the structure of an object control system (OCS) for navigation of moving objects. The structure consists of cells that have circular, square, or hexagonal shape. The cells are identical with the same square meter (feet) area or in certain areas accommodate smaller cells within them. All cells have an operation frame with the same duration and a time of day for the start of first frame. All objects within a cell function as an IoT device and use a time slot within the operation frame to broadcast a time stamp, the operation frame structure and object's location coordinates.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

In one aspect, an IoT network uses distributed IoT devices which are sensor/monitoring devices to monitor its surrounding environment and detect and collect data to be processed by the IoT network or a navigation and protection system (NPS).

In another aspect, an object is a flying object, a moving object, and a stationary object, a robot, an equipment, and a tool.

In one aspect, an object control system (OCS) that includes IoT network, IoT devices, virtualized shared database (SD), virtualized shared operation management center (SOMC), and a navigation and protection system that resides in an object controls the movement of objects in a smart environment.

In one aspect, the NPS is used by various moving objects, flying vehicles/objects and stationary objects to protect them from any collision.

In one aspect, an IoT device uses Ethernet protocol or Internet protocol for over the air link between IoT network and IoT device.

In another aspect, the IoT device uses IEEE1588 (institute of electrical and electronic engineering 1588) precision time protocol (PTP) to obtain time of day from the IoT network (4G, 5G, 6G, 7G, WiFi wireless fidelity, and another IoT device), or GPS (Global Positioning System) receiver.

In one aspect, an IoT device uses proprietary protocol to obtain time of day from another IoT device.

In another aspect, IoT devices are side road studs, center barrier studs, and lane line studs that assist the NPS of moving vehicle and have a master stud IoT device that communicates with IoT network and receives GPS signal.

In another aspect, in mountainous terrains, master stud IoT devices communicate with IoT network through a grandmaster IoT device at the top of mountains that has access to IoT network and receives GPS signal.

In another aspect, in mountainous terrains, master stud IoT devices communicate with IoT network through a relay at the top of the mountains that has access to IoT network.

In one aspect, IoT network is any fix and mobile wireless data communication network ($5^{th}$ generation (5G), $6^{th}$ generation (6G), beyond 5G such as $6^{th}$ generation (6G), $7^{th}$ generation (7G), proprietary, WiFi, etc.).

In another aspect, IoT is part of a satellite network supporting one of data communication standards like 5G, 6G, 7G, WiFi or a proprietary data communication standard.

In one aspect, SOMC uses the time of day to assign a registered IoT device with IoT network an absolute time and or a time slot to perform its activities.

In one aspect, the absolute time assigned by SOMC to various IoT devices is constant or dynamically changes depending on the time of day or load on the IoT network.

In one aspect, the absolute time assigned by SOMC is start of a time window (time slot) assigned to an IoT device to communicate and exchange information data to the IoT network and other IoT devices.

In another aspect, SOMC shares the absolute times assigned to IoT devices with all IoT devices registered with IoT network.

In one aspect, SOMC shares all absolute times with all registered IoT devices without identifying which absolute time is assigned and which IoT device it is assigned to.

In another aspect, SOMC assigns an absolute time and a time window (time slot) for broadcasting and communication to each IoT device registered with the IoT network.

In one aspect, the time window or time slot assigned to each IoT device by SOMC is constant and identical for all registered IoT devices with IoT network, different for each IoT device, dynamically changes by SOMC, or requested by IoT device.

In another aspect, the SOMC uses the time of day to program the IoT devices an active time to collect data (or do other functions) and a sleep time or idle time to save power.

In one another, SOMC shares an operation frame with IoT devices through IoT network that includes a duration, a guard time, and time slots.

In one aspect, the operation frame has a frame time of day (TOD) that indicates a start of a first frame.

In another aspect, the operation frame repeats after the end of the first frame.

In one aspect, IoT device uses the frame duration and the absolute TOD to calculate the absolute TOD for a next time slot.

In another aspect, the operation frame is at least one of a terrestrial frame, and a satellite frame which can be independent.

In one aspect, a subset of the time slots in the operation frame is used for the satellite frame and a different subset of said time slots in the operation frame is used for terrestrial frame.

In another aspect, the satellite frame is used by an IoT network supporting at least one of a low orbit satellite Radio Unit (RU), a flying balloon RU, and a high elevation stationary RU.

In one aspect, the terrestrial frame is used by an IoT network supporting at least one of a small cell RU, a picocell RU, a microcell RU, and a macro-cell RU.

In another aspect, the absolute time includes the hour, the minutes, the seconds, the milliseconds, the microseconds, and the nanoseconds.

In one aspect, the broadcast data is transmitted or received by an IoT device at an absolute time and during a time slot defined by SOMC.

In another aspect, the IoT devices exchange Ethernet packets.

In another aspect, IoT devices support at least one of a Bluetooth transceiver, a ZIGBEE transceiver, a WiFI transceiver, and an Infrared transceiver.

In one aspect, the IoT devices use a 5G, 6G, 7G over the air protocols to communicate among themselves.

In one aspect, a specific frequency band and channel is assigned to the IoT devices to communicate among each other or perform other functions.

In another aspect, an IoT device is in general any equipment, object, tool, and device in an environment.

In one aspect, an IoT device uses its wireless transceiver to broadcast its type, identity code, location coordinates, mass, the time of day, function, status (for traffic light, green, yellow, red, and the time left for the color to change), specification (includes dimension), and operation information data.

In another aspect, IoT device is a wireless sensor, a Radar, a Lidar, an image sensor (camera), and an ultrasonic sensor to perform ranging to measure a distance from an object in smart environment.

In one aspect, NPS create a signature from fixed and variable data received from IoT network, GPS, master IoT device, and slave IoT devices that is used to detect if a received information data is a cyber-attack.

In another aspect, cyber-attack is done by an attacker that imitates an IoT network, GPS, or a slave (master) IoT device belonging to an object in surrounding environment of an object's NPS which is under attack.

In one aspect, WiFi, 5G, 6G, 7G, beyond 5G, and a proprietary wireless network use a Ratio Unit (RU) that is a low earth orbit satellite, or a flying balloon and both are mobile.

BRIEF DESCRIPTION OF THE DRAWINGS

FIG. 5 illustrates a terrestrial cluster.

FIG. 6 illustrates a satellite cluster.

FIG. 10A depicts an Ethernet frame and a broadcast frame.

FIG. 12A illustrates a typical road with center barrier.

FIG. 12B illustrates a typical road with no center barrier.

FIG. 14F depicts a first structure of a time slot used for ranging.

FIG. 14G depicts a second structure of a time slot used for ranging.

DESCRIPTION OF EMBODIMENTS

The drawings referred to in this description should be understood as not being drawn to scale except if specifically noted.

Reference will now be made in detail to embodiments of the present technology, examples of which are illustrated in the accompanying drawings. While the technology will be described in conjunction with various embodiment(s), it will be understood that they are not intended to limit the present technology to these embodiments. On the contrary, the present technology is intended to cover alternatives, modifications, and equivalents, which may be included within the spirit and scope of the various embodiments as defined by the appended claims.

Furthermore, in the following description of embodiments, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the present embodiments.

Figure 1:
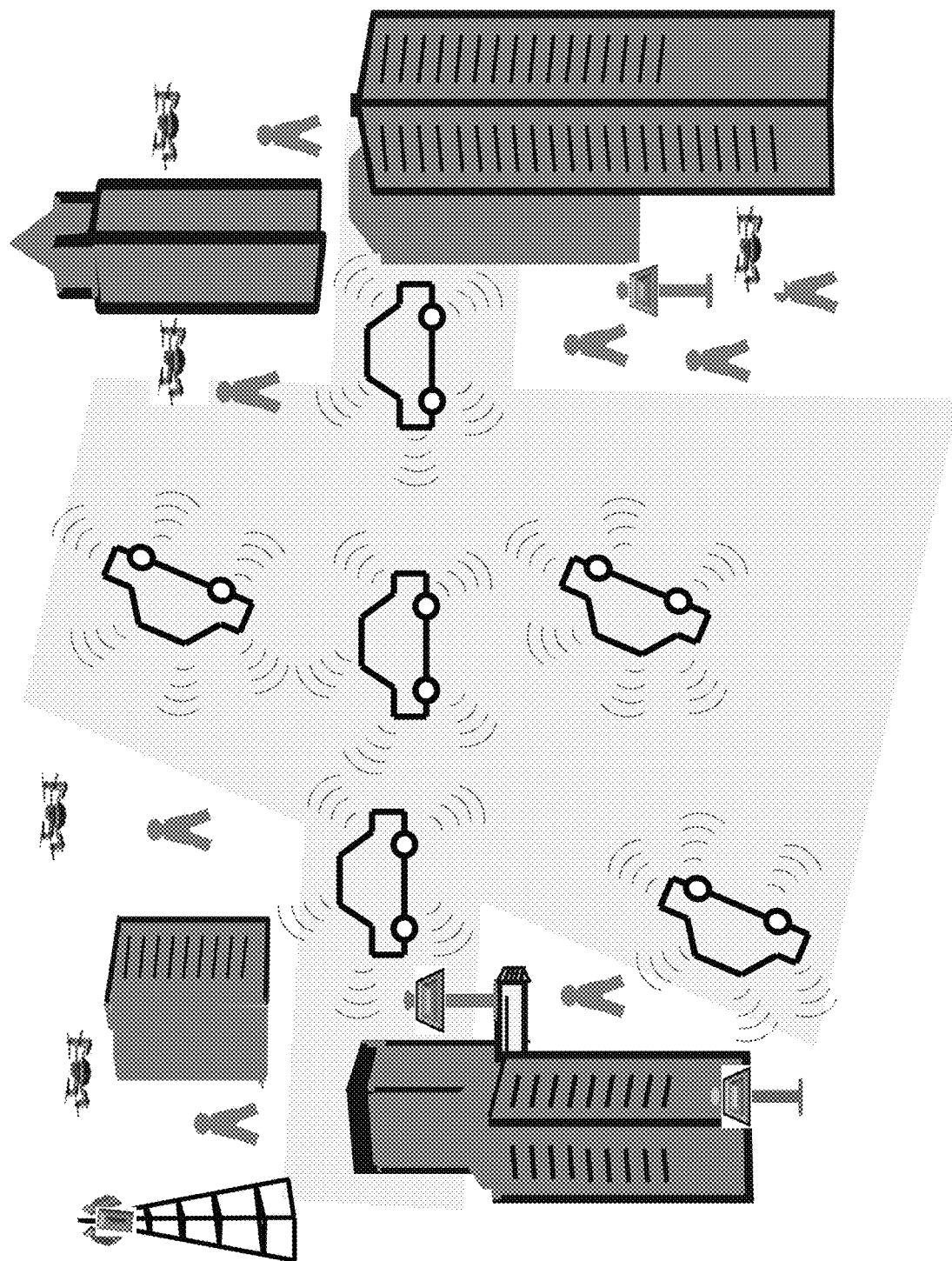
FIG. 1 illustrates a typical surrounding environment scenario for moving, flying vehicles/objects and stationary objects as IoT devices.

FIG. 1 illustrates a typical environment with moving, stationary, and fixed objects. The stationary objects are trees, lamp posts, small cells, buildings, street floors, walking payments, parked vehicles, statues, houses, hospitals, gas stations, schools, sport fields, shopping malls, small shops, department stores, parking lots, and any other stationary objects. Stationary objects are identified by their types, an IP address, shapes, masses, status (for traffic light green, yellow, or red), function, specification (includes dimension), and location coordinates. Stationary objects act as an IoT device or IoT devices with a single IP address or independent IP addresses. Large building at different sides requires different IoT devices representing different locations and sides. The IoT devices used by stationary objects are fixed object that communicate with either IoT network or other IoT devices in their surrounding environment.

The moving vehicles are robots, humans with body armor, humans, animals, automobiles, trucks, boats, ships, bicycles, motorcycles, moving objects in a factory, moving objects in a hospital, moving objects used in buildings, and any other moving objects.

The flying vehicles are helicopters, small planes, large planes, flying humans, flying robots, gliders, flying cars, drones, missiles, birds, and any other flying objects.

Figure 2:
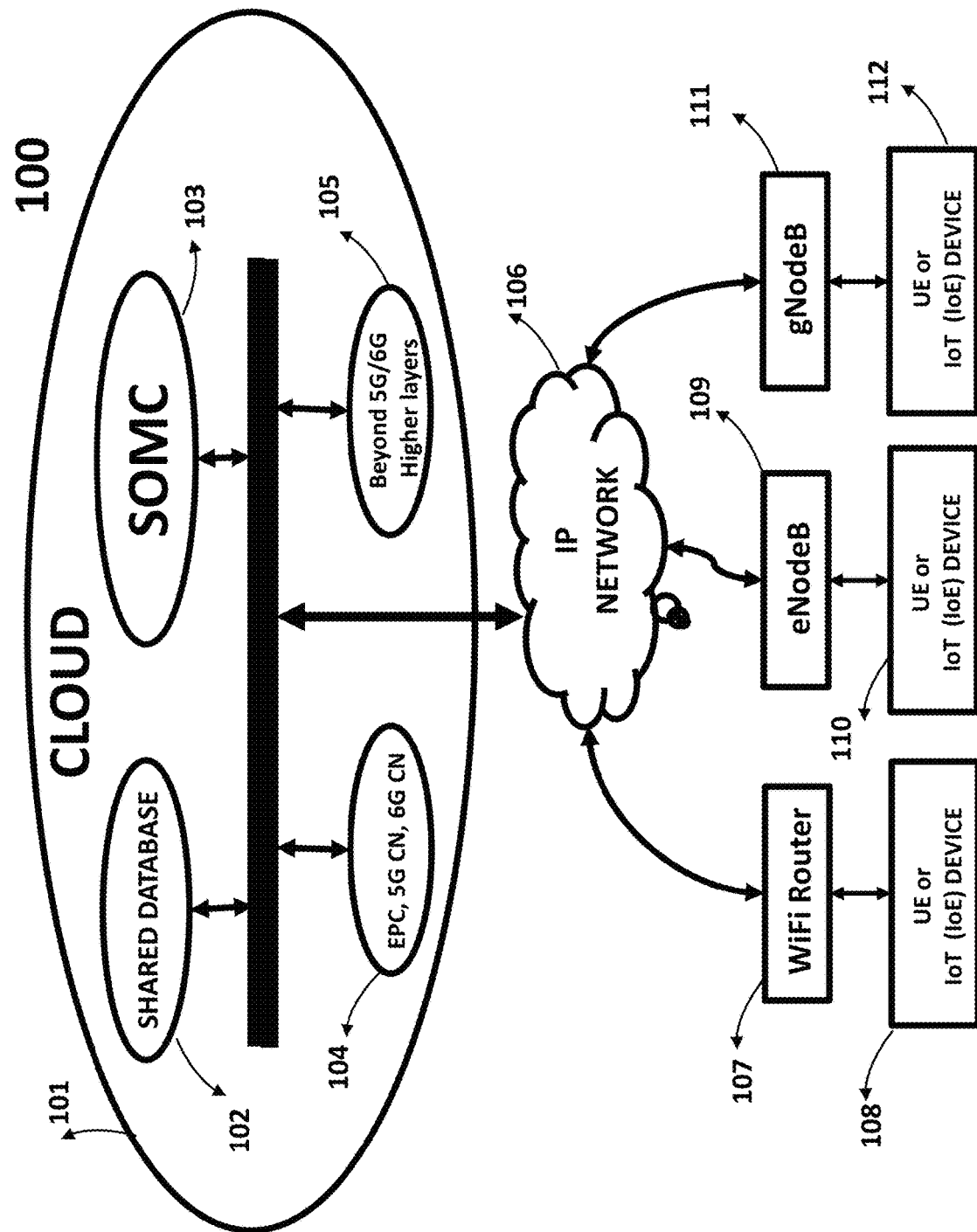
FIG. 2 illustrates an end-to-end cloud IoT (IoE) Network with control system.

FIG. 2 depicts wireless 4G, 5G, 6G (beyond 5G and 6G) and WiFi (wireless fidelity) end to end IoT networks 100 used by an object's navigation and protection system (NPS). 4G network facilitates communication between user equipment (UE) or IoT device 110 and evolved packet core (EPC) 104 through evolved node B (eNodeB) 109 and IP (Internet protocol) network 106. 5G and 6G networks facilitate communication between user equipment (UE) or IoT device 112 and core network (CN) 104 as well as beyond 5G/6G higher layers 105 through next generation Node B (gNodeB) 111 (or new NodeB) and IP network 106. WiFi network facilitates communication between user equipment (UE) or IoT device 108 and the cloud 101 through WiFi router 107, and IP network 106. Cloud 101 accommodates EPC/CN 104 and higher layers of beyond 5G/6G 105 as well as shared database (SD) 102 and shared operation management center (SOMC) 103 and allows UEs or IoT devices 108, 110 and 112 have access to shared database 102 and SOMC 103. SD and SOMC are used by all 5G (beyond 5G), 6G (beyond 6G), 7G, and WiFi networks that belong to various service providers. SD stores all information data related to IoT devices that directly communicate (master IoTs) with IoT network. SOMC controls and manages the objects that use an IoT device (master IoT device).

In wireless 4G, 5G, 6G, (beyond 5G/6G), 7G, and WiFi networks there is a need for synchronization. There are several synchronization techniques used in data communication networks and the most common one depending on requirements of network components or ports are syncE, Institute of Electrical and Electronic Engineering IEEE1588 Precision Time Protocol PTP, NTP, and GPS. The Network Time Protocol (NTP) is a networking protocol for clock synchronization between computer systems over packet-switched, variable-latency data networks. In operation since before 1985, NTP is one of the oldest Internet protocols in current use. Synchronous Ethernet, also referred to as SyncE, is an ITU-T standard for computer networking that facilitates the transference of clock signals over the Ethernet physical layer. This signal can then be made traceable to an external clock. IEEE 1588 Precision Time Protocol (PTP) is a packet-based two-way communications protocol specifically designed to precisely synchronize distributed clocks to sub-microsecond resolution, typically on an Ethernet or IP-based network. Global Satellite Positioning System (GPS) signal is received, processed by a local master clock, time server, or primary reference, and passed on to "slaves" and other devices, systems, or networks so their "local clocks" are likewise synchronized to coordinated universal time (UTC).

In wireless 4G, 5G, 6G, (beyond 5G/6G), 7G, and WiFi network 100 when the link between two network component ports is Ethernet then there is a need to synchronize the two network components using SyncE, IEEE1588 (PTP) or NTP depending on requirements and specification of two network components.

Mobile user equipments (UE) or IoT devices 108, 110, and 112 may use GPS to obtain time of day (TOD), location coordinate and over the air protocol to achieve frequency and phase synchronization. However, for UEs or IoT devices that either cannot see the GPS satellites, GPS signal is very weak, or GPS receiver increases cost, size, and power consumption another technique to acquire time of day is required. UEs and IoT devices can use their received wireless 4G, 5G, 6G, (beyond 5G/6G), 7G, and WiFi signal to achieve frequency and phase synchronization. UEs and IoT devices that do not have access to GPS signal can either obtain time of day from UEs and IoT devices in surrounding environment that have access to GPS signal and are accessible or obtain it from eNodeB, gNodeB and WiFi router that they communicate with.

There are three techniques that UEs and IoT devices can use to obtain time of day from eNodeB, gNodeB and WiFi router. The precision of time of day will be different using these three techniques. Time of day with different accuracies is used for different applications. The less accurate (within fraction of microsecond, approximately 200 nanosecond or less) time of day uses one way communication between eNodeB, gNodeB and WiFi router and UEs or IoT devices 108, 110, and 112. The more accurate (within 100 nanosecond) time of day uses two-way communications between eNodeB, gNodeB and WiFi router and UEs or IoT devices 108, 110, and 112. In all methods eNodeB, gNodeB and WiFi router should have time of day. When eNodeB, gNodeB and WiFi router do not have time of day or cannot support exchange of time of day with UEs and IoT devices then the network component prior to eNodeB, gNodeB and WiFi router can be used to propagate time of day to UEs and IoT devices 108, 110, and 112 with less accuracy. Both eNodeB, and gNodeB from 4G, 5G, 6G, and 7G network that support Remote Radio Unit, Radio Unit can be terrestrial RRU/RU or low earth orbit satellite RRU/RU.

In one embodiment, 4G, 5G, 6G, (beyond 5G/6G), 7G, and WiFi network 100 provide time of day to UEs and IoT devices, using institute of electrical and electronic engineering (IEEE1588) precision time protocol (PTP). IEEE1588 PTP exchanges the timing messages to and from UEs or IoT devices 108, 110, and 112 and one component of 4G, 5G, 6G, (beyond 5G/6G), 7G, and WiFi wireless networks 100.

The 4G, 5G, 6G, (beyond 5G/6G), 7G, and WiFi wireless networks 100 sends time of day to UEs and IoT devices 108, 110, and 112 by cyclic prefix of OFDM (orthogonal frequency division multiplexing) symbols from eNodeB, gNodeB and WiFi router where IFFT (inverse fast Fourier Transform) is performed. In another technique the 4G, 5G, 6G, (beyond 5G/6G), 7G, and WiFi network 100 utilizes unused downlink sub-carriers or unused bits or messages in various downlink channels to send time of day to UEs or IoT devices 108, 110, and 112. All components of 4G, 5G, 6G, (beyond 5G/6G), 7G, and WiFi network 100 are time synchronized and have the same time of day. The 4G, 5G, 6G, (beyond 5G/6G), and 7G networks may transmit Ethernet packets over the air to UEs or IoT devices 108, 110, and 112 to have an end-to-end network using a single packet protocol. By doing this both hardware and software is significantly simplified.

Some UEs and IoT devices 108, 110, and 112 obtain time of day from other UEs or IoT devices in surrounding environment that are in their communication range and have time of day. They use another frequency to communicate with other UEs and IoT devices in surrounding environment and exchange broadcast and Ethernet packets. The UEs and IoT devices 108, 110, and 112 may communicate with other UEs and IoT devices by exchanging Ethernet packets or any other proprietary packets.

The UEs and IoT devices 108, 110, and 112 may use similar physical layer as 4G, 5G, 6G, (beyond 5G/6G), 7G, or WiFi to communicate with or broadcast their information data to other UEs and IoT devices in their surrounding environment without introducing any unwanted interference. They also may use a physical layer different from 4G, 5G, 6G, (beyond 5G/6G), 7G, and WiFi to communicate with or broadcast their information data to other UEs and IoT devices in their surrounding environment without introducing any unwanted interference.

The UEs and IoT devices 108, 110, and 112 may support Bluetooth, Zigbee, infrared, WiFi, and any other wireless communication systems to communicate with other UEs and IoT devices in their surrounding environment and exchange information data and transmit and receive broadcast data. The communication between UEs and IoTs devices is encrypted and highly secured.

The UEs and IoT devices transmit and receive broadcast data that includes the type of UE and IoT device, their IP address, their location coordinate, their mass, time of day, method of obtaining time of day (IEEE1588, cyclic prefix, GPS, or other methods).

Figures 3A, 3B:
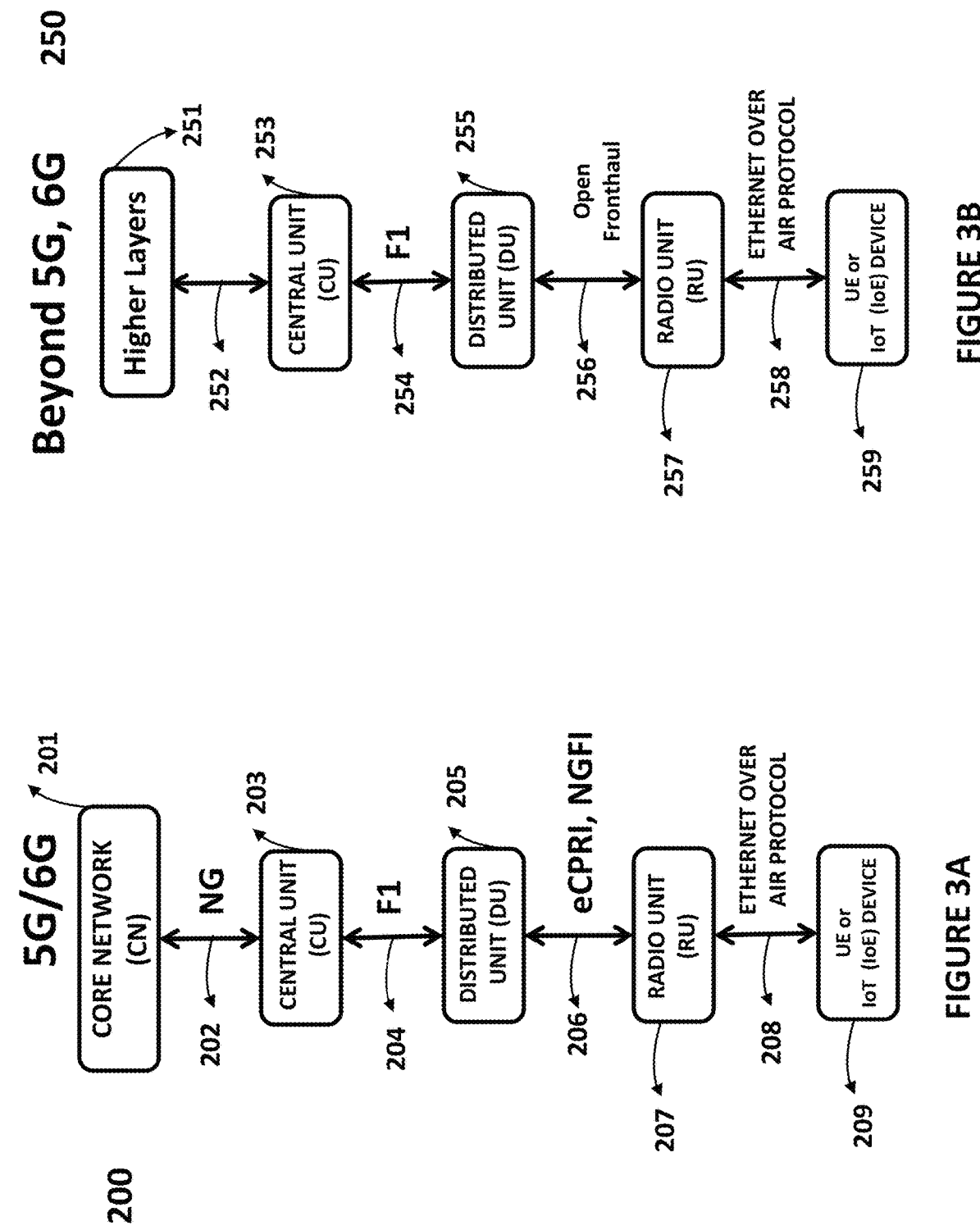
FIG. 3A illustrates an end-to-end 5G/6G IoT network.
FIG. 3B illustrates an end-to-end beyond 5G/6G IoT network.

FIG. 3A depicts 5G/6G (core, gNodeB, and UE or IoT device) end to end IoT network 200 and FIG. 3B illustrates beyond 5G/6G (higher layers, gNodeB, UE or IoT device) end to end IoT network 250 supporting cloud radio access network C-RAN, virtual radio access network vRAN, and open radio access network (O-RAN). The 5G/6G network 200 facilitate communication between user equipment (UE) or IoT device 209 and core network (CN) 201 through remote radio unit (RU) 207, distributed unit (DU) 205, and central unit (CU) 203 using over the air protocol interface 208, evolved common public radio interface (eCPRI) or next generation fronthaul interface (NGFI) 206, F1 interface 204 and "NG" interface 202. The RU 207, DU 205, and CU 203 are components of 5G/6G new radio (NR) which is also called gNodeB. UEs 209 also act as an IoT (IoE) device.

The 5G/6G network 200 uses different architectures depending on applications that the network is used for. In certain architectures one or more network components are collocated. When one or more network components are collocated the components use the interfaces defined in the standard. However, there are cases such as a small cell when two or more components of network are collocated, and the interfaces may be eliminated.

Cloud radio access network or C-RAN architectures shown in FIG. 2 enables cost saving on expensive baseband resources, in which the baseband units are shared in a centralized baseband pool. Therefore, the computing resources can be utilized optimally based on the demand. C-RAN architecture has also opened an opportunity for RAN virtualization (vRAN) to further reduce cost. Therefore, virtual RAN or vRAN has been developed to simplify the deployment and management of the RAN nodes and make the platform readily available for multitude of dynamically changing service requirements. The main issue with C-RAN and vRAN is that these architectures still utilize propriety software, hardware and interfaces which lack openness as a major bottleneck in efficiently utilizing virtualization. To overcome the limitations of C-RAN and vRAN, O-RAN is emerging as a new RAN architecture that uses open interfaces between the elements implemented on general-purpose hardware. This allows operators select RU and DU hardware and software from different vendors. In addition, open interfaces between decoupled RAN components provide efficient multi-vendor interoperability. O-RAN architecture also allows enhanced RAN virtualization that supports more efficient splits over the protocol stack for network slicing purpose. O-RAN further reduces RAN expenditure by utilizing self-organizing networks that reduce conventional labor-intensive means of network deployment, operation, and optimization. In addition to cost reduction, intelligent RAN can handle the growing network complexity and improve the efficiency and accuracy by reducing the human-machine interaction.

FIG. 3B shows the O-RAN end to end architecture (UE, gNodeB) 250 for beyond 5G and 6G. Higher layers 251 communicate with open interface 252 to central unit 253. The interface between central unit (CU) 253 and distributed unit (DU) 255 is open interface 254 "F1" and the interface between distributed unit 255 and radio unit (RU) 257 is open fronthaul 256. UE or IoT device 259 use over the air interface 258 to communicate with RU 257. Therefore, the only difference between 5G/6G, beyond 5G and 6G ORAN architecture is open interface 252, open "F1" interface 254 and open fronthaul 256.

All embodiments related to 5G/6G explain above apply to beyond 5G and 6G (7G) ORAN.

Figure 4:
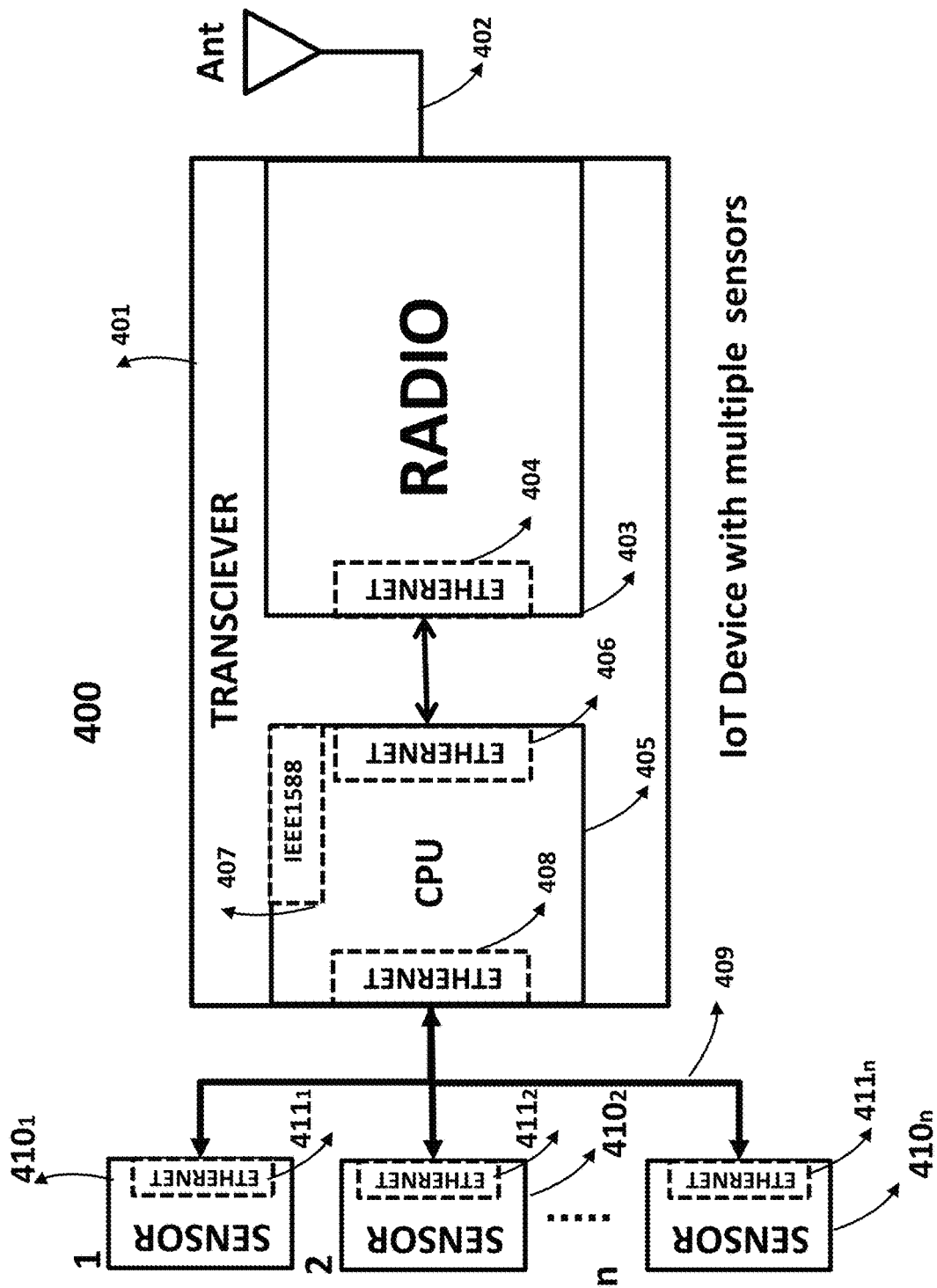
FIG. 4 depicts a typical IoT device with multiple sensors.

FIG. 4 shows the architecture of an IoT sensor network 400. In general, IoT sensor network 400 communicates with 5G, 6G, beyond 5G/6G (or 7G) and WiFi networks to exchange information data. IoT sensor network 400 through radio 403 attaches itself to a 5G, 6G, beyond 5G/6G (or 7G) or WiFi network in its surrounding environment that supports Internet of Things and listens to commands to activate sensor network $410_1$ to $410_n$. Radio 403 when receives a command, sends it to CPU 405 to be evaluated and performed by CPU 405 or sensor network 410$_1$ to 410$_n$ that is connected to CPU 405. Then the results obtained from performing the commands through CPU 405 and radio 403 is transmitted to 5G, 6G, beyond 5G/6G (or 7G), WiFi network or a navigation and protection system (NPS) of an object for analysis.

In one embodiment, IoT sensor network 400 includes among other things transceiver 401 which consists of antenna 402, radio 403, possible radio Ethernet port 404, CPU 405, possible Ethernet port 406 towards radio, possible IEEE1588 PTP 407, possible Ethernet port 408 and sensor network 410$_1$ to 410$_n$.

In one embodiment, IoT sensor network 400 through antenna 402 and radio 403 attaches to 5G, 6G, beyond 5G/6G (or 7G) or WiFi IoT network and obtains the time of day (TOD).

In another embodiment, IoT sensor network transceiver 401 obtains the time of day using IEEE1588 PTP, downlink transmit cyclic prefix, downlink transmit unused sub-carriers, or unused bits or messages in one of downlink channels from 5G, 6G, beyond 5G/6G (or 7G) or WiFi IoT network.

In another embodiment, IoT sensor network 400 propagates the time of day to an external device or equipment via its transceiver's Ethernet port 408 and link 409 using IEEE1588 PTP 407.

In one embodiment, IoT sensor network 400 receives commands or operation information data from 5G, 6G, beyond 5G/6G (or 7G) or WiFi IoT network and communicates them to an external device through its transceiver's Ethernet port 408.

In one embodiment, IoT sensor network 400 communicates with other IoT devices and exchange broadcast data. The IoT sensor network 400 uses a different frequency or channel to communicate with another IoT device to avoid interruption and interference.

In another embodiment, IoT sensor network 400 communicates with other IoT devices in its surrounding environment that are in its communication range using a proprietary physical layer or 5G, 6G, beyond 5G/6G (or 7G) or WiFi network physical layer.

In one embodiment, IoT sensor network 400 exchanges Ethernet packets or any other proprietary packets with other IoT devices in its surrounding environment.

In one embodiment, IoT sensor network 400 through its transceiver 401 supports WiFi, Bluetooth, Zigbee, laser, and Infrared physical layer and over the air wireless protocols.

In one embodiment, IoT sensor network 400 exchanges IEEE1588 PTP or proprietary messages with another IoT device or a WiFi router in surrounding environment to obtain or propagate the time of day.

In another embodiment, IoT sensor network 400 uses an external monitoring sensor network 410$_1$ to 410$_n$ that can perform various functions autonomously or through commands that sent to it remotely.

In one embodiment, IoT sensor network 400 uses an external sensor network 410$_1$ to 410$_n$ that communicates with transceiver 401 through Ethernet ports 411$_1$ to 411$_n$.

In another embodiment, the sensor network 410$_1$ to 410$_n$ can be a monitoring network 410$_1$ to 410$_n$ or a mix of sensors, monitoring devices, ranging IoT devices, autonomous devices, IoT devices and remotely controlled devices or equipment 410$_1$ to 410$_n$.

In one embodiment, each device within network of devices 410$_1$ to 410$_n$ has an IP (internet protocol) address that identifies the device.

In another embodiment, each device within network of devices 410$_1$ to 410$_n$ uses its serial number for its identity.

In one embodiment of IoT sensor network 400, at least one of an Ethernet packet and a proprietary packet is used for communication between transceiver 401 and devices/equipment 410$_1$ to 410$_n$.

In another embodiment, the link 409 between Ethernet port 408 or port 408 of transceiver 401 and Ethernet ports 411$_1$ to 411$_n$ or ports 411$_1$ to 411$_n$ of devices 410$_1$ to 410$_n$ is a wired link, a wireless link, or a mix of wired and wireless.

In another embodiment of IoT sensor network 400, the wired link 409 is a standard serial interface, a proprietary serial interface, or a parallel interface.

In one embodiment of IoT sensor network 400, the wireless link 409 between transceiver 401 and devices 410$_1$ to 410$_n$ is at least one of Bluetooth, Zigbee, WiFi, Infrared, laser, or any proprietary wireless link.

In one embodiment, IoT sensor network 400 receives an absolute time TOD, and a time slot from 5G, 6G, beyond 5G/6G (or 7G) or WiFi network for its various activities as well as scheduling activities of the external devices connected to IoT sensor network 400. Sensor network 410$_1$ to 410$_n$ is slave IoT device network 410$_1$ to 410$_n$.

In one embodiment of the IoT sensor network 400, the sensor network 410$_1$ to 410$_n$ is slave IoT network 410$_1$ to 410$_n$.

FIGS. 5 and 6 depict hexagon geometry 600 for terrestrial and satellite application. The design objective of early mobile radio systems was to achieve a large coverage area using a single high-power transmitter with an antenna mounted on a tall tower. A cellular concept is a system-level idea which calls for replacing a single high-power transmitter (large cell) with many low power transmitters (small cell) each providing a coverage to only a small portion of the service area.

When considering geometric shapes which cover an entire region without overlap and with equal area, there are three sensible choices—a square, an equilateral triangle, and a hexagon. For a given distance between the center of a polygon and its farthest perimeter points, the hexagon has the largest area of the three. Thus, by using hexagon geometry, the fewest number of cells can cover a geographic region, and hexagon closely approximates a circular radiation pattern which would occur for an Omni-directional base station antenna and free space. When using hexagon, base station transmitter (RU) is in the center of the cell (Omni-directional antenna) or on the three of the six cell vertices (directional antenna).

Each cellular base station (RU, RRU, gNodeB, eNodeB), or proprietary base station is allocated a group of radio channels to be used within a small geographic area called cell. Base stations (RU, RRU, eNodeB, gNodeB, or proprietary) in adjacent cells are assigned channel groups which contain completely different channels than neighboring cells. By limiting the coverage area to within the boundaries of a cell, the same groups of channels may be used to cover different cells that are separated from one another by distances large enough to keep the interference levels within tolerable limits. The design process of selecting and allocating channel groups for all the cellular base stations (RU, RRU, eNodeB, gNodeB, or proprietary) is called frequency reuse or frequency planning.

Advances in interference cancellation techniques today allow a receiver to operate with higher levels of co-channel interference. The motivation of improving a receiver's performance in co-channel interference is to increase the spectrum efficiency of a system usually by allowing a greater geographical re-use of frequencies. It is a general principle that a communication system should be designed to avoid interference in the first place, either through network planning or with effective radio resource management and medium access control.

Terrestrial base stations (RU, RRU, eNodeB, gNodeB, or proprietary) are stationary and located in the center (or vertices) of a hexagon cell as shown in FIG. 5. The terrestrial cluster 601 has a center cell 602 and 6 cells attached to its peripheral. This cluster grows by adding new cells to expand the coverage area. Cells in the architecture of FIG. 5 and the moving objects within the cells are all controlled by SOMC. The shared database SD stores location coordinate of the base stations (RU, RRU, eNodeB, gNodeB, or proprietary), type of base stations (sectors, transmit power, height of antenna, type of tower, service providers using the tower, type of power supply), the terrain map of the cells, street and road map of the cells, one way or two way roads, allowed or not allowed right turn at red light, location coordinates of junctions and traffic lights, type of junctions, type of street and road (one lane, two lanes, multiple lanes, road and street curbs and center barriers), type of stationary objects in the cells, type of buildings (height, type of body structure), specific information for moving object's navigation and protection system (NPS), and service providers using the cells. Some of the data in SD are fixed and some dynamically change.

For flying objects, it is also possible to use hexagon cell architecture as shown in FIG. 6. They can be called satellite clusters 603 because each cell 604 needs to cover a much wider area compared with terrestrial cells. In other words, a satellite cell can cover an area that multiple of terrestrial cells cover. The base stations (RU, RRU, eNodeB, gNodeB, or proprietary) serving satellite cells are either fix or mobile.

Fix base stations are the same as base stations for terrestrial cells. The only difference is elevation of the antenna and antenna radiation pattern. For satellite base station a very tall tower or a very tall building can be used to provide coverage for a wide area. The radiation pattern of the antenna is also important. The pattern needs to minimize any radiation towards the ground. Due to high elevation of antenna and the specific radiation pattern the waves travel in free space with minimum multipath fading.

Moving base stations 606 are either flying balloons or low orbit satellite. These base stations provide RU and RRU and possibly more functions of eNodeB, gNodeB, and proprietary. Satellite and balloon base station (RU, RRU, eNodeB, gNodeB, or proprietary) can also serve the moving objects on the ground due to less multipath fading. The main issue with moving satellite base stations is their latency. However, if low orbit satellite is used the latency can be reduced to around 20 milliseconds. Like terrestrial cells satellite cells also use SD and SOMC and store all their information, specification, and capabilities in the SD to be used by SOMC to control navigation and protection system (NPS) of both moving objects and flying objects.

Figure 7:
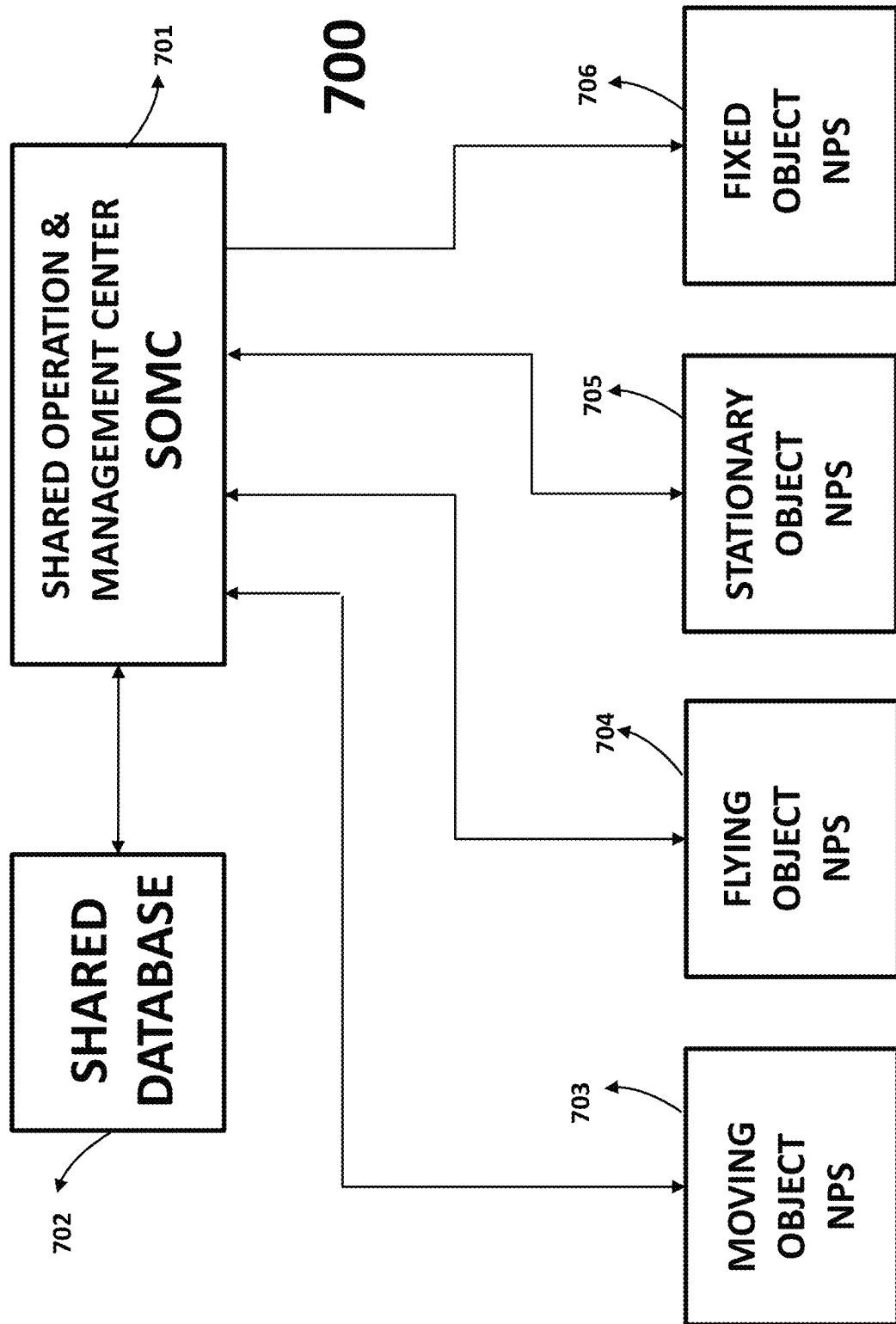
FIG. 7 shows an object control system OCS.

FIG. 7 shows moving and flying objects control system (OCS) 700. The object control system 700 uses SOMC (702) and SD (701) to control the navigation and protection of moving and flying objects that support IoT network and IoT devices in a smart environment. Object control system 700 uses time of day (TOD) to schedule activities of the moving (703), flying (704), stationary (705), and fixed (706) objects in the smart environment to allow all objects within object control system 700 operate freely with no interference and collision.

Fixed objects (IoT devices) 706 are those that do not communicate with the IoT network. They are only used by stationary objects and communicate with a master IoT device used by the stationary object 705. The master IoT device of a stationary object 705 communicates with SOMC 702 and SD 701 through IoT network. Fixed objects 706 are slave IoT devices that use IEEE1588 protocol to achieve clock synchronization and obtain time of day from the master IoT device of a stationary object 705. The master IoT device through IoT network exchange necessary information data with SOMC 702 and SD 701 and communicates with slave IoT devices to share operation information data (OID). Fixed objects 706 may also use method 930 shown in FIG. 10C instead of IEEE1588 to obtain TOD.

Figure 8:
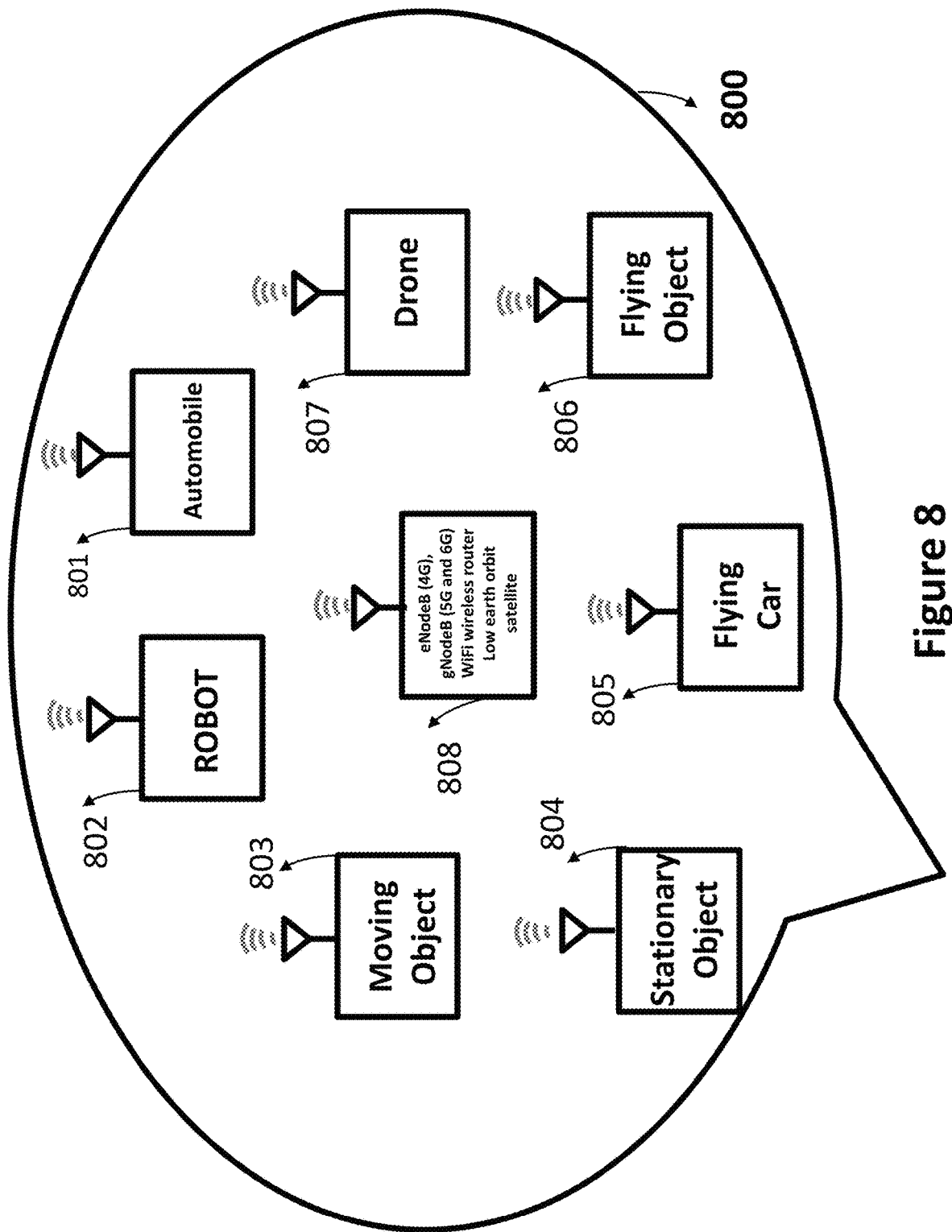
FIG. 8 illustrates moving vehicles, flying vehicles/objects, and stationary objects in a smart environment.

FIG. 8 depicts a smart environment 800 with objects (IoT devices) that communicate with a public or private network. In general, the smart environment 800 in addition to open space consists of various fixed, stationary, moving, and flying objects (IoT devices) that are capable of wirelessly communicate with other objects (IoT devices) as well as a public or private communication network. In the smart environment 800 all the objects (IoT devices) coexist synchronously in time (time of day) and operate freely without any interruption, interference, and collision. All the objects (IoT devices) in smart environment 800 are registered with 5G, 6G, beyond 5G/6G (or 7G), a proprietary, or WiFi network through their eNodeB, gNodeB, and NodeB base station or wireless router 808. The 5G, 6G, beyond 5G/6G (or 7G), proprietary, or WiFi network broadcasts certain information data to all objects (IoT devices) in smart environment 800 that are registered with 5G, 6G, beyond 5G/6G (or 7G), proprietary, or WiFi network through their gNodeB, NodeB, or wireless router. The broadcast information data is updated when an object (IoT device) exit (deregister with gNodeB of 5G, 6G, beyond 5G/6G networks, NodeB of a proprietary network, or wireless router of WiFi network) or enter (register with gNodeB of 5G, 6G, beyond 5G/6G network, NodeB of a proprietary network or wireless router of WiFi network) the smart environment 800. The base station 808 can also support future 7G network and all objects (IoT devices) in smart environment 800 register with 7G network through wireless base station 808 and receive broadcast information data from 7G network.

In one embodiment, smart environment 800 includes, among other things, automobile 801, robot 802, moving object 803, stationary object 804, flying car 805, flying object 806, drone 807, and a wireless base station 808 that supports a public (eNodeB, or gNodeB of 4G, 5G, or 6G network, base station of 7G, NodeB of a proprietary network, and wireless router of a WIFi network) or private wireless communication network.

In one embodiment, the wireless base station 808 is a cellular (5G, 6G (7G), beyond 5G/6G or a proprietary network) small cell, macro-cell, micro-cell or picocell.

In another embodiment, the wireless base station 808 is a WiFi wireless router that is connected to the IP network as well as cellular network (5G, 6G (7G), or beyond 5G and 6G), and a proprietary network.

In one embodiment, the wireless base station 808 is part of a private network that is connected to IP network as well as cellular network (5G, 6G (7G), and beyond 5G and 6G).

In one embodiment, wireless base station 808 is a 5G RU, a 6G RU a beyond 5G/6G RU, a wireless router of WiFi, or NodeB of a proprietary network.

In one embodiment, the proprietary network is a satellite or a terrestrial network that performs all the tasks that 5G, 6G, 7G or beyond 5G/6G does in a smart environment to support NPS of an object.

In another embodiment, the wireless base station (5G, 6G (7G), or beyond 5G and 6G), or NodeB of a proprietary network communicates with the stationary, moving and flying objects in the smart environment 800 and obtains type, function, status (for traffic light color, green, yellow, or red), specification (includes dimension, and specification of the slave IoT devices), location coordinate (obtained from GPS receiver), identity number, signal propagation time through transmitter of the IoT device's (master or slave) wireless transceiver up to the input of transmit antenna, and estimated mass from objects 801, 802, 803, 804, 805, 806 and 807.

In one embodiment, wireless base station (5G, 6G (7G), or beyond 5G and 6G) 808 in the smart environment 800 broadcasts some of the information obtained from each object 801, 802, 803, 804, 805, 806 and 807 to all objects (IoT devices) in smart environment 800.

In one embodiment, all moving and stationary objects 801, 802, 803, 804, 805, 806 and 807 continuously update the information data they obtain from wireless base station 808 related to other objects in their surrounding smart environment 800.

In another embodiment, the identity number of each object in the smart environment 800 is the object's serial number, a MAC address or an IP address that is an IP4 or IP6.

In one embodiment, the wireless base station 808 uses GPS to obtain clock synchronization and time of day.

In another embodiment, all objects (IoT devices) in the smart environment 800 receive time of day and their location coordinates from GPS receiver.

In another embodiment, a stationary object (IoT device) in the smart environment has its location coordinates manually program to it or obtains from base station 808.

In one embodiment, the wireless base station (5G, 6G (7G), or beyond 5G and 6G) or WiFi router 808 in smart environment 800 supports IEEE1588 (Institute of electrical and electronic engineering synchronization standard 1588) PTP which provides clock synchronization and time of day for wireless base station 808 through any port in data communication network as well as 5G, 6G (7G), beyond 5G and 6G or WiFi network.

In another embodiment, all moving and stationary objects (IoT devices) 801, 802, 803, 804, 805, 806 and 807 also supports IEEE1588 to obtain time of day.

In one embodiment, wireless base station (5G, 6G (7G), beyond 5G and 6G or WiFi) 808 broadcasts to each moving and stationary object (IoT device) 801, 802, 803, 804, 805, 806 and 807 an absolute time and a time slot when they can broadcast their information or communicate with other IoT devices.

In one embodiment, the absolute times and time slots assigned by IoT network (5G, 6G (7G), beyond 5G and 6G or WiFi) to various IoT devices is constant or dynamically changes depending on the time of day or load on the IoT network.

In another embodiment, IoT network (5G, 6G (7G), beyond 5G and 6G or WiFi) assigns an absolute time and a time slot for broadcasting and communication to each IoT device registered with the IoT network.

In one embodiment, the time window (slot) assigned to each IoT device by IoT network (5G, 6G (7G), beyond 5G and 6G or WiFi) is constant and identical for all registered IoT devices with the IoT network, different for each IoT device, dynamically changes by the IoT network, or requested by IoT device.

In one embodiment, wireless base station (5G, 6G (7G), beyond 5G and 6G or WiFi) 808 broadcasts to each moving and stationary object (IoT device) 801, 802, 803, 804, 805, 806 and 807 the absolute time and time slot when their sensors can collect data.

In one embodiment, wireless base station (5G, 6G (7G), beyond 5G and 6G or WiFi) 808 broadcasts to each moving and stationary object (IoT device) 801, 802, 803, 804, 805, 806 and 807 the absolute time and time slot when their wireless sensors can perform ranging to measure a distance and an approaching speed of an object in their surrounding smart environment.

In one embodiment, wireless base station (5G, 6G (7G), beyond 5G and 6G or WiFi) 808 broadcasts to each moving and stationary object (IoT device) 801, 802, 803, 804, 805, 806 and 807 the carrier frequency, channel, bandwidth, and modulation for their wireless sensor.

In one embodiment, wireless base station (5G, 6G (7G), beyond 5G and 6G or WiFi) 808 broadcasts to each moving and stationary object (IoT device) 801, 802, 803, 804, 805, 806 and 807 the carrier frequency, channel, modulation, data rate, range of output power, and over the air protocol (type of transceiver which is one of 5G, 6G (7G), beyond 5G and 6G, WiFi, Bluetooth, Zigbee, laser, proprietary, or infrared) for ranging as well as broadcasting and communicating with other IoT devices.

In one embodiment, each moving and stationary object (IoT device) 801, 802, 803, 804, 805, 806 and 807 exchange Ethernet packets with wireless base station 808.

In one embodiment, each moving and stationary object (IoT device) 801, 802, 803, 804, 805, 806 and 807 exchange Ethernet packets among each other based on the absolute time and time slot assigned to them by the base station 808.

In one embodiment, the link between each moving and stationary object (IoT device) 801, 802, 803, 804, 805, 806 and 807 and wireless base station (5G, 6G (7G), beyond 5G and 6G or WiFi) 808 is an over the air Ethernet link.

In one embodiment, communication link between each moving and stationary object (IoT device) 801, 802, 803, 804, 805, 806 and 807 and the cloud network, data network, and core network through wireless base station (5G, 6G (7G), beyond 5G and 6G or WiFi) 808 supports a single end-to-end Ethernet packet protocol.

In another embodiment, moving and stationary object (IoT device) 801, 802, 803, 804, 805, 806 and 807 use their wireless sensor to broadcast their broadcast data.

In one embodiment, moving and stationary objects (IoT devices) 801, 802, 803, 804, 805, 806 and 807 support WiFi, Bluetooth, Zigbee, Infrared, laser and proprietary wireless transceivers and use them for ranging and to broadcast their broadcast data or transmit and receive Ethernet packets or frames.

Figure 9A:
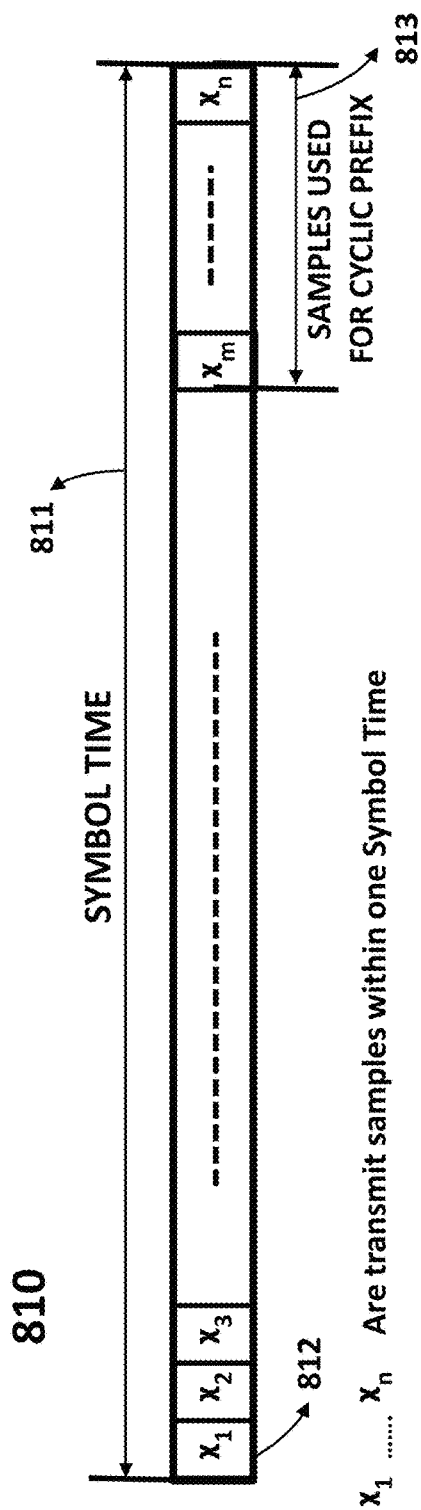
FIG. 9A depicts OFDM transmit symbol signal before adding cyclic prefix.

FIG. 9A depicts OFDM transmit symbol signal 810 before adding cyclic prefix. 5G, 6G (7G), beyond 5G and 6G use OFDM (orthogonal frequency division multiplexing) in their transmit path. The duration of transmit signal is one OFDM symbol 811 for 4G eNodeB and 5G (6G) gNodeB. The transmit signal 850 consists of "n" samples $x_1$ to $x_n$ 812. To eliminate inter-symbol interference "n-m" samples 813 from end of OFDM symbol are copied at the beginning of symbol or some samples from the beginning of OFDM symbol are copied at the end of symbol. The "m to n" samples are called cyclic prefix and the duration of it depends on radius of coverage of RRU and RU transmitters.

These "m to n" samples at the receiver of user equipment UE (IoT device) are removed by using correlation before performing the receiver functions.

Figure 9B:
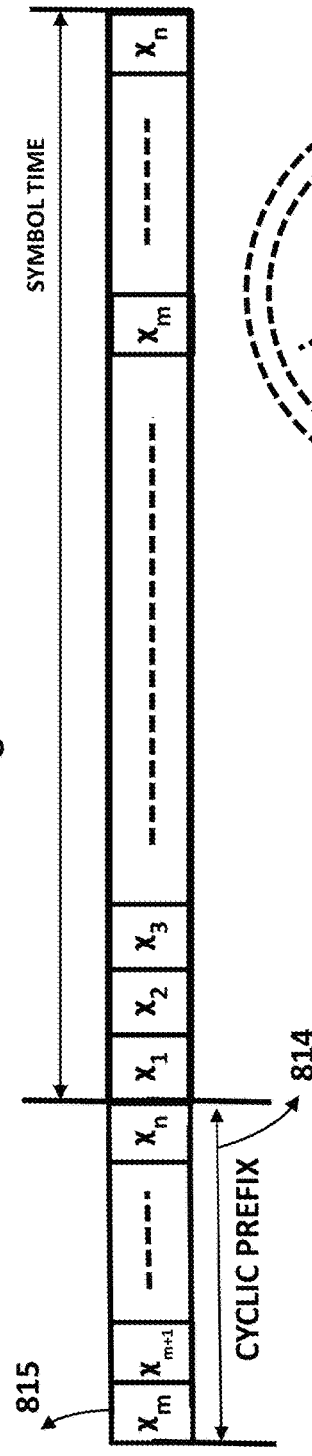
FIG. 9B shows transmit signal with cyclic prefix added at the beginning of transmit symbol.

FIG. 9B shows transmit signal with cyclic prefix 814 that is added at the beginning of transmit symbol which consists of "n" samples $x_1$ to $x_n$ 812. Samples $x_m$ to $x_n$ from end of transmit symbol are copied at the beginning of "n" samples $x_1$ to $x_n$ as cyclic prefix 814. In the UE (IoT device) receiver cyclic prefix 814 is removed from received signal before the receive process starts. The process of removal of cyclic prefix is a circular correlation. The highest correlation is achieved when all samples in cyclic prefix are matched. There is always possible one or more samples in cyclic prefix are not matched due to various impairment and results in lower amount of correlation but still removal of cyclic prefix is possible. Therefore, it is possible to use one or more samples in cyclic prefix to transmit time of day to user equipment UE (IoT device).

In one embodiment of transmit signal 810 one or more samples of cyclic prefix 814 samples $x_m$ to $x_n$ is used to send the time of day to user equipment UEs or IoT devices.

In another embodiment the number of samples in cyclic prefix are more than needed for operation and the extra samples (one or more) are used to send time of day and date.

In another embodiment the samples used from cyclic prefix 814 for transmitting time of day are at the start, middle, or end of cyclic prefix 814.

In another embodiment the samples used from cyclic prefix 814 for transmitting time of day are at any location in cyclic prefix 814 and the location do not change until TOD data is transmitted.

In one embodiment the time of day is sent to user equipment UEs, or IoT devices over several transmit OFDM symbols.

In one embodiment the time of day includes date and time of day and date include year, month, and day.

In one embodiment the bits in samples from cyclic prefix 814 are used for transmission of time of day to UEs or IoT devices.

In another embodiment the top bits in sample ($x_m$) 815 of cyclic prefix are used to send time of day to mitigate effect of any noise, interference or fading.

In one embodiment only one sample of cyclic prefix 854 is used for transmitting the time of day and the first sample that is used for time of day has a detectable bit pattern to indicate that next samples at the same location in next cyclic prefixes contain the time of day.

In one embodiment, more than one sample of cyclic prefix 814 is used for transmitting the time of day and the first samples that are used for time of day have a detectable bit pattern to indicate that next samples whether in present cyclic prefix or next cyclic prefixes contain the time of day.

In another embodiment the first sample of first cyclic prefix carries the hour, the first sample of second cyclic prefix carries the seconds, the first sample of third cyclic prefix carries the milliseconds, the first sample of forth cyclic prefix caries the microseconds, the first sample of fifth cyclic prefix caries nanoseconds, and if more accuracies are available the first sample of sixth cyclic prefix carries the picoseconds.

In one embodiment the bits used to represent the time of day are compressed (using one of compression algorithms) to use less cyclic prefix samples for transmission of time of day.

There is a time difference between transmissions of two cyclic prefixes. During this time difference the date, hour $(T_h)$, second $(T_s)$, millisecond $(T_m)$, microsecond $(T_\mu)$, or nanosecond $(T_n)$ of time of day can be incremented and this creates a significant time error between RU/RRU and UEs or IoT devices. Therefore, before sending time of day there is a need to find out if one of $(T_n)$, $(T_s)$, $(T_m)$, $(T_\mu)$, or nanosecond $(T_n)$ will be incremented during the transmission of complete time of day.

In one embodiment the date, hour $(T_n)$, second $(T_s)$, millisecond $(T_m)$, microsecond $(T_\mu)$, or nanosecond $(T_n)$ of time of day if needed is incremented before being sent to UE or IoT device.

In another embodiment, the time of day before being sent to UE or IoT device is adjusted for propagation time of IFFT through transmitter path of RU/RRU or BBU/DU up to antenna to reduce the time error between time of day at RU/RRU (or BBU/DU) and UEs or IoT devices.

In one embodiment the date and time of day that is sent to UE or IoT device is repeated or updated with a configurable time interval.

Figure 9C:
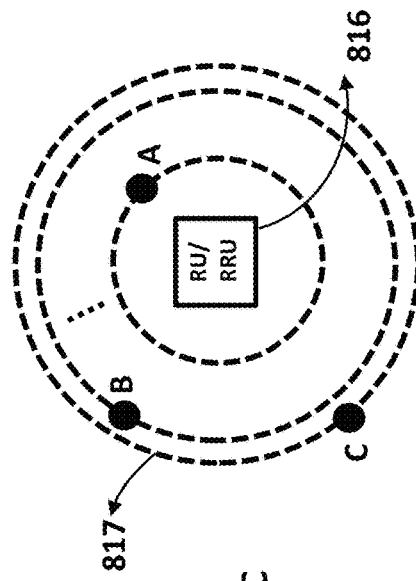
FIG. 9C depicts a typical coverage for RRU/RU.

FIG. 9C depicts a typical coverage of RRU/RU in a 4G, 5G, 6G, or (7G) wireless network. UEs or IoT devices A, B, and C are at different distance from RU/RRU. Therefore, UEs or IoT devices A, B, and C receive time of day at different time which results in time error between UEs or IoT devices. These UEs or IoT devices when transmit to RU/RRU need to adjust their transmission time based on their time alignment or time advance which compensate for their difference in distance from RRU/RU. The time alignment or time advance is used to eliminate the error in time of day at UEs or IoT devices A, B, and C and make all UEs or IoT devices have the same time of day.

In one embodiment UEs or IoT devices that are at different distance from their common RRU/RU use their time alignment or time advance to adjust the time of day received from RRU/RU to have the same time of day.

In 4G, 5G, and 6G (or 7G) it is possible to use downlink methods like cyclic prefix to transmit time of day to UEs or IoT devices. These methods can utilize unused subcarriers or unused bits or messages in various downlink channels. For instance, in 4G (as well as 5G and 6G) LTE there are two cell search procedures: one for initial synchronization and another for detecting neighbor cells in preparation for handover. In both cases the UE or IoT device uses two special signals broadcast on each RRU: Primary Synchronization Sequence (PSS) and Secondary Synchronization Sequence (SSS). The detection of these signals allows the UE or IoT device to complete time and frequency synchronization and to acquire useful system parameters such as cell identity, cyclic prefix length, and access mode (FDD/TDD).

In the frequency domain, the PSS and SSS occupy the central six resource blocks (RBs, 72 subcarriers), irrespective of the system channel bandwidth, which allows the UE or IoT device to synchronize to the network without a priori knowledge of the allocated bandwidth. The synchronization sequences use 62 sub-carriers in total, with 31 sub-carriers mapped on each side of the DC sub-carrier which is not used. This leaves 5 sub-carriers at each extremity of the 6 central RBs unused. These 10 unused sub-carriers can be used to transmit time of day to UEs or IoT devices. Like cyclic prefix the time of day should be adjusted for propagation time through transmitter path up to transmit antenna port in order to minimize time difference between gNodeB/eNodeB (RU/RRU) and UEs or IoT devices. During transmission of the time of day it is possible one of $(T_h)$, $(T_s)$, $(T_m)$, $(T_\mu)$, and $(T_n)$ has to be incremented before being sent to UEs or IoT devices due to the time it takes to transmit the time of day.

In one embodiment unused downlink sub-carriers is used to transmit time of day to UEs or IoT devices.

It is also possible to utilize unused bits or messages in various downlink channels of 4G, 5G, or 6G (7G) to transmit the time of day like unused sub-carriers.

In another embodiment unused bits or messages of various downlink channels is used to transmit time of day to UEs or IoT devices.

In one embodiment when unused downlink sub-carriers, bits, or messages are used, due to the time takes to send all the data, the day, hour ($T_h$), second ($T_s$), millisecond ($T_m$), microsecond ($T_\mu$), or nanoseconds ($T_n$), of time of day if needed is incremented before being sent to UE or IoT device.

Using time advance or time alignment allows all IoT devices have the same TOD. However, this IoT-device-TOD is not the same as TOD that eNodeB, gNodeB, WiFi wireless router, or proprietary base station (terrestrial, low earth orbit satellite, or balloon) holds. The difference between IoT-device-TOD and the IoT network TOD (eNodeB, gNodeB, WiFi wireless router, or proprietary base station) is the distance between closest IoT device to IoT network antenna (eNodeB, gNodeB, WiFi wireless router, or proprietary base station). One way to eliminate or remove this difference is to have a local IoT device located at the Radio Unit (RU, RRU) of the eNodeB, gNodeB, WiFi wireless router, or proprietary base station. This local IoT device reduces the difference between IoT-device-TOD and network TOD to a negligible amount as well as provide monitoring of the eNodeB, gNodeB, WiFi wireless router, or proprietary base station for functionality, control, management, configuration, and maintenance. It is assumed TOD that eNodeB, gNodeB, WiFi wireless router, or proprietary base station sends to IoT device is the TOD at the transmit antenna port of RU, RRU, wireless router or proprietary base station.

All Low earth orbit satellite RU, flying balloon RU, microcell RU, and macro-cell RU base stations need to have a local IoT device next to the antenna of RU (base station) to minimize the difference between IoT-device-TOD and IoT network TOD. In case of small cell RU (or base station) a local IoT device or UE close to the antenna of small cell RU is needed if the operating coverage radius of small cell RU or base station is less than 100 (330 feet) meters.

In cases that two independent IoT devices obtain TOD from two independent base station (eNodeB, gNodeB, WiFi wireless router, or proprietary) their obtained TOD will be different with an unspecified and random error. However, if all Base stations (eNodeB, gNodeB, WiFi wireless router, or proprietary) use a local IoT device which is close to the transmitter and receiver antenna, then all IoT devices irrespective of their base station will have the same TOD with very negligible error. Using a local IoT device near base station antenna also allows to use time alignment or time advance to estimate the distance of an IoT device from the base station it is communicating with.

There is another issue when IoT device uses IEEE1588 PTP to obtain TOD from base station (eNodeB, gNodeB, WiFi wireless router, or proprietary). Both IoT device and base station use different time for transmit and receive processing. This processing time may dynamically change due to load. Therefore, to use PTP the processing delay and propagation (up to transmit antenna port and from receiver antenna port) delay in transmit and receive paths for both IoT device and base station are required to be known and considered in PTP messages. It is easy for IoT device to consider the delay in transmit and receive path in its PTP messages. Base station uses components from various suppliers and can either use a local IoT device to estimate the processing and propagation (within transmitter and receiver) delay or use SON (self-organizing network) to estimate the processing and propagation delay. However, it may not be possible to estimate the delay with acceptable accuracy and the error depends on the point or port in base station link that PTP messages are generated and terminated.

The advantage of unidirectional transmission of TOD from base station (eNodeB, gNodeB, WiFi wireless router, or proprietary) to IoT device is that it is simple, more accurate, only IoT device receiver is involved for stationary IoT devices, and all stationary IoT devices (master or slave) can independently obtain TOD by only having a receiver that receives the base station downlink signal. Stationary IoT devices time alignment or time advance is constant because base station uses a local IoT device which set the reference and is stationary. Therefore, all stationary IoT devices use their time alignment or time advance (which indicates the distance between IoT device and base station) that does not change and is constant to adjust the TOD they receive from base station to the current TOD base stations (eNodeB, gNodeB, WiFi wireless router, or proprietary) has at the time IoT device receives the old TOD.

In cases that a base station (eNodeB, gNodeB, WiFi wireless router, or proprietary) in its system information sends its location coordinates, IoT devices do not need to use time alignment to adjust their time of day to base station current TOD. In this scenario, IoT device only uses its receiver to obtain the TOD. The TOD is transmitted to IoT device using base station's (RU, RRU) system information, cyclic prefix, downlink unused subcarriers, and downlink unused messages. The TOD is at the antenna port of base station (RU, RRU). IoT device uses its own location coordinates obtained from a GPS receiver and base station's location coordinates received through system information to estimate its distance from base station (eNodeB, gNodeB, WiFi wireless router, or proprietary). Then IoT device uses its distance from base station (converted to nanosecond) to adjust and synchronize the received TOD from base station (RU, RRU) to the time of day at the base station. By using this technique with a simple receiver an IoT device can obtain a current TOD from a base station (eNodeB, gNodeB, WiFi wireless router, or proprietary). Using location coordinates in estimating TOD by an IoT device is not without any error. Simple GPS receivers estimate the location coordinates within 5 meters (or 15 nanosecond). Therefore, if we assume maximum location coordinate error at IoT device and the base station then the adjusted TOD at IoT device could have a maximum error of 30 nanosecond. This is an acceptable error because TOD obtained from a GPS receiver is within 100 nanosecond error from UTC time of day. In case of mobile base station (low earth orbit satellite RU) the vehicle appears stationary to the mobile base station due to small propagation delay (around 20 milliseconds) from mobile base station (low earth orbit RU) to moving vehicle. In 20 millisecond a vehicle with 70 miles an hour speed moves around 2 feet. Therefore, if mobile base station (low earth orbit RU) in its system information sends its location coordinates and a time stamp indicating the TOD at the antenna of the RU then moving vehicle can calculates its distance from the base station (low earth orbit RU) and update its TOD. To do this the mobile base station requires to update its location coordinate with high frequency (proportional to its speed) to minimize the error in calculating the distance between moving vehicle and the mobile base station (low earth orbit RU) and updated TOD at moving vehicle. In case the mobile base station is a balloon the propagation delay between IoT device (the moving vehicle) and the balloon is low and may be comparable with terrestrial base station. Both moving vehicle and the balloon have low speed. Therefore, a moving balloon base station looks similar to terrestrial base station for moving vehicle.

An IoT device can also obtain or update its TOD using another IoT device in its surrounding environment. All IoT devices obtain their location coordinates from GPS or other means. IoT devices also include their location coordinates in their broadcast and Ethernet packets when one is transmitted. An IoT device can use its own location coordinates and the location coordinate of another IoT device to estimate the distance between them. Then an IoT device uses its distance from another IoT device, and the time stamp it receives from another IoT device to update its own TOD.

Figure 9D:
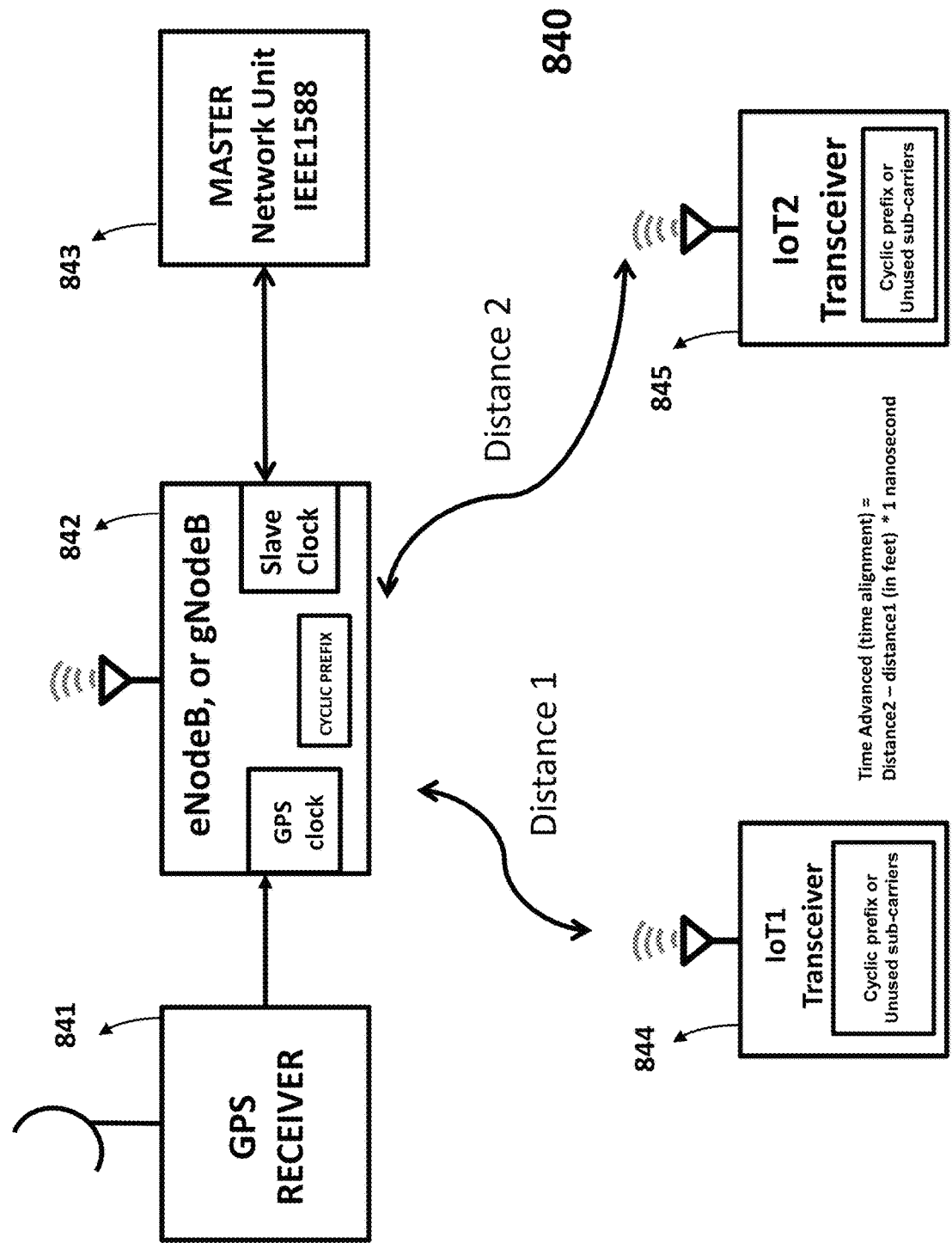
FIG. 9D illustrates an IoT device using cyclic prefix or unused subcarriers to obtain time of day (TOD).

FIG. 9D illustrates method 840 where IoT device uses cyclic prefix or unused subcarriers to obtain time of day (TOD). The eNodeB or gNodeB 842 uses either GPS receiver 841 or IEEE1588 PTP from master network unit 843 to achieve clock synchronization and obtain time of day. IoT1 device 844 and IoT2 device 845 with distance D1 and D2 from eNodeB or gNodeB 842 both frequency and phase synchronize with the eNodeB or gNodeB 842 using over the air protocol. IoT1 device 844 and IoT2 device 845 receive TOD information through cyclic prefix, unused sub-carriers, unused bits, or messages from eNodeB or gNodeB 842. Since IoT1 device and IoT2 device are at difference distances D1 and D2 from eNodeB or gNodeB 842 then time alignment or time advance is used to adjust time of day that IoT1 device and IoT2 device received from eNodeB or gNodeB 842. Time alignment or time advance for adjusting TOD may also consider the received signal propagation time between antenna port and decoder of IoT1 device or/and IoT2 device. For higher accuracy, IoT1 and IoT2 devices in addition to time advance or time alignment could adjust TOD by considering the transmit signal propagation time between modulator and antenna port and the propagation time from their antenna port to their detector.

FIG. 10A depicts Ethernet frame 870 and broadcast frame 880.

In one embodiment the broadcast frame 880 uses similar structure as Ethernet frame 870.

In one embodiment the broadcast frame 880 sends the time of day in the payload.

In one embodiment the broadcast frame 880 instead of sending destination address sends the time of day.

In another embodiment the source address (which is a media access control MAC address) of the broadcast frame 880 or an IP address is the identity code of a transceiver (IoT device, sensor, WiFi router, RRU, RU, private base station, or any other wireless device).

In one embodiment, two wireless devices (IoT devices, sensors, and others) use Ethernet packets or frame to exchange information between them when both source and destination addresses are used to identify the two wireless devices. One wireless device retrieves the address of another wireless device from its broadcast packet and then using Ethernet packets establishes direct communication between them to exchange information data.

Figure 10B:
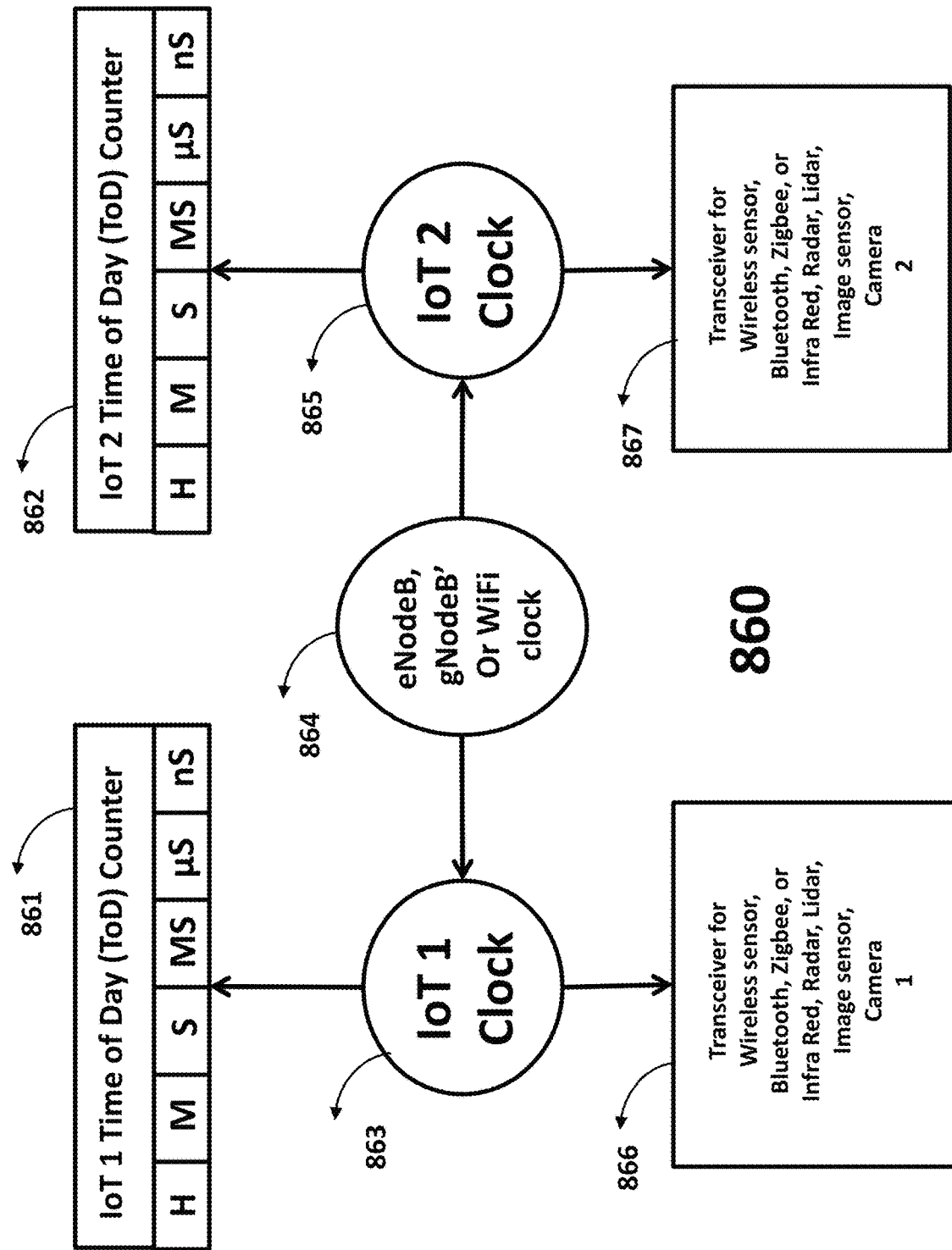
FIG. 10B shows two IoT devices having their clock's frequency and phase synchronized with eNodeB, or gNodeB.

FIG. 10B shows two IoT devices 860. Both IoT1 device and IoT2 device have their clocks 863 and 865 frequency and phase synchronized with eNodeB, gNodeB or WiFi clock 864. IoT1 and IoT2 devices 866 and 867 can support a wireless sensor transceiver, a Bluetooth transceiver, a Zigbee transceiver, an Infrared transceiver, a Radar transceiver, a Lidar transceiver, an ultrasonic transceiver, a WiFi transceiver, and a 4G, 5G, 6G, or 7G transceiver. IoT1 and IoT2 devices 866 and 867 use 4G, 5G, 6G, or 7G transceiver to obtain clock frequency and phase synchronization from 4G, 5G, 6G, or 7G eNodeB, gNodeB or WiFi 864. Both IoT devices support Radar, Lidar, ultrasonic, and Camera.

IoT1 clock 863 increments time of day 861 for IoT1 device 866 and IoT2 clock 865 increments time of day 862 for IoT2 device 867. Both IoT devices 866 and 867 use eNodeB, gNodeB 864, or WiFi to achieve clock frequency and phase synchronization as well as obtaining time of day 861 and 862. IoT1 device 866 and IoT2 device 867 can also use GPS to obtain time of day and the clock. IoT1 device 866 and IoT2 device 867 should have their transmit frequency +/−0.1 part per million (PPM) accurate compared with the frequency they receive from eNodeB or gNodeB 864. Worst case scenario is when IoT1 device 866 transmit frequency is +0.1 PPM compared with received frequency and IoT2 device 867 transmit frequency is −0.1 PPM compared with received frequency from eNodeB or gNodeB 864. A difference of 0.2 PPM between IoT1 clock 863 and IoT2 clock 865 produce very negligible error when used for incrementing IoT1 time of day 861 and IoT2 time of day 862. In addition, IoT1 clock 863 and IoT2 clock 865 as well as IoT1 TOD 861 and IoT2 TOD 862 are continuously updated to prevent error accumulation and maintain any error negligible.

There are several ways for an IoT device to obtain time of day (TOD). The technique or method an IoT device may use depends on type of IoT device and its capabilities. The methods available to obtain TOD are.

a. GPS: Using GPS receiver the TOD is obtained directly. However, using GPS requires an accurate oscillator or clock that provides sufficient hold over when GPS signal is not available for a long period of time due to jamming, spoofing and other technical problems. A good clock or oscillator makes the solution expensive and bulky for a simple cheap IoT device.

b. IEEE1588 PTP: If the IoT device can communicate with IoT network, then it can use PTP protocol to obtain TOD. PTP accuracy depends on accuracy of the propagation delay through various components of IoT network. If an IoT device uses PTP protocol, then it needs to update the TOD on regular time interval to eliminate any drift due to its clock. If IoT device uses an exactly accurate clock with good hold over then it can maintain the TOD when the IoT network is not available (due to jamming, spoofing and other technical problems) for updating the TOD.

c. Unidirectional messages: This is another technique an IoT device that communicates with IoT network can use to obtain TOD. In this method IoT network uses downlink unused subcarriers, cyclic prefix, system information, or unused messages to send the TOD to the IoT devices. IoT devices use the received TOD and adjust it with their time advanced or time alignment received from IoT network to have the same TOD. If one IoT device located at the transmitter RU) of the IoT network, then IoT devices TOD is the time of day at the transmitter of IoT network. If IoT network in its system information that it sends to IoT device includes its location coordinates, then an IoT device only requires to receive TOD and IoT network's location coordinates and then adjusts its TOD to the TOD at the antenna of IoT network transmitter by using the distance between IoT device and IoT network (distance obtained from location coordinates of IoT device and IoT network).

d. Master IoT device: in a plurality of IoT devices when one of the IoT devices is a master IoT device and remaining are slave IoT devices, the master IoT device may have capability to obtain TOD from IoT network, GPS and other IoT devices (master or slave) that are not attached to it. Therefore, slave IoT devices within the plurality of IoT devices obtain the TOD from master IoT device they are attached to. The exchange of TOD is done wired or wireless using PTP messages.

e. NPS: a component of NPS that provides monitoring of the environment is a plurality of IoT devices with one as a master IoT device and the rest slave IoT devices. Again, the master IoT device may have capability to obtain TOD from IoT network, GPS and other IoT devices (master or slave) that are not attached to it. Master IoT device shares the TOD with the controller of the NPS and slave IoT devices use PTP to obtain the TOD from the controller.

f. Blind search: This is the case when an IoT device can not access IoT network (IoT network is down, jammed, spoofed, out of reach, or do not have hold over capability), and does not have access to GPS satellite (no GPS receiver, GPS jammed or spoofed). Therefore, the only way to obtain time of day is from another IoT device that possesses TOD (through GPS receiver, holdover capability, or IoT network). The two methods to obtain time of day by the above IoT device are:

IoT device during operation loses access to the source of TOD for updating. IoT device uses the channels assigned to it for communication and monitors the environment to characterize the environment during a time window (time slot). It finds active IoT devices in the smart environment by receiving their signal (broadcast packet or Ethernet packet), measuring their RSSI, and retrieving their address, type, ERP, time of the day of their time stamp. Since ERP (effective radiation power) of the IoT devices is defined by IoT network, then from measured RSSI an approximate distance (IoT devices for monitoring the environment use ERP) between two IoT devices can be estimated. From time stamp and estimated distance time of day (TOD) can be estimated within good accuracy (less than 100 nanosecond). At this point IoT device has a reasonable TOD and can send an Ethernet packet to the other IoT device it used to obtain a temporary TOD and request for a more accurate TOD by exchanging protocol messages defined in FIG. 10C. The other option is to:

monitor the environment with the temporary TOD and during time windows (slots) with extremely low RSSI send a broadcast packet and request for TOD. This is done by the protocol shown in FIG. 10C.

Figure 10C:
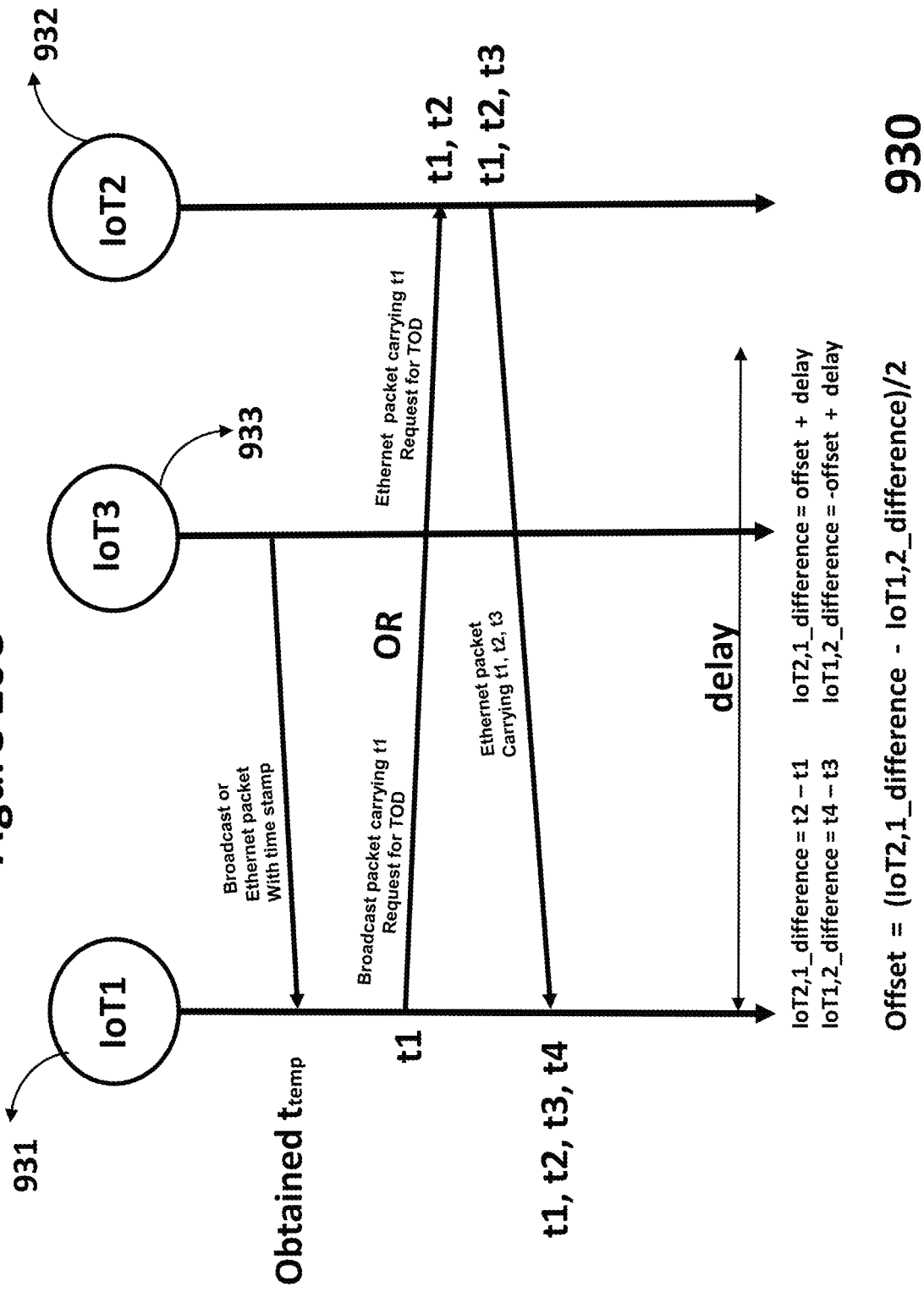
FIG. 10C shows a protocol to obtain time of day (TOD) using two IoT devices.

FIG. 10C shows protocol 930 to achieve clock synchronization and obtain time of day (TOD) by IoT1 device (object) 931 from IoT2 device (an object in the smart environment) 932. IoT1 device 931 has already obtained a temporary TOD from another IoT3 device based on a blind procedure. IoT1 device is aware of the frame, frame duration, its own time slot and absolute time. It is assumed that in any plurality of IoT devices all slave IoT devices obtain their TOD from master IoT device. In case of NPS slave IoT devices through NPS's controller obtain the OID and TOD. It is further assumed IoT1 device is a master IoT device that loses updating its TOD during operation (it does not have hold over capability or its hold over time finished). IoT1 device uses the temporary TOD (or its own TOD) which provides reasonable accuracy to send a broadcast (or Ethernet packet during a time slot with high RSSI) packet (ideally during its own time slot) with a time stamp t1 and request for clock synchronization and TOD. IoT2 device 932 (IoT2 device possesses accurate TOD and based on the information it retrieves from IoT1 device packet decides to exchange its accurate TOD with IoT1 device) receives the broadcast packet from IoT1 device 931, retrieves the packet address, records t2 when the TOD t1 arrived at its antenna port, and then sends an Ethernet packet that contains time of day t3 (time stamp) at the antenna port of IoT2 device 932, t2 (and optionally t1) to IoT1 device 931. IoT1 device 931 receives the Ethernet packet from IoT2 device 932, retrieves t3 from payload and records time of day t4 when t3 arrived at the antenna port of IoT1 device 931.

At this point IoT1 device 931 has 4 times t1, t2, t3 and t4 to calculate the time offset between IoT1 device 931 and IoT2 device 932. The distance or propagation delay between IoT1 device 931 and IoT2 device 932 do not change during this process (even if both IoT devices move) because this process happens in a short period of time. Therefore, t1, t2, t3 and t4 are used to estimate or calculate the time offset between IoT1 device 931 and IoT2 device 932.

$$\text{Time offset}=(t2-t1-t4+t3)/2$$

$$\text{Delay time}=(t2-t1+t4-t3)/2$$

Then time offset is used by IoT1 device 931 to adjust its time of day and its clock frequency to match IoT2 device 932. In method 930 the IoT device that seeks time of day (TOD) is aware of the frame structure, frame duration, its own time slot and absolute time. Once it obtains TOD from another IoT device in the smart environment it can continue its operation and continue maintaining its TOD using method 930. It should be noted that in this case the temporary TOD is accurate enough for continuation of operation. The reason for using method 930 is for the IoT device to confirm that it holds the accurate TOD. While IoT device uses temporary TOD or TOD obtained method 930 it also monitors to see if it can receive GPS receiver signal or can communicate with IoT network. Once IoT device maintains its communication with IoT network or obtains GPS signal, then it continues its operation as normal.

In case of sending Ethernet packet to request for TOD, the IoT device that seeks TOD is not aware of TOD, frame structure, frame duration and can not register with IoT network due to jamming, spoofing, and unavailability. It is also assumed that IoT device does not receive GPS signal to obtain TOD and location coordinates due to jamming, spoofing, and unavailability. However, IoT device is aware of the frequency and bandwidth available to it for ranging and sending broadcast and Ethernet packets.

IoT device uses its ranging frequency and channel to monitor the smart environment and detect broadcast or Ethernet packets from other IoT devices and measures their RSSI. Then IoT device uses the RSSI from another IoT device with highest value to estimate its distance from the other IoT device. The estimated distance defines the propagation delay between two IoT devices. IoT device also retrieves the address, TOD of the time stamp of the other IoT device at its antenna port, then adds the propagation delay time to the time stamp's TOD to estimate a temporary TOD (this TOD includes the receiver path delay). This temporary TOD is close to actual TOD. For more accurate TOD the IoT device can use protocol 930.

At this point, IoT device tries to retrieve time stamp of two consecutive broadcast packets from another IoT device and uses the TOD of two consecutive time stamps to calculate the frame duration. Of course, it is assumed here that IoT devices operating in the smart environment use time stamp for ranging in addition of other techniques (RADAR, LIDAR, CAMERA. etc.) used for ranging. It is also assumed that there is no stationary object in IoT device vicinity to obtain frame information from its broadcast or Ethernet packet. It is possible to obtain frame information from an moving object broadcast or Ethernet packet but this information from a stationary object is more reliable.

Since at this point IoT device still has no access to IoT network to obtain its absolute time and time slot, then it faces two options. One option is to wait until connection is resumed. A second option has two scenarios based on the object that uses the IoT device. If the object is stationary, then it receives broadcast and Ethernet packets from other IoT devices in the smart environment and stablishes if a moving object is approaching based on the RSSI of the received broadcast or Ethernet packet from the moving object's IoT device. If this is the case the stationary IoT device uses one of empty time slots (Time slot duration can be estimated by receiving broadcast or Ethernet packets from two adjacent time slots with reasonable RSSI. The time stamps from these two adjacent time slots are used to estimate the duration of the time slot) to send an Ethernet packet to the approaching moving object's IoT device and initiate a distance measurement. This measured distant is available to stationary object's IoT device and moving object's IoT device and allows the moving object's NPS takes appropriate action.

If the object is a moving object, then uses similar procedure explained above for the stationary object to estimate the duration of time slot. Once the moving object's IoT device estimates TOD, and time slot duration, then it can also figure out the structure of time slot. The moving object's NPS from the detected information data (DID) from its master IoT device and plurality of slave IoT devices retrieves the frame structure, frame duration, time slot structure, time slot duration, and time slots that are not used in the vicinity of the moving object. Moving object's NPS uses its artificial intelligent algorithm and detected information data to define the best operation information data (OID) for its master IoT device and plurality of slave IoT devices. This process continues until moving object's master IoT device resume communication with IoT network. If all IoT devices in their broadcast and Ethernet packet share the operation frame information (duration, start TOD of first frame, number of time slots within the operation frame, time slot duration, etc.) any IoT device that belongs to an object (moving, flying and stationary) can obtain operation frame information and time slot duration.

Figure 11:
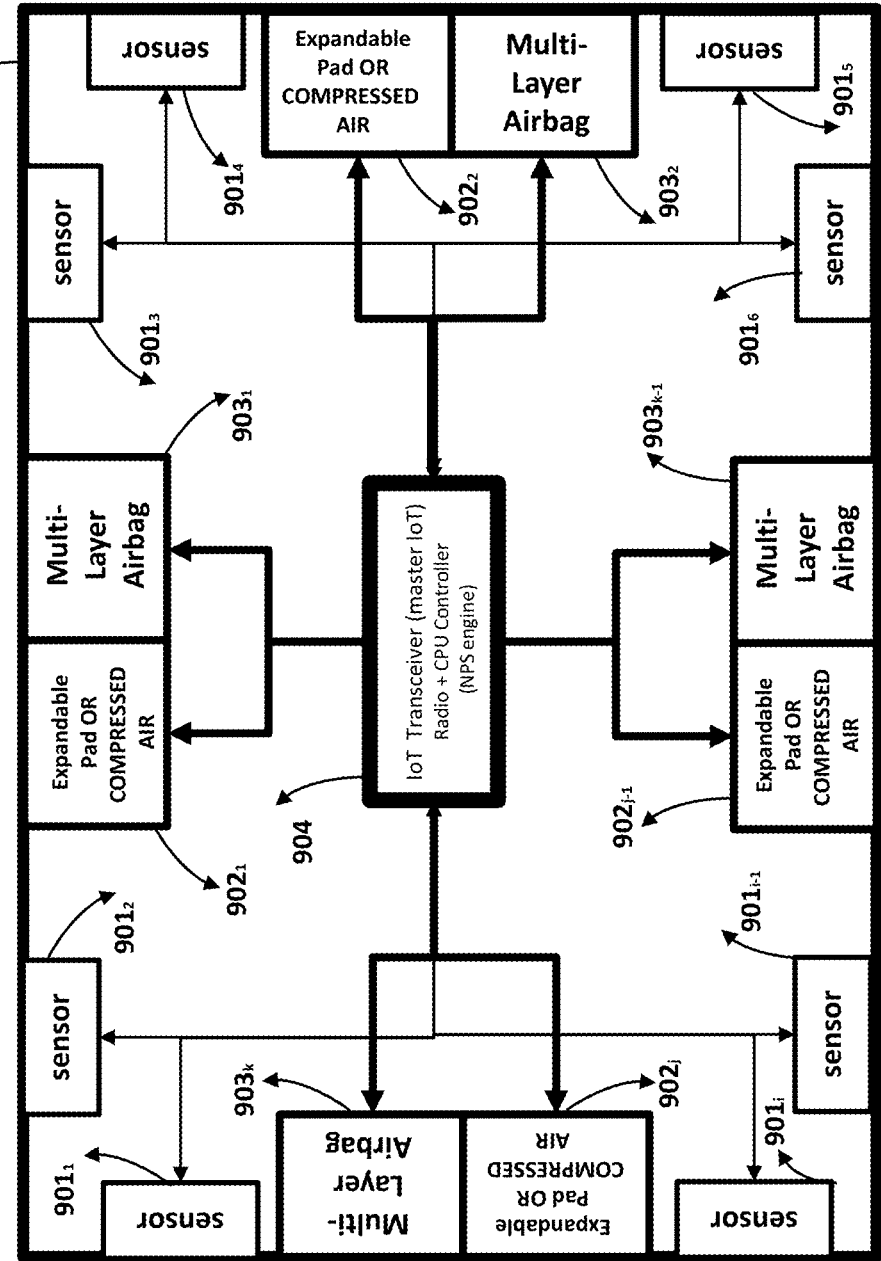
FIG. 11 depicts an IoT navigation and protection system for moving and stationary objects.

FIG. 11 illustrates an embodiment of a navigation and protection system (NPS) for vehicle/object (IoT device) 900. In general, the NPS for vehicle/object (IoT device) 900 performs navigation and provides external body protection by applying voltage to two ends of an expandable pad, and/or inflating a multilayer airbag, and/or releasing compressed air. The NPS through its IoT transceiver (master IoT device) 904 registers with an IoT network and receives an operation information data (OID) related to NPS's operation. NPS for vehicle/object (IoT device) 900 uses the OID from IoT network and detected information data (DID) from various sensors (including slave IoT devices) $901_1$ to $901_i$ to detect any malfunction of the vehicle/object (IoT device) 900 or approaching of any external objects that results in an impact. When NPS detects a potential impact based on its artificial intelligence algorithm analyses of the DID received from sensors (wireless sensor, internal sensors, internal devices, and slave IoT devices) $901_1$ to $901_i$, broadcasts its problem to the IoT network and activates one or more of the expandable pads/compressed air $902_1$ to $902_j$ or/and one or more of the multilayer airbags $903_1$ to $903_k$ to minimize the damage to the vehicle/object (IoT device) 900 due to impact. NPS also uses the received DID to navigate the vehicle/object (IoT device) 900 when no imminent impact is detected.

NPS for vehicle/object (IoT device) 900 includes, among other things, sensors $901_1$ to $901_i$ (including wireless sensors and slave IoT devices), IoT transceiver (master IoT device) 904, expandable pads/compressed air $902_1$ to $902_j$, and multilayer airbags $903_1$ to $903_k$.

In one embodiment the NPS acts as a standalone IoT device used by various objects.

In one embodiment the NPS obtains time of day (TOD) and calendar date directly or through the vehicle/object (IoT device) 900 that uses the NPS.

In another embodiment the NPS uses time of day to define a time for the operation of various sensors (including wireless sensors, and slave IoT devices) $901_1$ to $901_i$.

In one embodiment the sensors $901_1$ to $901_i$ are slave IoT devices to master IoT device 904 or wireless sensor.

In one embodiment, the vehicle/object (IoT device) 900 is a moving object, stationary object, or flying object.

In one embodiment of the NPS for vehicle/object (IoT device) 900, multiple expandable pads/compressed air $902_1$ to $902_j$ and multiple multilayer airbags $903_1$ to $903_k$ are mounted on all external sides of vehicle/object (IoT device) 900 to provide protection for impacts due to external objects at any external side of vehicle/object (IoT device) 900.

In one embodiment of the NPS for vehicle/object (IoT device) 900, the expandable pads/compressed air $902_1$ to $902_j$ and multilayer airbags $903_1$ to $903_k$ are mounted on the main body frame of the vehicle/object (IoT device) 900 to provide a firm and strong support.

In another embodiment of the NPS for vehicle/object (IoT device) 900, by activating expandable pads/compressed air $902_1$ to $902_j$ and/or multilayer airbags $903_1$ to $903_k$ before the impact occurs the impact force to vehicle/object (IoT device) 900 will be lowered due to absorption or diffraction and provides more protection to the passengers of vehicle/object (IoT device) 900.

In one embodiment of the NPS for vehicle/object (IoT device) 900, one or more of the multilayer airbags $903_1$ to $903_k$ at one or multiple sides of the vehicle/object (IoT device) 900 is inflated to protect the external of vehicle/object (IoT device) 900 from fall, crash, or impact with an external object.

In one embodiment of the NPS for vehicle/object (IoT device) 900, one or more of the expandable pads/compressed air $902_1$ to $902_j$ at one or multiple sides of the vehicle/object (IoT device) 900 is activated by releasing compressed air or/and applying voltage to two ends of expandable pad to protect the external of vehicle/object (IoT device) 900 from fall, crash, or impact with an external object.

In one embodiment of the NPS for vehicle/object (IoT device) 900, IoT transceiver (master IoT device) 904 resets, and configures itself based on configuration data stored in its memory and then starts to execute artificial intelligence algorithm executable software which controls all aspects of navigation and protection of the vehicle/object (IoT device) 900 using the DID provided by all monitoring devices or/and sensors (including wireless sensors or slave IoT devices) $901_1$ to $901_i$.

In one embodiment of the NPS for vehicle/object (IoT device) 900, multiple monitoring devices or sensors (wireless sensors, or slave IoT devices) $901_1$ to $901_i$ are distributed at various locations internal and external to vehicle/object (IoT device) 900 and each has a unique IP address (or MAC address) which is used to communicate with the IoT transceiver (master IoT device) 904 to avoid collision or confusion of the detected information data received by the controller CPU (NPS engine controller processing unit) of the IoT transceiver (master IoT device) 904 from the sensors internal or external to the vehicle/object (IoT device) 900.

In one embodiment of the NPS for vehicle/object (IoT device) 900, the monitoring devices or sensors (wireless sensors, or slave IoT devices) 901$_1$ to 901$_i$ can be at least one of an image sensor, a wireless sensor, a Radar, a Camera, a heat sensor, a speed sensor, an acceleration sensor, a proximity sensor, a pressure sensor, a G (gravity) sensor, an IR (infrared), Lidar sensor, ultrasonic sensor, laser and others.

In one embodiment of the NPS for vehicle/object (IoT device) 900, a wireless sensor (slave IoT device) transmits (records completion of transmission at input of transmit antenna port) a coded signal similar to a unique identity code signal or a unique IP address signal and receives (record the completion of reception at receive antenna port) a reflected signal of the unique identity code signal, or the unique IP address signal from objects in surrounding environment of the vehicle/object (IoT device) 900 to avoid collision.

In another embodiment of the NPS for vehicle/object (IoT device) 900, the wireless sensor (salve IoT device) uses the time of completion of transmission of the unique identity code signal or the unique IP address signal at its transmit antenna port and the time of completion of the reception of the reflected signal of the unique identity code signal or the unique IP address signal at its receive antenna port to estimate free space traveling time of the unique identity code signal or the unique IP address signal to calculate a distance and an approaching speed of an object in the surrounding environment of the vehicle/object (IoT device) 900.

In one embodiment of the NPS for vehicle/object (IoT device) 900, the wireless sensor (slave IoT device) uses a time stamp (time of day) received from wireless sensor (slave IoT device) of a NPS that belongs to another vehicle/object (IoT device) to estimate the distance between the two vehicles/objects (IoT devices).

In one embodiment of the NPS for vehicle/object (IoT device) 900, the wireless sensor (slave IoT device) uses time of day (time stamp) of a broadcast packet at the antenna port of transmitter of the wireless sensor (slave IoT device) of a NPS that belongs to another vehicle/object (IoT device) and the time of day its own receiver receives the broadcast packet (time stamp) at its receiver antenna port to estimate the free space traveling time of the time stamp in the broadcast data. Then the free space traveling time is used to calculate the distance between the two vehicles/objects (IoT devices).

In another embodiment, the wireless sensor (slave IoT device) uses one IP (MAC) address to communicate with IoT transceiver (master IoT device) 904 and a second IP address for transmitting a unique IP address signal over the air to monitor objects in surrounding environment.

In another embodiment, the wireless sensor (slave IoT device) uses a single IP4 or IP6 address for both communicating with IoT transceiver (master IoT device) 904 and transmitting a signal over the air.

In one embodiment of the NPS for vehicle/object (IoT device) 900, IoT transceiver (master IoT device) 904 communicates with at least one of a cellular network or IoT network (4G, 5G and beyond, 6G, 7G), a WiFi network, and a private network to provide its own information data to the network and obtain an information data about other objects in its surrounding environment.

In one embodiment of the NPS for vehicle/object (IoT device) 900, the IoT transceiver (master IoT device) 904 supports IEEE1588 to obtain time of day (TOD) from at least one of a cellular base station or IoT network (4G, 5G and beyond, 6G, 7G), a WiFi network, and a private network.

In one embodiment of the NPS for vehicle/object (IoT device) 900, in order to avoid collision, at least one of a cellular base station or IoT network (4G, 5G and beyond, 6G, 7G), a WiFi router, and a private network broadcasts to vehicle/object (IoT device) 900 a channel, a frequency, a modulation, and an absolute time with a time slot duration when its wireless sensors (slave IoT devices) can transmit the unique IP address signal (or FMCW Radar/Lidar signal, ToF Lidar) and receive the reflected unique IP address signal (or FMCW Radar/Lidar signal, ToF lidar) from various objects in the surrounding environment in order to measure a distance and an approaching speed of various objects.

In one embodiment of the NPS for vehicle/object (IoT device) 900, to avoid collision, at least one of a cellular base station or IoT network (4G, 5G and beyond, 6G, 7G), a WiFi router, and a private network broadcasts to vehicle/object (IoT device) 900 a channel, a frequency, a modulation, and an absolute time with a time slot duration when its wireless sensor (slave IoT device) can broadcast its information data.

In another embodiment of the NPS for vehicle/object (IoT device) 900, the wireless sensor (slave IoT device), over the air, broadcasts information data that includes a time stamp indicating time of day, a method the time of day was obtained (IEEE1588, cyclic prefix, downlink unused subcarriers, downlink channels unused bits/messages or GPS), type of the vehicle/object (IoT device) 900, location coordinates (obtained from GPS receiver), function of the object, status of the object, specification of object, the identity number or IP (media access control MAC) address of wireless sensor (slave IoT device), signal propagation time through transmitter of the wireless sensor (slave IoT device) up to the input of transmit antenna, and estimated mass of the vehicle/object (IoT device) 900. If the object is a traffic light, then its color (green, yellow, red) indicates the status of the object.

In one embodiment of the NPS for vehicle/object (IoT device) 900, two or more type of sensors (IoT wireless sensor, Radar, Lidar, Camera, ultrasonic sensor, laser, and Image sensor) can be used to better monitor the surrounding environment of the vehicle/object (IoT device) 900 and calculate and estimate parameters of the surrounding environment. All wireless sensing devices operate during the time slot assigned to NPS for vehicle/object (IoT device) 900 by SOMC through IoT network.

In one embodiment of the NPS for vehicle/object (IoT device) 900, an image sensor or Lidar (FMCW or Time-of-Flight) is used to monitor the vehicle/object (IoT device) 900 surrounding environment, and independently calculate and estimate a distance and an approaching speed of an object in the surrounding environment.

In one embodiment of the NPS for vehicle/object (IoT device) 900, using typical objects in an environment an image verification database and a distance calibration database that relates the size of the image to distance of the object from the image sensor is created and stored in memory of the image sensor.

In one embodiment of the NPS for vehicle/object (IoT device) 900, a wireless sensor (slave IoT device) and an image sensor, and/or Lidar are used to monitor the vehicle/ object (IoT device) 900 surrounding environment, and each independently calculate and estimate a distance and an approaching speed of the objects in its surrounding environment and use the information data to make a better decision (by the artificial intelligence algorithm) to activate one or more multilayer air bags and/or expandable pads/compressed air.

In another embodiment, the vehicle/object (IoT device) 900 can be an automobile, a robot, a flying car, a small plane, a drone, a glider, a human, or any flying and moving vehicle/device/object/equipment.

FIGS. 12A and 12B illustrate two typical street or roads 940. FIG. 12A shows a road with center barrier 946 and curb 942 at both side of the road. The road shows two lanes at each direction, but it can have one lane or more than two lanes at each direction. FIG. 12B shows a road or street that has no center barrier. In each direction it can have one or more lanes. In both FIGS. 12A and 12B the lanes are separated with lines 944 and 951. Lane lines in FIGS. 12A and 12B also can come with stud reflectors 945 and 952. Both roads shown in FIGS. 12A and 12B may also use stud reflectors 943, 950, and 947 along the side curbs 943, 949 and middle barrier 946. The spacing between studs can be equal or different and depends on terrain topography.

The above type of roads is also used outside the cities or used to link states, towns, cities, and villages. When they are used for linking, the roads may not have the side curbs. When the roads 940 do not have side curbs studs 943 and 950 may have some distance from the side lanes.

The studs (curb side, center barrier, and lane lines) in addition to being used as reflectors they can also act as fixed objects in the object control system (OCS). In OCS, studs are IoT devices that assist moving objects navigation and protection system. The stud IoT devices need to be exceptionally low in cost. Therefore, not all stud IoT devices communicate with IoT network and only limited stud IoT devices (master) communicate with IoT network to obtain TOD and operation information data (OID). The stud IoT devices (masters) that communicate with IoT network are at locations that receive strong signal from IoT network and need lower transmit power to communicate with IoT network. Stud IoT devices that do not communicate with IoT network are slave to the master stud IoT devices. The slave stud IoT devices are daisy chained to the master stud IoT devices and receive their OID from master stud IoT devices. The studs IoT devices are powered with solar energy individually or from a larger solar panel that can power several studs IoT devices. They can also be powered by other means.

A master stud IoT device receives one or more time slot with their associated absolute times. The number of slave stud IoT devices that are attached to a master stud IoT device is much higher than the number of time slots assigned in OID to the master stud IoT device. Master stud IoT device uses the time slots and creates a specific OID with one of the time slots and its absolute time for each slave stud IoT device. This specific OID has a schedule that depending on the environment does not allow two or more adjacent slave stud IoT devices transmit at the same time using the same time slot. Even if master stud IoT device is assigned only one time slot, by using the frame duration (use one or more adjacent frame) it can create a specific OID for each slave stud IoT device in a way that two or more adjacent slave stud IoT device do not transmit at the same time during the same frame duration. This way none of slave stud IoT devices transmit at the same time. In these specific OIDs the effective radiation power (ERP) also could be different but within acceptable and pre-defined threshold. Therefore, master stud IoT device uses operation frame, time slot, absolute time to create specific OID. Two specific OID can have time slots in two operation frame which may be adjacent or not adjacent.

The radiation pattern of the stud IoT device that are located on side curbs 943 and 950 is towards the approaching moving objects 941 and 948. The same applies to stud IoT devices that are located on lane lines in FIG. 12A with a center barrier 946. The stud IoT devices 947 used by center barrier can have an Omni-directional radiation pattern or a radiation pattern that supports moving objects approaching them from both directions. The barrier type of radiation pattern is also applied to stud IoT devices 952 used by lane lines in FIG. 12B.

Stud IoT devices in their broadcast packet share a lot of information with other IoT devices. The information in a stud IoT device as well as some other IoT devices are, number of slave stud IoT devices supported with a master stud IoT device, Location coordinates of stud IoT device, density of Fog, speed limit, road barrier stud, road side stud, number of lanes in each direction, distance to a road curb, time stamp, distance to traffic light, animal crossing, type of road (freeway, dual carriage, single lane, bridge, overpass, two levels, etc.) number of road lane on the left or right side in each direction, emergency lane, distance to next exit, traffic bump, color of traffic light, time left to change the color of traffic light, height of tunnel, width of the tunnel. Length of the tunnel, distance to tunnel, number of lanes in the tunnel in each direction, no right turn when traffic light is red, slippery road, lane closed, diversion, snowing, black ice, heavy rain, raining, slope of the road, type of turn ahead, speed limit for the turn, hill or mountain at left or right of the road, valley at left or right of the road, animals on the road, downhill, uphill, type of stud (side of road, road barrier, first lane from left, second lane from left, . . . , first lane from right, second lane from right, etc.), rock fall, landslide, mudslide, avalanche, debris fall, rockslide, construction, blockage, caved in. For broadcasting these data, a "N" digit code can be used. For some data following the code a value is broadcasted like speed limit. Some of the above information data are also collected by various sensors that are used by master stud IoT device as well as slave stud IoT devices. The information data collected by these sensors are send to SD to be stored and will be updated on regular time intervals. SD also have access to the above information from other sources that monitor the weather, traffic, and status of roads.

SD stores the information data about the detail map of environment, terrain type of the area stud IoT devices (master or slave) and any IoT device (master or slave) that operates within OCS. SOMC determines the OID for an IoT device (master, slave, and stud) based on the map, type of terrain the IoT device operates in, and type of IoT device (IoT device used by NPS, stud IoT device, and type of object using the IoT device).

Figure 12C:
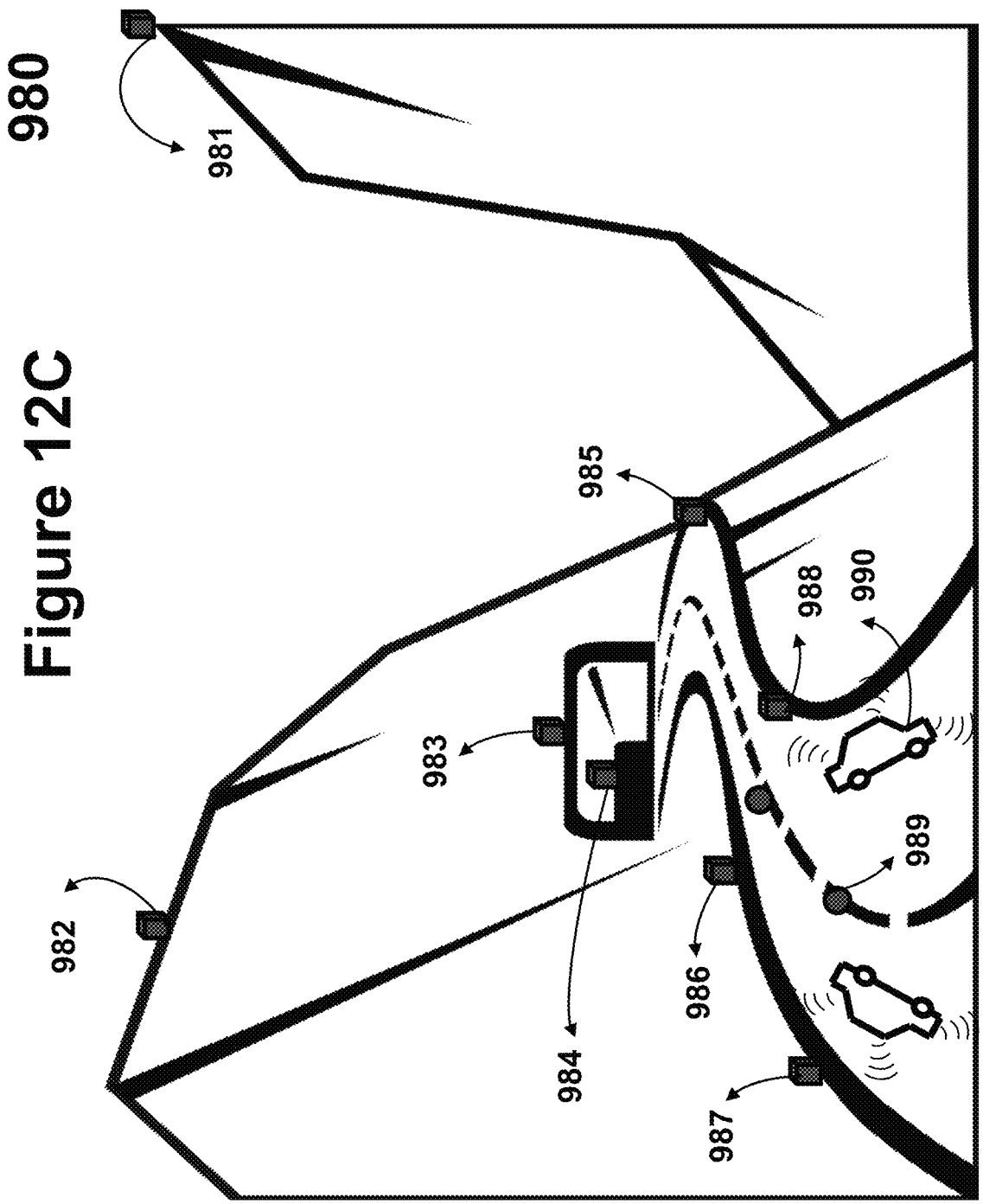
FIG. 12C shows a typical country road in mountainous area.

FIG. 12C shows a typical country road in mountainous area 980. The road in mountainous area 980 is a single lane, two lanes (one in each direction) with or without center barrier, 3 lanes (one in one direction and two in another direction) with or without center barrier, four lanes (two in each direction) with or without center barrier, and any freeway with multiple lanes and center barrier.

An IoT device (master IoT device) used by a moving vehicle in certain mountainous roads and tunnels does not receive signal from IoT network and/or GPS. There are scenarios that IoT device cannot consistently see four satellite to obtain time of day, and location coordinates. In this scenario the stud IoT devices (mainly the master stud IoT device) used by lane lines, center barrier, and roadsides also receive no signal or extremely low signal from IoT network and GPS. These stud IoT devices are fixed IoT devices and when they are in mountainous areas or tunnel with no or week GPS and IoT network signal they do not have any operation information data (OID) to operate and provide information for a moving vehicle's navigation and protection system (NPS).

When a moving vehicle's IoT device (master IoT device) does not have access to GPS and/or IoT network, unless it has an exactly accurate clock with sufficient hold over it is possible to lose TOD before getting out of a blind mountainous area or a tunnel. It will not be able to update its location coordinate with the shared data base (SD) to be used by shared operation and management center (SOMC) to provide updated OID for the moving vehicle. In this scenario there are two options available to the moving vehicle, one is use of manual mode for its operation and the other is to operate by relying on less information that its sensors obtain from environment. The second option may be OK inside a blind tunnel but it is highly risky when the road is alongside a cliff.

The above problems and limitation can easily be avoided or cured by using various methods or solutions for GPS and IoT networks. These methods and solutions are:

IoT Network g. Use repeaters or relays at high elevation on top of mountains that receives strong signal from IoT network and relay it towards mountainous road (any type of road explained earlier) and tunnels to provide high IoT network signal level for moving vehicles, flying objects and the distributed antenna system (DAS) that provides coverage within the tunnels. DAS for tunnels is an organization of spatially placed antennas, coax, and splitters that provide radio frequency (RF) coverage within a structure or geological area that does not have adequate signal levels. Using this technique moving objects, flying objects, stationary objects, and fixed objects in mountainous areas with or without tunnels can communicate with IoT network to obtain TOD and OID which contains operation information from SOMC. It also allows the above objects to update their information data in SD.

h. A second approach is to install several grandmasters IoT devices powered by solar cell at the top of surrounding mountains to communicate with IoT networks to register, obtain TOD and receive the operation frame structure and an OID. All stationary and fixed objects in the mountainous roads cannot communicate with IoT network. However, one of these grandmaster IoT devices can be assigned to several of the stationary and fixed IoT devices as their master IoT device to provide them with TOD and OID. If a moving object or flying object powers up in a mountainous area after a period of power down it can also use one of the grandmasters IoT devices on the top of mountains as a master IoT device, register with IoT network, obtain TOD, and OID. However, a moving object during power down usually saves and maintains its OID and may only need to obtain TOD from a grandmaster IoT device on top of mountains (in case its hold over time for the TOD is finished) and continue operating its NPS until gets out of the blind area and register again with IoT network and update its location coordinates (when it has access to GPS satellites). Grandmaster IoT devices have a fixed location coordinate, have GPS receiver, and may have sufficient hold over time when GPS signal not available. A grandmaster IoT device's location coordinates may be used for stationary as well as moving objects. A grandmaster IoT device can adjust its location coordinates by its distance from stationary and moving objects (as well as elevation) and report it to IoT network as the object's location coordinates.

The country road and mountainous road 980 shown in FIG. 12C has very tall mountains either side, a cliff next to the road which ends up in a valley, and a tunnel going through the mountains. The road has two lanes one in each direction. The reflector studs on the lane lines and the side curb studs act like FIG. 12B. In FIG. 12C there is a cliff on one side of the road which makes it essential to have side curb Stud IoTs 988 and 985 for better navigation of the moving object 990. It is also essential to have side curb Stud IoTs 986 and 987 on mountain side to achieve better navigation of moving objects. The lane line Stud IoTs 989 radiate like the lane line stud IoTs in FIG. 12B to help navigation of moving object in both direction of the road. Side curb stud IoTs 986 and 988 as well as lane line IoT stud 989 acts as master stud IoTs and support several slave side curb stud IoTs and lane line stud IoTs. The time slots in an operation frame and OID assigned to the side curb stud IoTs and lane line stud IoTs by SOMC is based on the information related to the map of the road stored in SD. More than one time slots and their absolute times within said operation frame may be assigned to the master curb stud IoT, the master lane line stud IoT as well as the master center barrier stud IoT if any exist.

IoT devices 981 and 982 at the top of the mountain act as both Grandmaster IoT devices and IoT network relays. When act as grandmaster they need to have GPS receiver with high holdover time for times that GPS signal is not available for any reason. Grandmaster IoT devices 981 and 982 also store a lot of the information of SD, and SOMC for when IoT network cannot be accessed. Therefore, grandmaster IoT devices 981 and 982 act as provider of TOD when GPS signal is not available and as SD/SOMC when IoT network is not available.

The stationary IoT device at the top of the entrance of the tunnel 983 in FIG. 12C communicates with grandmaster IoT devices 982 and 980 (when they act as grandmaster IoT devices) to register with IoT network, obtain TOD and OID. Then IoT device at top of the entrance of the tunnel 983 (as a master IoT device) propagates the TOD and OID or specific OID to stationary IoT devices 984 inside the tunnel that are slaved to it.

Figure 13:
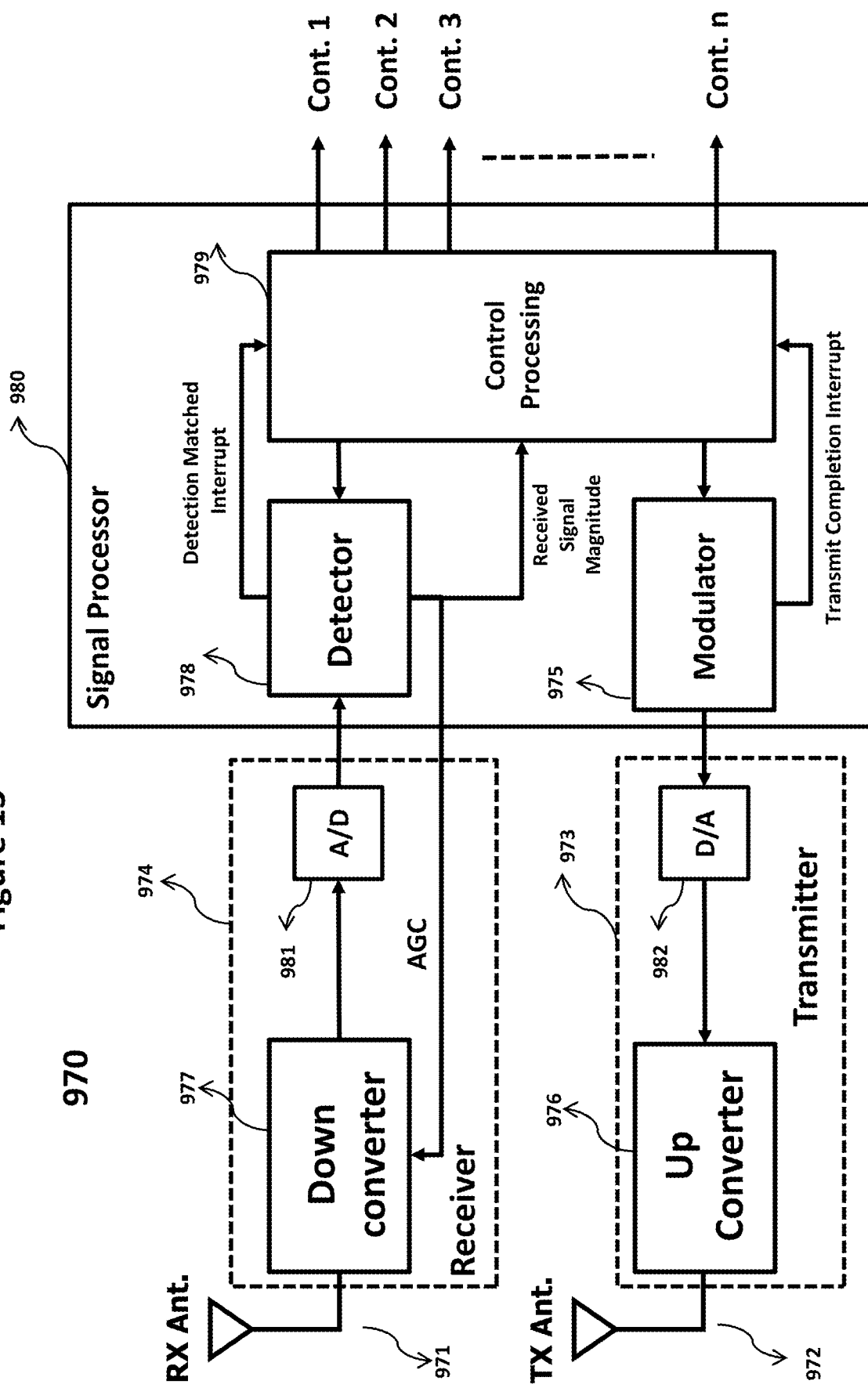
FIG. 13 depicts an embodiment of a wireless sensing system.

FIG. 13 depicts an embodiment of wireless sensor system 970 (or IoT device 400). In general, wireless sensor system 970 (or IoT device 400) facilitates estimation and calculation of certain environment's parameters by transmitting a coded signal like a unique IP address (or a broadcast, Ethernet frame or packet) signal generated or selected by a control processor 979 through a modulator 975, a transmitter 973 and antenna 972 and then receiving the attenuated version of reflected coded signal (or a broadcast and Ethernet frame or packet) by an antenna 971, receiver 974 and detector 978. For example, control processor 979 selects an IP address pattern from a pool of IP addresses (or a broadcast and Ethernet frame or packet), send it to modulator 975 for modulation then the modulated signal is sent to transmitter 973 to be converted to analog signal by digital-to-analog (D/A) converter 982 and up converted to carrier frequency by up convertor 976 for transmission through antenna 972. The modulator 975 also sends the time of completion of modulation to control processor 979. Then the reflected transmit (a broadcast or an Ethernet frame or packet) signal from an object in the environment is received by antenna 971 and receiver 974, where it is down converted by down convertor 977 and converted to digital signal by analog-to-digital (ND) converter 981. The digitized received signal is processed in signal processing unit 980, where it is detected by detector 978 and detection time is sent to control processor 979. The digitized down converted received signal also facilitates measurement of received signal strength intensity (RSSI) to provide to control processor 979.

Wireless sensor system 970 (or IoT device 400) includes, among other things, signal processor 980, transmitter 973, transmit antenna 972, receive antenna 971, and receiver 974.

In one embodiment, signal processor 980, transmit antenna 972, transmitter 973, receive antenna 971, and receiver 974 are components of wireless sensor system 970 (or IoT device 400) that could be used for various applications. For example, it can be used to communicate with a cellular network (4G, 5G, 6G and beyond), a private network, a WiFi network, transmit and receive a broadcast frame or packet, transmit and receive an Ethernet frame or packet, communicate with the cloud, etc.

In one embodiment, wireless sensor system 970 (or IoT device 400) receives information about its surrounding environment which includes various objects and their types from the cellular network (4G, 5G, 6G and beyond), the WiFi network or the private network. Wireless sensor system 970 (or IoT device 400) also receives an IP address to use for its operation or a pool of IP addresses it can store and use as needed.

In another embodiment, wireless sensor system 970 (or IoT device 400) uses GPS to obtain time of day, clock synchronization and location coordinates.

In one embodiment, wireless sensor system 970 (or IoT device 400) uses IEEE1588 and through the cellular network (4G, 5G, 6G and beyond), the WiFi network, the private network, or another wireless sensor system (or IoT device 400) obtains time of day and clock synchronization.

In another embodiment, wireless sensor system (or IoT device 400) 970 uses IEEE1588 PTP to obtain clock synchronization (syncE also can be used for clock synchronization) and time of day from a central CPU (controller processing unit) controller that it communicates with.

In another embodiment, wireless sensor system (or IoT device 400) 970 obtains its IP (MAC) address from a central CPU controller that it communicates with.

In another embodiment, wireless sensor system 970 (or IoT device 400) receives an absolute time for its activity such as transmission, reception, communication, and broadcasting from the cellular network (4G, 5G, 6G and beyond), the WiFi network, the private network, or the central CPU (controller processing unit) controller that it communicates with.

In one embodiment, wireless sensor system 970 (or IoT device 400) communicates its information and parameters to the cellular network (4G, 5G, 6G and beyond), the WiFi network, the private network, or the central CPU controller that it communicates with.

In one embodiment, wireless sensor system 970 (or IoT device 400) receives an information data from its surrounding environment which is updated in real time from the cellular network (4G, 5G, 6G and beyond), the WiFi network, the private network, or the central CPU controller that it communicates with.

In one embodiment, wireless sensor system 970 (or IoT device 400) broadcasts its information data to other wireless sensors (or IoT devices) that belong to various moving or stationary objects in its surrounding environment.

In another embodiment, wireless sensor system 970 (or IoT device 400) fragments its transmit signal to two or more fragment signals, transmits each fragment signal and receives the reflection of each fragment signal from various objects in its surrounding environment before transmission and reception of next fragment signal.

In one embodiment, wireless sensor system 970 (or IoT device 400) supports WiFi, Bluetooth, Zigbee or any other over the air protocol as well as physical layer.

In another embodiment, wireless sensor system 970 (or IoT device 400) is used for other applications and transmits and receives Ethernet frames over the air.

In one embodiment, signal processor 980 that processes both transmit and receive signals comprises of control processor 979, modulator 975, and detector 978.

Signal processor 980 processes an information data transmitted from transmitter 973 through antenna 972 and an information data received from receiver 974 through receive antenna 971. The signal processor 980 also provides gain control for receiver and facilitates change of transceiver operating frequency, channel, and modulation. Signal processor 980 typically utilizes appropriate hardware and software algorithm to properly process the information data.

Wireless sensor system 970 (or IoT device 400) can be any wireless transceiver that is able to wirelessly transmit communication signals. Wireless sensor system 970 (or IoT device 400) is disposed on any physical platform that is conductive to effectively transmit the signals.

In one embodiment, communications through wireless system 970 (or IoT device 400) are by a transmit antenna 972 and a received antenna 971. Transmit and receive antennas are physically separated to provide sufficient isolation between transmit and receive antennas. The transmit antenna 972 and the received antenna 971 can also be common or one antenna.

In one embodiment, communication through wireless system 970 (or IoT device 400) is by a single antenna. In general, at any specified period the antenna is selected by a switch and/or a circulator.

Signal Processor 980 has a variety of functions. In general, signal processor 980 is utilized for signal processing, calculation, estimation, activities, methods, procedures, and tools that pertain to the operation, administration, maintenance, and provisioning of wireless sensor system 970 (or IoT device 400). In one embodiment, signal processor 980 includes a database that is used for various applications. The database can be utilized for analyzing statistics in real-time.

Signal processor 980 also has a variety of thresholds. In general, signal processor 980 provides controls to various components that are connected to it. Moreover, signal processor 980 is a high-capacity communication facility that connects primary nodes.

In one embodiment, the wireless sensors system 970 (or IoT device 400) uses microwave, or milli-metric (from 10 GHz to 80 GHz or higher frequencies) wave transceiver.

In one embodiment, wireless sensor system 970 (or IoT device 400) is controlled by control processor 979. The control processor 979 controls a transmit signal duration and number of times the transmit signal is transmitted. Control processor 979 also coordinates the transmit time and receive time.

In one embodiment, the wireless sensor system 970 (or IoT device 400) can be used for body armors, automobile, robots, drone, and any other stationary, flying, and moving object/equipment.

Figure 14A:
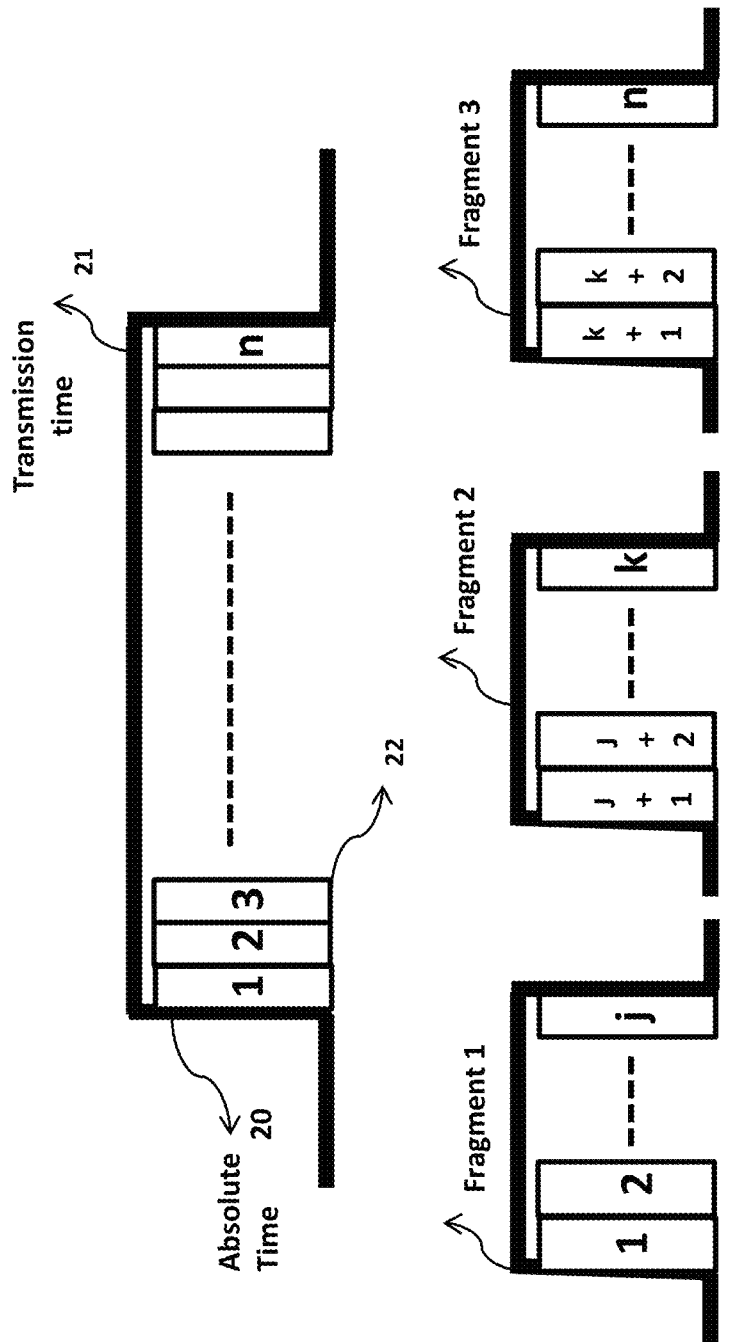
FIG. 14A depicts transmit signal for a wireless sensor system.

FIG. 14A depicts an embodiment of transmit signal for wireless sensor system 970 shown in FIG. 13 (or IoT device 400 shown in FIG. 4) The transmit signal has a transmission time (duration) 21 and a bit pattern 22. Pattern 22 can be a unique identity code, a unique IP address, a random pattern, an entire broadcast frame or packet, and an entire Ethernet frame or packet which is generated by control processor 979.

In one embodiment of wireless sensor system 970 used in a NPS of a moving or flying vehicle/object defined in FIG. 11, the pattern 22 is assigned to wireless sensor system at manufacturing when it is used for ranging.

In one embodiment of wireless sensor system 970 (or IoT device 400 shown in FIG. 4), the random pattern 22 (when it is used for ranging) may be changed after being used a few times based on the artificial intelligence algorithm in the controller 979. The change of transmit pattern 22 signal is for avoiding any collision or false detection from other signals in the surrounding environment.

In one embodiment of wireless sensor system 970 (or IoT device 400 shown in FIG. 4), the transmit signal 22 (when it is used for ranging) is an IP address (or identity code) unique to a NPS using the wireless sensor 970 (or IoT device 400 shown in FIG. 4) The IP address (or identity code) can be assigned to wireless sensor 970 at manufacturing, in the field by the user, each time the wireless sensor system 970 transmits and performs ranging. The IP address (or identity code) can also be taken from a pool of IP addresses (or identity codes) stored in the control processor 979 (or IoT device 400 shown in FIG. 4) memory or a removable memory card which can be like a subscriber identity module (SIM) card.

In one embodiment of wireless sensor 970 (or IoT device 400 shown in FIG. 4), the transmit pattern duration 21 depends on the number of bit pulses in the transmit signal pattern, carrier frequency, bandwidth, and modulation level. The higher the number of bits in transmits identity code, IP address, random pattern, or broadcast (Ethernet) frame or packet the longer the transmit signal duration.

In one embodiment of wireless sensor 970 (or IoT device 400 shown in FIG. 4), the number of bits in the pattern 22 defines the accuracy of the receiver detection (when it is used for ranging).

In another embodiment, the transmit bit pattern 22 is fragmented to smaller bit patterns, shown in FIG. 14A, to allow use of lower carrier frequency, less bandwidth, or lower-level modulation.

In one embodiment, wireless sensor system 970 (or IoT device 400 shown in FIG. 4) transmits the first fragment with "j" bits, receives the reflected transmit signal from objects in surrounding environment of wireless sensor system 970, then transmit the second fragment with "k-j" bits, and finally transmits the last fragment with "n-k" bits and receives the reflected transmit signal from objects in surrounding environment of wireless sensor system 970 for detection of the transmit bit pattern.

In another embodiment, the fragment bit patterns can have equal number of bits, or different number of bits.

In one embodiment of wireless sensor system 970 (or IoT device 400 shown in FIG. 4), the start of transmission time 21 or start of first bit in bit pattern 22 is an absolute time 20 configured in the controller. This absolute time is derived from the TOD wireless sensor system 970 (or IoT device 400 shown in FIG. 4) obtains from GPS receiver, a cellular network (4G, 5G, 6G and beyond), a WiFi network, a private network, or a central controller that it communicates with. The absolute time can also be sent to wireless sensor 970 (or IoT device 400 shown in FIG. 4) by the cellular network (4G, 5G, 6G and beyond), the WiFi network or the private network. The absolute time can be first microsecond in a millisecond, or the nth microsecond after the start of a millisecond.

In addition to absolute time the cellular network (4G, 5G, 6G and beyond), the WiFi network or the private network assigns to the wireless sensor 970 (or IoT device 400 shown in FIG. 4) a time slot that starts from the absolute time and has a duration which is equal for all objects that use wireless sensor 970 in the environment. The time slot duration assigned to the objects using wireless sensor 970 can also be different.

In one embodiment, the absolute time can be any nanosecond within a microsecond period, such as $1^{st}$ nanosecond, kth nanosecond, nth nanosecond, etc.

In one embodiment of wireless sensor 970 (or IoT device 400 shown in FIG. 4), the time of day obtained from GPS receiver or from the 4G, 5G, 6G, the WiFi network or the private network using IEEE1588 has accuracy within a few nanosecond, fraction of microsecond, or fraction of nanosecond.

In one embodiment, the time of day obtained from GPS receiver or from the 4G, 5G, 6G, the WiFi network or the private network using IEEE1588 is based on Coordinated Universal Time (UTC).

In another embodiment, an absolute time, and time slot used for broadcasting by wireless sensor 970 (or IoT device 400 shown in FIG. 4) in the smart environment 800 defined in FIG. 8 helps to avoid any collision when various objects broadcast their information.

Figure 14B:
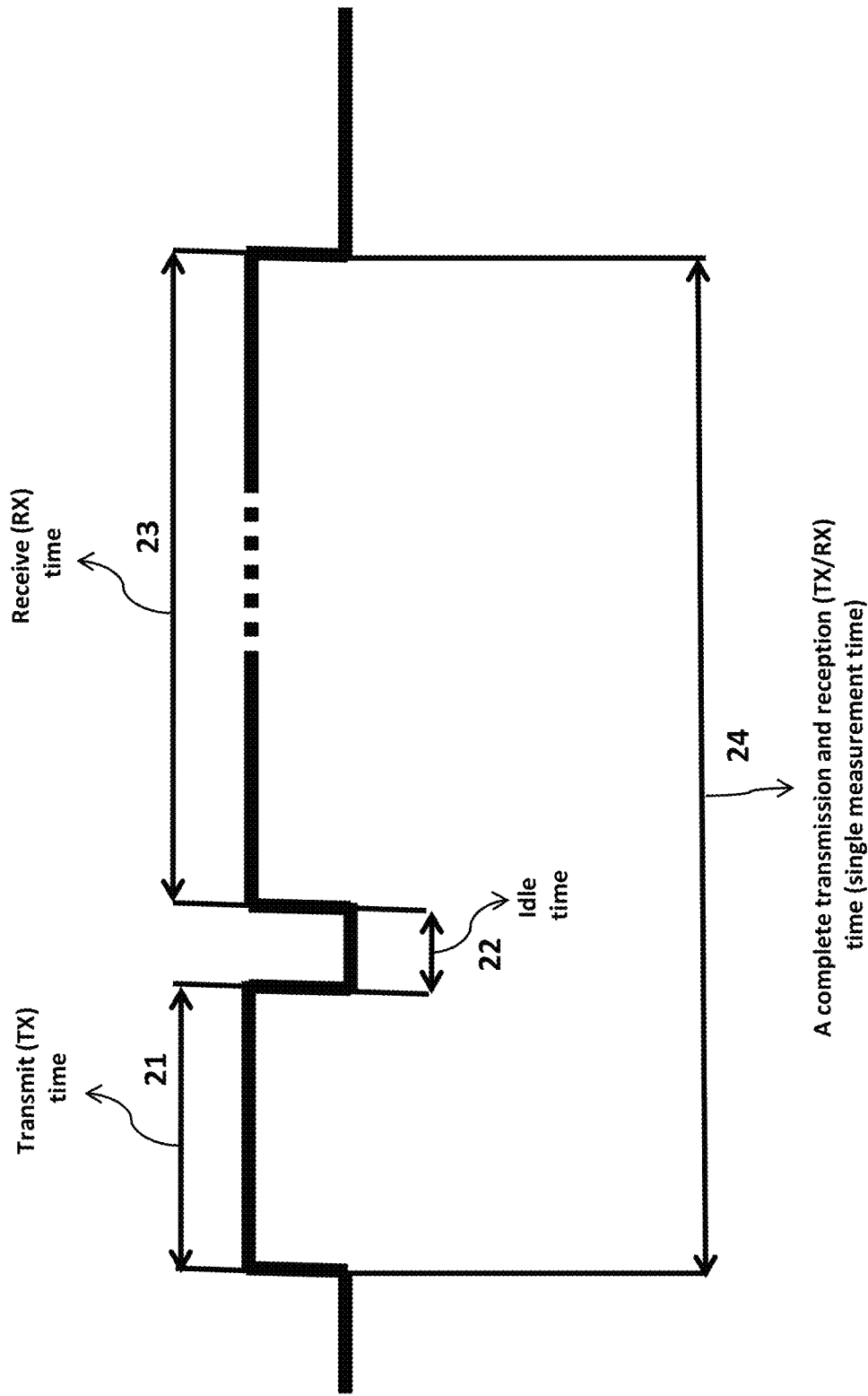
FIG. 14B shows the duration of a complete single transmission and reception.

FIG. 14B shows the duration of a complete single transmission and reception (single measurement time) 24 for wireless sensor system 970 (or IoT device 400 shown in FIG. 4) when it is used for ranging. The complete transmission and reception duration comprises of the transmit time (duration) 21, idle time (duration) 22 and receive time (duration) 23.

In one embodiment of wireless sensor system 970 (or IoT device 400 shown in FIG. 4), the idle time 22 is zero. The idle time can vary based on proximity of an object to wireless sensor system 970 in its surrounding environment. The closer the object the smaller the idle time 22 is. In most circumstances the idle time is zero and after completion of transmission the wireless sensor system 970 (or IoT device 400 shown in FIG. 4) starts its reception.

In one embodiment of the wireless sensor system 970 (or IoT device 400 shown in FIG. 4), the receive time 23 depends on the monitoring radius of surrounding environment of the wireless sensor system 970. The bigger the radius of monitoring the longer the reception time of wireless sensor system 970 is. Therefore, the assigned time window for a complete transmission and reception depends on the monitoring radius.

In another embodiment, when the wireless sensor system 970 (or IoT device 400 shown in FIG. 4) is used to transmit and receive broadcast or Ethernet packets the time slot duration depends on three parameters. One is maximum length of a packet allowed for both broadcast and Ethernet packet. Second is the monitoring radius, and the third is error in time of day that is used to derive absolute time. In real operation it is rare to have time of day error (jitter) more than 200 nanosecond and monitoring radius is usually less than 30 feet which is equivalent to 30 nanoseconds. The time of day (TOD) is also updated regularly which eliminates accumulation of TOD error (jitter). Therefore, time slot duration of 2 microseconds is sufficient for broadcast and Ethernet packets of an object in a smart environment when a 70 GHz to 80 GHz band is used. This allows to assign one thousand absolute times with a time slot duration of 2 microsecond within two milliseconds. Each object is assigned one or more time slot with its associated start time that is the absolute time.

Figure 14C:
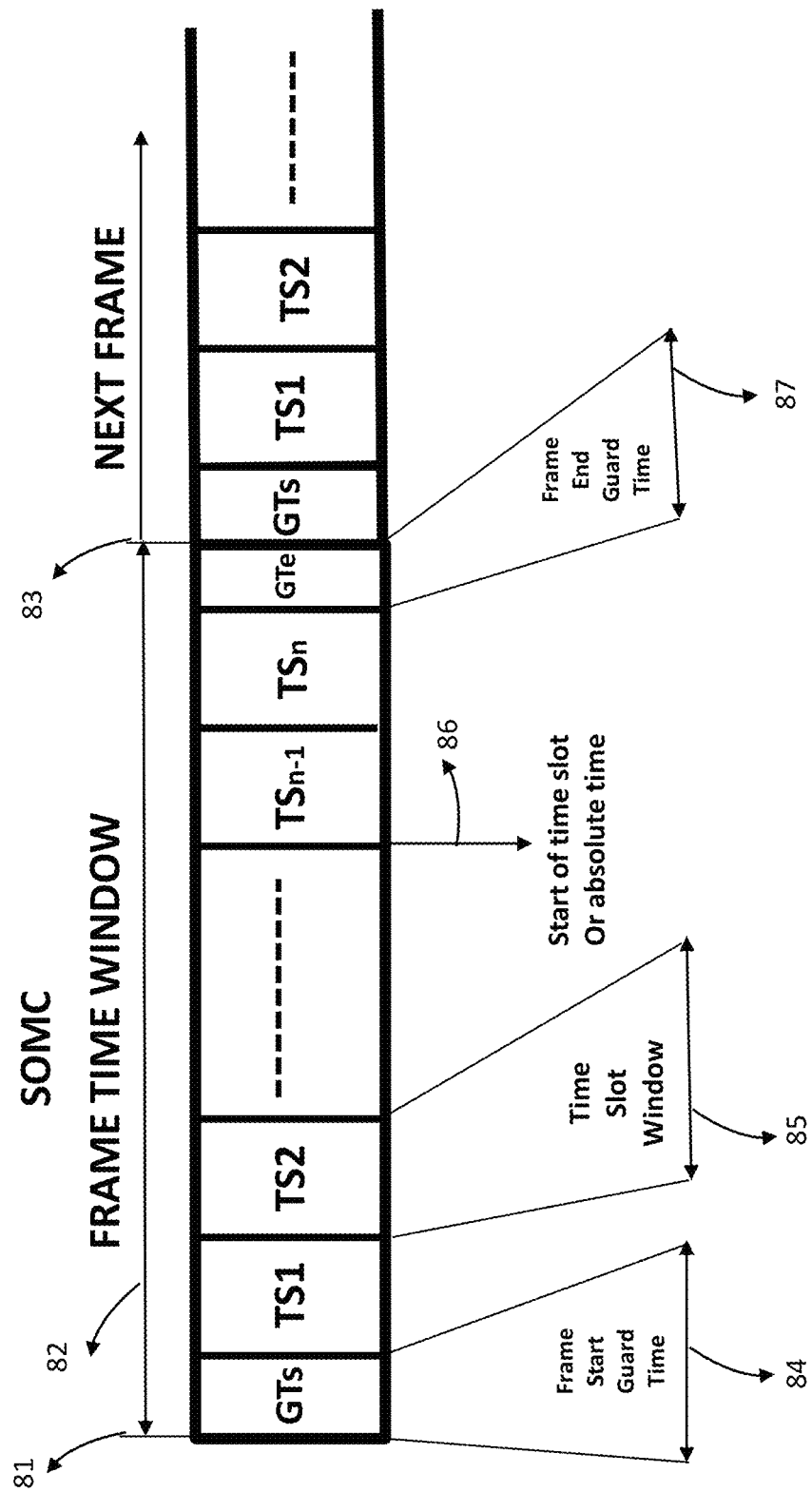
FIG. 14C depicts the object control system first frame structure.

FIG. 14C depict the object control system OCS frame structure 80 defined by SOMC. Frame structure 80 has a frame TOD 81 that indicates the start of first frame, duration 82, and end TOD 83, a start guard time 84, a time slot 85, a start of time slot or absolute time 86, and an end guard time 87. After the end of end guard time 87 the next frame starts. Frame 80 accommodates "n" time slots where "n" is an integer and is defined by OCS. All time slots in a frame can have the same duration or different durations. An IoT device is assigned a time slot (TS) with an absolute time that is the start of IoT device's first time slot (TS). The IoT device TS duration is defined by SOMC based on the object's specification. The IoT device is also aware of the frame duration and uses this duration, and its absolute time to calculate the TOD for the start of its next TS which is a calculated next absolute time by the IoT device.

Frame 80 uses the start guard time and end guard time to avoid any frame overlap due to slight error in the TOD of various components and IoT devices of OCS. It is always possible to use one guard time at the start or end of the frame. The TOD of the various IoT devices is regularly updated to eliminate any accumulation of TOD error (jitter). The guard time (start or/and end) can be used by SOMC to update operation information data (OID) for various components and IoT devices within object control system (OCS).

The frame 80 duration and structure are not the same for all smart environments. Moving and flying objects with high speed will have smaller frame duration whereas moving objects in metropolitan smart environment can use longer frame duration. Therefore, the duration and structure of frame depends on several parameters. These parameters are type of objects, frequency band that IoT devices operate, bandwidth of channel used for operation, speed of data transmitted and received, maybe size of the object, type of road or streets, type of smart environment (city, urban, suburban, towns, villages, country roads, desert, forest, coast), type of cell (terrestrial, satellite), and other parameters that are needed for a safe smart environment.

SOMC through IoT network communicates with a master IoT device used by an object (NPS). Master IoT device must conform to all requirements of the IoT network defined by standard committees. Master IoT device also communicate with NPS's controller to exchange OID (obtained from SOMC or updated by controller AI algorithm) and send detected information data (DID). Slave IoT devices communicate with NPS's controller to receive the OID and send their DID. NPS's controller is aware of features and capabilities of the slave IoT devices. NPS allows slave IoT devices to operate if the requirement defined by SOMC is fulfilled. These requirements are minimum requirement for an object's NPS to operate in different smart environments.

SOMC may assign more than one time slots to an IoT device. The assigned time slots to the IoT device can be adjacent or in different location in the frame duration. If they are adjacent, then SOMC assigns one absolute time which is the start of the first time slot in the adjacent time slots. If the time slots are not adjacent, then SOMC assigns an absolute time for each time slot. IoT device uses the absolute time and frame duration to calculate the absolute time for the next frame.

Figure 14D:
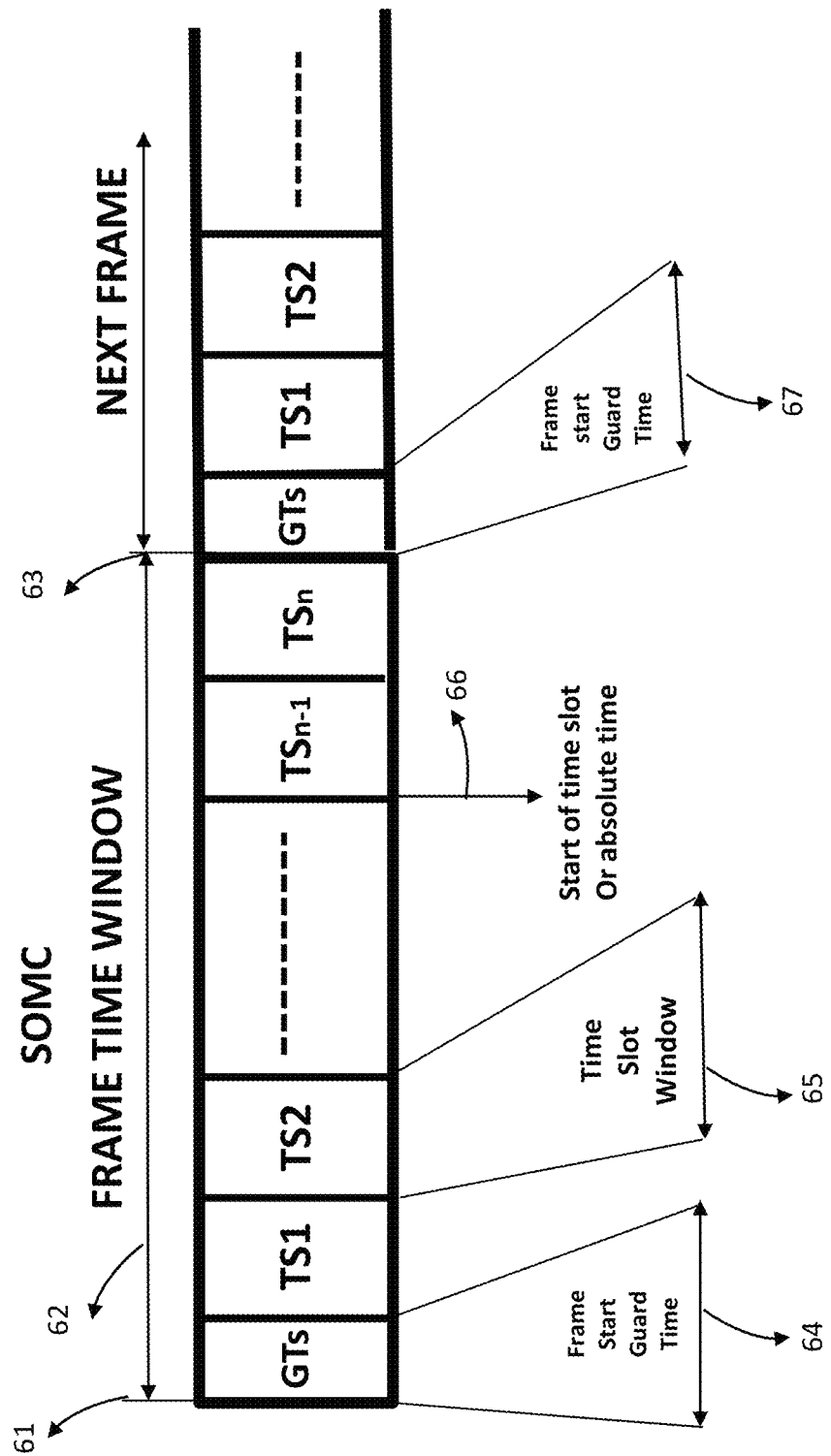
FIG. 14D depicts the object control system second frame structure.

FIG. 14D shows a frame structure without an end guard time. Since a frame is followed by a next frame then the guard time of the next frame is sufficient to avoid any overlap between the frames. FIG. 14D shows frame 60 which includes start of the first frame TOD 61, duration of the frame 62, frame end TOD 63, frame start guard time 64, time slots that are assigned to terrestrial Radio Units (RU) which also considered as terrestrial frame 65, and time slots assigned to satellite RU which also considered as satellite frame 66. Terrestrial frame uses "j" time slots where "j" is an integer, and satellite frame uses "n j" time slots where "n" is an integer.

It is also possible to assign time slot to satellite RU and terrestrial RU randomly from "n" time slots within the frame. The satellite time slots duration can be equal or different to terrestrial time slots.

In one embodiment a cluster of adjacent time slots within "n" time slots are assigned to satellite RU, another cluster (subset) of adjacent time slots are assigned to terrestrial RU, and a third cluster (subset) of adjacent time slots are assigned for communication of IoT devices with IoT network.

Figure 14E:
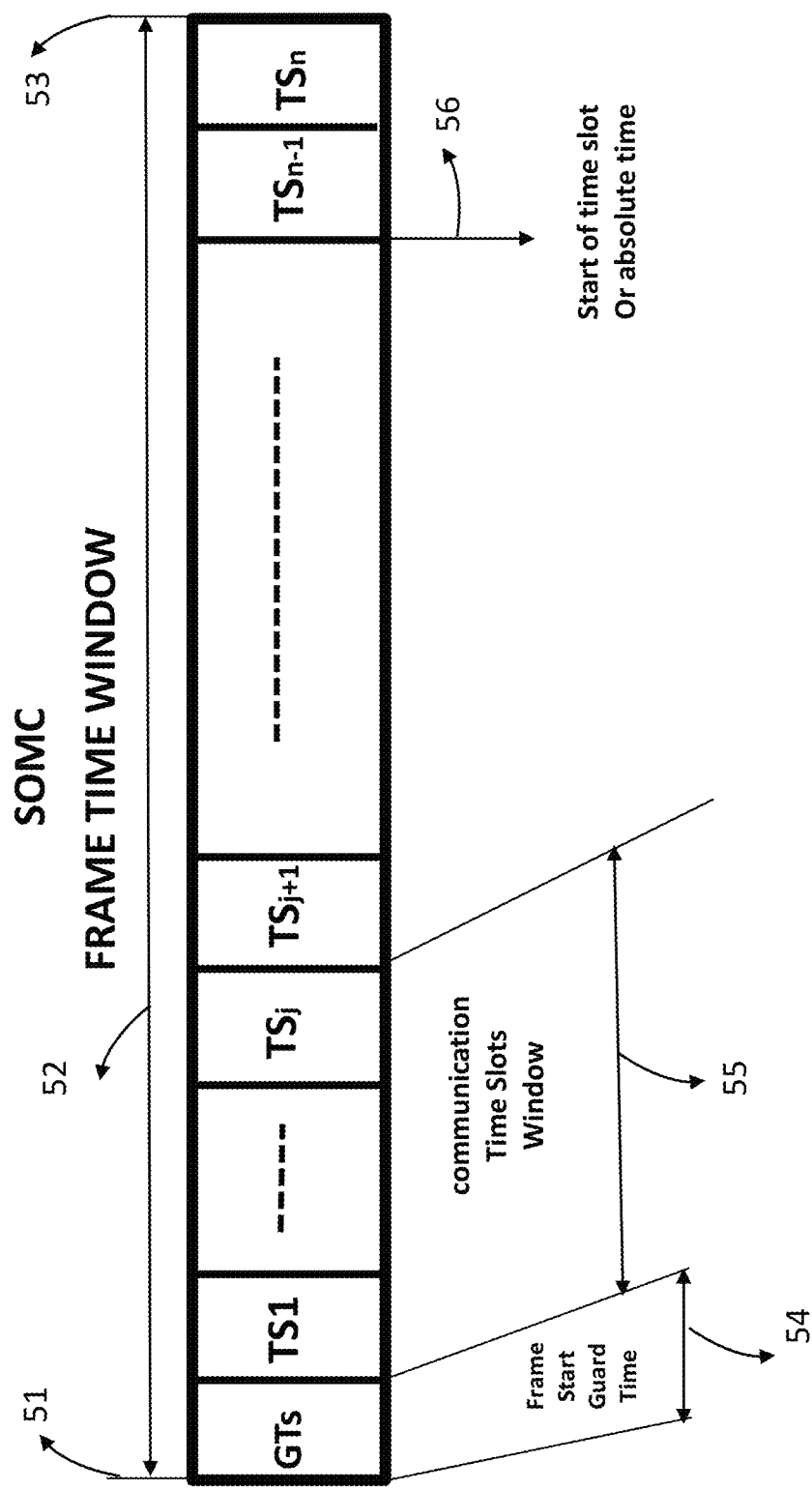
FIG. 14E depicts the object control system third frame structure.

SOMC as shown in FIG. 14E can assign a subset of time slots to all IoT devices for their communication with the IoT network, shared database SD and SOMC. The IoT devices can simultaneously communicate with IoT network using the subset of time slots assigned by SOMC. In the start of NPS operation master IoT device communicates with IoT network in a normal way to obtain OID. However, if master IoT device performs other functions, then after it receives the OID at the start it communicates with IoT network during the time windows defined in the frame structure.

SOMC can also assign a subset of time slots to IoT devices used by flying objects. Flying object's IoT devices use fixed, mobile, or low orbit satellite base station (eNodeB, gNodeB, or proprietary) to communicate with IoT network and SOMC to receive the frame information, their time slots, and absolute times. Flying object's IoT devices can also use terrestrial base stations (eNodeB, gNodeB, or proprietary) to communicate with IoT network and SOMC to receive the frame information, their time slots, and absolute times.

SOMC can also assign two independent frames, one to IoT devices attached to (registered with) terrestrial base station and another frame to IoT devices that are attached to (registered with) mobile or satellite base stations. The terrestrial and satellite frames can have independent durations and start TOD. In one scenario satellite frame with its independent frame duration starts when terrestrial frame ends. Therefore, there are two tandem frames with a total duration. In this case an IoT device uses the total duration of two frames and its own absolute time to calculate the absolute time of its next time slot. In this scenario SOMC may assigns the same channels or wavelengths to IoT ranging devices attached to (registered with) terrestrial and satellite (or mobile) base stations.

In the second scenario satellite and terrestrial frames are totally independent and have their own independent duration and start TOD. In this scenario SOMC required to assign different and independent channels and wavelength to the terrestrial and satellite cells. Therefore, there will be no interference between terrestrial and satellite channels and wavelengths. However, effective radiated power (ERP) of IoT devices must not be high to avoid any receiver blocking.

FIG. 14F depicts the duration of a time slot 31 used for ranging, communication (broadcast packets, Ethernet packets), and monitoring by the wireless system 970 (or IoT device 400 shown in FIG. 4) The time slot 31 comprises of guard time (1) 32, ranging time 33, guard time (2) 34, communication (broadcast packets, Ethernet packets) time 35, and guard time (3) 36. The start of time slot is the absolute time 30 assigned to a wireless sensor system 970 (or IoT device 400 shown in FIG. 4) or NPS of an object. Time slot 31 can be all assigned to monitoring task, communication task, transmission/reception of broadcast packet task, transmission/reception of Ethernet packets task, or ranging task. Time slot 31 can also be assigned to two tasks, three tasks, four tasks or all five above tasks.

The guard times at the beginning and end of the time slot is to avoid any overlap between two adjacent time slots and tasks. Although IoT devices obtain their time of day (TOD) from eNodeB, or gNodeB of 5G (6G, 7G), WiFi router, or private IoT network but it is possible that their TOD are different with reasonable error (jitter). The error (jitter) does not accumulate because the TOD is updated on regular basis. The start and/or end guard time should be bigger than the highest error (jitter) in TODs. The guard time between ranging time and the time of other tasks is to avoid overlap and time for processing of data.

In another embodiment, the SOMC through IoT network (4G, 5G, 6G, 7G and beyond), the WiFi network or the private network shares with each wireless sensor system 970 (or IoT device 400 shown in FIG. 4) in a smart environment the absolute time and time slot of all the registered wireless sensor system 970 (or IoT device 400 shown in FIG. 4) in the smart environment. All absolute times and time slots are stored in a shared database (SD) and are managed by a shared operation and management center (SOMC) used by all service providers and operators.

During the time slot the IoT device's wireless channel (propagation channel) should not change. The maximum time that a channel is constant and does not change is "coherence time" and the maximum channel bandwidth that the fading is flat is "coherence bandwidth".

Coherence bandwidth is proportional to average channel delay spread. If average delay spread is larger than symbol time, then the channel experiences frequency selective fading which results in inter symbol interference (ISI). To avoid selective fading or ISI the symbol time should be larger than average delay spread. Therefore, if the symbol time is Ts and the average delay spread is $\mathcal{C}$ then we need to meet the following condition.

$Ts > \mathcal{C}$ or $1/Ts < 1/\mathcal{C}$ or $Bs < Bc$

Where Bs is symbol or channel bandwidth, and Bc is the coherence bandwidth.

Coherence time is proportional or related to Doppler frequency shift or change. When IoT ranging device is moving with respect to the object in the smart environment or both IoT ranging device and the object are moving then the frequency of reflected signal from the object changes due to motion. The change in frequency is proportional to the approaching speed of the object towards the IoT ranging device. If the carrier frequency is Fc and approaching speed of object towards the IoT ranging device is V, then the Doppler shift Fd is:

$Fd = V \cdot Fc/Vl$, where Vl is velocity of light in free space. The coherence time Tc is the time that the channel is approximately constant. Tc is related to Doppler shift by following equation.

$Tc = (1/4)(1/Fd)$

The ranging pattern for wireless sensor 970 (or IoT device 400 shown in FIG. 4) shown in FIG. 14A can have two different structures. In one structure the pattern comprises of the ranging pattern only. In a second structure the ranging pattern comprises of a synchronization (preamble) pattern followed by ranging pattern. In first structure ranging pattern is used for both synchronization and ranging. Using a synchronization pattern reduces resolution of detection. If the length of pattern is reduced, then probability of false detection increases. To increase the resolution without reducing the length of the ranging pattern higher channel bandwidth needs to be used. However, higher channel bandwidth requires higher carrier frequency, smaller delay spread and lower relative speed or approaching speed to avoid violation of coherence bandwidth and coherence time. Lower delay spread limits the radius of ranging and lower approaching speed or relative speed limits the speed objects can move in a smart environment.

One way to overcome the above problem is to convert the ranging pattern into smaller segments. The IoT ranging device or wireless sensor transmit each segment of ranging pattern signal then receives the reflected segment followed by transmission of the second segment and remaining segments like first segment. Depending on application one can use zero or more segments as synchronization (preamble) segment of ranging pattern.

Let us assume the maximum speed of moving object is 100 miles/hour, then every millisecond the object moves 4.5 centimeter. If two objects in smart environment moving towards each other with 100 miles/hour, then every millisecond they get closer about 9 centimeter and every 3 milliseconds around one foot. Therefore, if the two objects are 3 meters apart and their approaching speed towards each other is 200 miles/hour then they collide after 33 milliseconds. This time is sufficient for a navigation and protection system (NPS) to obtain required information data, to decide and to activate appropriate devices and functions to avoid a collision.

Let us assume the radius for ranging and monitoring (sending broadcast and Ethernet packets and receiving broadcast and Ethernet packets) is 3 meters. In this scenario IoT device is used for ranging and monitoring by moving objects (automobile, robots, etc.) and stationary objects in smart environment. If the IoT device is connected to external body of moving object and stationary object, then for a radius of 3 meters average delay spread should not exceed 4 nanoseconds (IoT device uses direction antenna with narrow radiation pattern to avoid higher delay spreads). IoT device ignores received signals (reflected, broadcast, Ethernet) that are from objects at a distance more than three meters by measuring the RSSI of a received signal and compare it with a table of RSSI versus distance or uses TOD of transmission and reception of ranging signal.

FIG. 14G depicts the duration of a time slot 41 used for ranging, communication (broadcast packets, Ethernet packets), and monitoring by the wireless sensor system 970 (or IoT device 400 shown in FIG. 4). The only difference between FIGS. 14F and 14G is that ranging is performed before end of time slot 41 and everything else is the same.

In another embodiment, wireless sensor system 970 (or IoT device 400 shown in FIG. 4) is aware of the absolute times and time slot durations (if time slot durations are different) assigned to all other wireless sensor systems 970 in its smart environment or operation frame.

In another embodiment, all wireless sensor systems 970 (or IoT device 400 shown in FIG. 4) in a smart environment are registered with one or more IoT networks (4G, 5G, 6G, 7G and beyond), WiFi networks or private networks that are linked and share (SOMC, and SD), control and manage the information (function, type, location, etc.) received from all wireless sensor systems 970.

For a navigation and protection system (NPS) to operate in all circumstances an artificial intelligent (AI) algorithm is used that receives information data from following source:
  a) All internal sensors used by an object.
  b) Wireless sensors, Radars, Image sensors, Lidars, laser, and ultrasonic sensors that perform ranging to provide a distance between two objects.
  c) Image sensors that provide the same information as wireless sensor as well as image identification of the objects.
  d) IoT devices that in conjunction with IoT network provide a distance and an approaching speed of the two objects towards each other using time of day (TOD) time stamps.

AI algorithm requires information data from at least three of the above sources to be able to decide intelligently. Having access to more than three sources results in a more accurate decision and better support for navigation and activating the most effective devices within protection system.

Figure 14H:
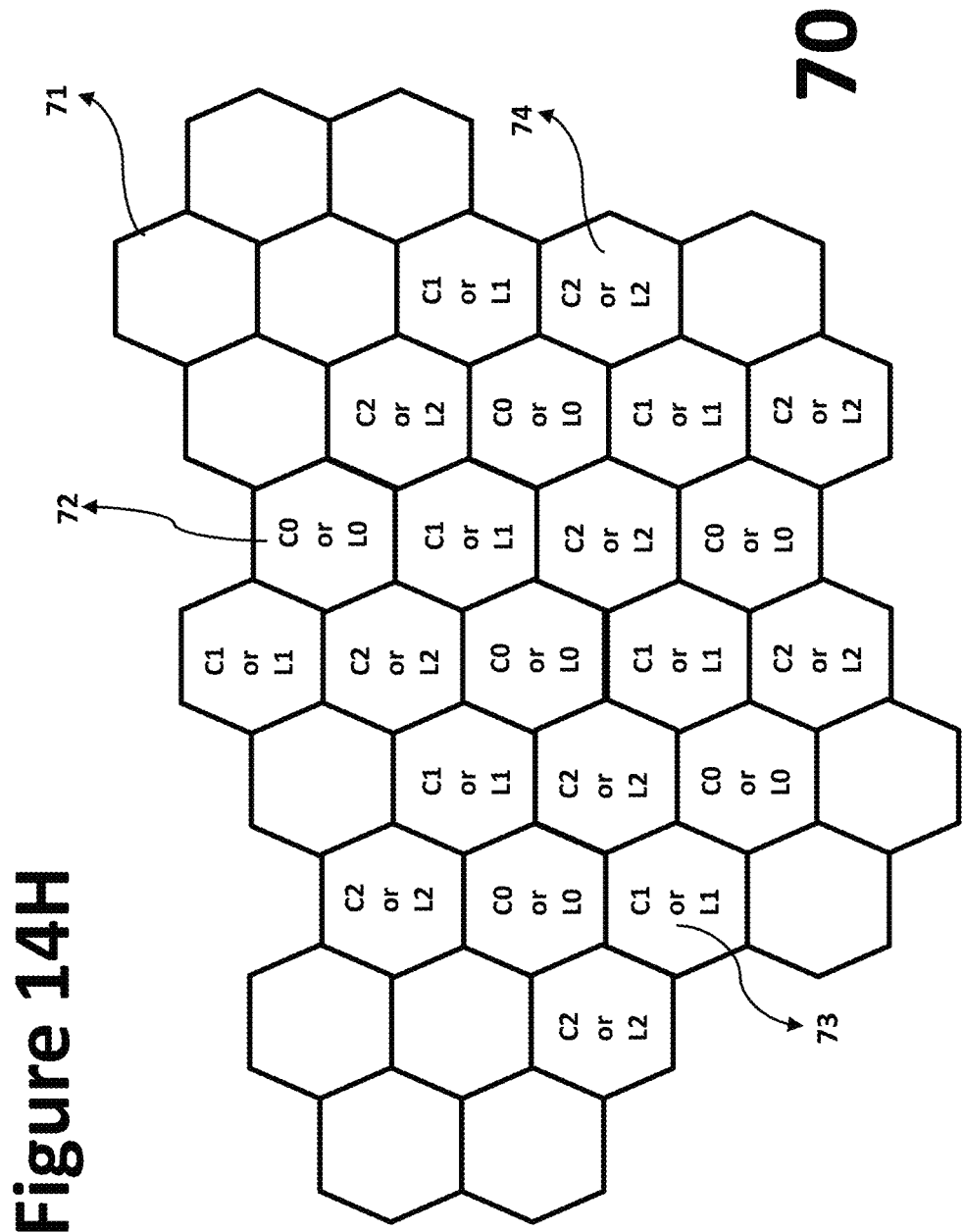
FIG. 14H shows a cell planning for an object control system OCS used by an IoT network.

FIG. 14H shows cell planning 70 for object control system OCS used by the IoT network. Cell planning 70 shows hexagonal cells 71 but other cell shapes can also be used. Cell planning 70 shows three channels/wavelengths. These three channels/wavelengths C0/L0 (72), C1/L1 (73), and C2/L2 (74) are reused to cover the entire IoT network coverage. The cells can also be numbered for better identification. It is also possible to use a single channel or wavelength (C0/L0, or one of the other C1/L1, or C2/L2). The channel (C0, C1, and C2) bandwidth depends on the frequency band in the frequency spectrum. These channels are used for ranging, broadcasting, communication using Ethernet packets, monitoring, data collecting, data sharing and other functions. Channel bandwidth and center frequency must meet the requirements of the coherence bandwidth and coherence time. It is always possible to have other channel planning and cell planning. In case of LIDAR, Laser, or infrared L0, L1, and L2 that are the wavelength of the wave is used. It is also possible to have a cell planning that all cells use the same frequency, bandwidth, wavelength and when a moving object moves from one cell to another cell it does not need to change its frequency, bandwidth, and wavelength. However, it may need to change its time slot and absolute time. The change of time slot and absolute time can come from SOMC. When IoT network is not available moving objects need to find a time slot within the operation frame that is vacant and use that time slot for operation and continue operation this way (find a vacant time slot and use for operation) until IoT network become available. Moving object from information that it receives from a boundary stationary object recognizes that it is entering a new cell.

The terrain map of the cells, cell's number, critical peripheral coordinates, location coordinates of important objects (buildings with height, stationary objects like traffic lights, junctions, roundabout, different turns, tunnels, bridges, mountains, valleys, river, sea, lake, exits, construction work, closed road, one way or two ways roads, direction of traffic, type of roads, streets, lanes, etc.), and information about any critical object (such as stationary objects that share detail of operation frame, number of time slot, time slot structure, number of cell, frequency and channel bandwidth, wavelength) in a cell is stored in the SD to be used by SOMC of OCS. A critical object can also be a stationary object located at the boundary of cells to share the new cell information data explained above.

A moving object at regular times updates its location coordinates in SD. Location coordinates is obtained by a simple low-cost GPS receiver and a master IoT device used by the object sends it to SD regularly. GPS receiver can update the location coordinates from as low as every 50 milliseconds to one second depending on complexity of GPS receiver. A moving object through its master IoT device updates its location coordinates in SD. The position coordinates can also be estimated by a triangulation algorithm that uses stationary objects in vicinity of moving object. Stationary objects in the vicinity of moving objects have fix position coordinates. This is done when moving object's GPS can not see the GPS satellites.

The cells are assigned an operation frame structure shown in FIG. 14C. The structure and duration of the operation frame can be the same for all cells. The best approach is to have operation frames with the same duration for all cells. This way only the structure of the frame is tailored to the cells. And in the structure of operation frame the only thing that may be different is duration of time slots assigned to various moving objects. If all moving objects follow a requirement for their specification defined by the standard, then all time slots will have the same duration and structure. Therefore, SOMC can use identical operation frames for all cells in OCS.

When a cell is congested and the operation frame does not have sufficient time slots to assign to various objects in the cell, there are four options to overcome this problem. First option is to reduce the duration of a time slot. This requires increasing the bandwidth of the channels that further requires increasing the carrier frequency of the IoT ranging transceiver. As a result, doppler frequency increases or coherence time decreases, coherence bandwidth increases which requires lower delay spread to avoid inter-symbol interference, and operating range of IoT ranging device decreases. Second option is to reuse the time slots that are used for stationary objects when they are sufficiently apart and do not introduce interference. Second option has limited application and solves the problem for certain cells. Third option is to increase frame duration (for all cells) to accommodate all objects within a cell. This option also has a limited application and is not suitable for cells that have moving objects with high speed because it can affect the accuracy of the ranging data obtained by various ranging techniques and cause cell structure of the terrain map more complicated. The final and fourth option is to divide a regular and main cell to smaller cells within the main cell and assign the same operation frame to smaller cells withing the main cell. This scenario happens in cities with objects moving with lower speed and freeways with heavy and slow traffic. The smaller cells will have shapes (circle, triangle, square, hexagon, etc.) that fit inside the main cell. It is also possible to use a combination of the above options without making the OCS complicated.

The start time of the operation frame shown in FIG. 14C is set by a specific TOD for all cells and cell's channels/wavelengths (C0/L0, C1/L1, and C2/L2). Since the duration of operation frame does not change then SOMC assigns absolute TOD for every time slot that is used by moving objects. The absolute time is assigned based on the start TOD of the operation frame and the number of frames already passed after the start TOD. Once a moving object knows its absolute time, from duration of the operation frame it can calculate its next time slots, and this continues even when a moving object moves from one cell to a neighboring cell with a new channel/wavelength (for example moving from C0/L0 to C2/L2). The timing of everything stays the same (when a moving object in its new cell changes its operating channel/wavelength) and the object still uses the same absolute time and time slot that was given to it by SOMC at the start of its operation.

It is possible when an object moves from one cell to another cell SOMC assigns a different time slot and absolute time to the object. If this is the case, SOMC before the object enters the new cell informs the object the new time slot and absolute time (TOD) which indicates the start TOD of the time slot.

Three issues need to be discussed here. First is time of day TOD and how it is obtained. TOD is based on coordinated universal time UTC that is provided by satellite to GPS receivers (American GPS, Galileo, GLONASS, and BeiDou). This time is used by various objects for different applications. In data communication system some components of the system use GPS and directly obtain the TOD. It is also possible to centralize the GPS receiver and through a master port propagate the time of day through data communication network using IEEE1588 protocol. So, what happens if something goes wrong with the satellites or GPS receiver? GPS receiver that produces TOD uses an oven control crystal oscillator or rubidium clock (Atomic clock). These two clocks are very stable and can easily have hold over time up to 24 hours or even more.

The moving (stationary) object also can use a very stable clock (OCXO, or atomic clock) and obtain the time of day from GPS receiver. The cost of these clocks has come down and if the volume goes up the cost will be negligible compare with the price of moving (stationary) object. These types of clocks can maintain the TOD accuracy within acceptable thresholds for NPS of moving (stationary) object. In addition to lower cost the accuracy and performance of these clock is improving.

Second is the transition of a moving object from one cell to a neighboring cell. Question is how a moving object detects if it has transitioned to the neighboring cell? SOMC has knowledge of the location coordinates of each moving object that is updated every second or less. Moving object using its low-cost GPS receiver obtains the location coordinates and sends it to SD through its master IoT device. In case of losing GPS satellites or problem with GPS receiver a moving object can estimate its location coordination using the location coordinates of stationary objects in its vicinity using triangulation because stationary objects position coordinates are fix and does not change. Therefore, SOMC will inform the moving object through the operation information data OID that it has transitioned to a new cell (SD has the coordinates of peripheral of each cell, and cell number) and the channel/wavelength it needs to use during its time slot.

The third issue is the location coordinates of a moving object when GPS receiver loses the satellites or cannot see 4 satellites (problem with satellites, satellites not in operation, or satellite is jammed/spoofed) to be able to calculate the location coordinates. In addition to American GPS system there are three other systems from Europe, Russia, and China (Galileo, GLONASS, BeiDou) that can be used to obtain location coordinates. There are GPS receivers that can work for all systems. Therefore, the probability that all systems have problem is exceedingly small.

Location coordinates help during transition to a new cell by a moving object. If this information is not available one solution is for moving object NPS to ask its slave IoT devices to detect all three channels/wavelengths (C0, C1, C2, L0, L1, and L2) until the problem goes away. A second solution is to switch to manual operation until the problem is resolved.

Stationary objects in a cell have fixed position coordinates and always hold and share operation frame (duration, start time, number of time slots, time slot duration, operation frame's number which is resets at specific TOD, etc.) information data in their broadcast (Ethernet) packet. Moving objects in a cell if they lose communication with IoT network for any reason can acquire operation frame information data from a stationary object broadcast (Ethernet) packet. As explained earlier moving objects can also estimate their location coordinates by triangulation using the position coordinates of the stationary objects in their vicinity. In other words when GPS and IoT network signals are jammed, spoofed, very weak, not relayed by reflectors or repeaters, or temporary not available a moving object has access to operation frame information data, and can estimates its location coordinates from stationary objects in its vicinity and its NPS can continue its operation. Moving object can also from stationary objects that are at the boundary of cells identify that it is moving to a new cell and get the information data its NPS needs from boundary stationary object.

In case of flying object, the same operation frame shown in FIG. 14C can be used and some time slots can be assigned to flying objects. This way interference in OCS is eliminated. The flying objects before reaching the desirable and assigned elevation (altitude) by SOMC may use the same channels and wavelengths SOMC assigned to terrestrial moving objects and when they reach to assigned elevation (altitude) use the same channels and wavelengths but in a larger cell structure shown in FIG. 6.

Flying objects may also have their own operation frame and channels/wavelength assigned to them by SOMC. In this scenario during takeoff and landing they may need to switch to terrestrial operation frame and channels/wavelengths.

Finally, when moving objects like an automobile is parked on the street it is considered as a stationary object and it can either turn its NPS off or leave it on. If the NPS is left on, then the slave IoT devices that are facing the street function and the automobile still uses the terrestrial operation frame and time slot assigned to it. Solar power may be used when the automobile is parked on the street to preserve the battery.

Threats to both services and data are growing in volume and complexity, making it harder to keep up with the constantly shifting security picture. Similar attacks are becoming more prevalent on other kinds of information-based smart networks as well, such as those that operate buildings, utility systems and intelligent traffic systems. Whether the objective is to steal intellectual property, halt operations or tamper with data, the tools and the techniques used for unauthorized network access are increasingly sophisticated.

There is increasing concern regarding cybersecurity across industries where companies are steadily integrating field devices into network wide information systems. This occurs in discrete manufacturing and process industrial environments, a wide range of general and specific purpose commercial buildings, utility networks, and even intelligent traffic systems or networks. Traditionally, electrical systems were controlled through serial devices connected to computers via dedicated transceivers with proprietary protocols. In contrast, today's control systems are increasingly connected to larger enterprise networks, which can expose these systems to similar vulnerabilities that are typically found in computer systems.

Since inception of self-driving cars there has been various types of attacks on different units of self-driving cars, such as the internal measurements unit, LIDAR, RADAR, GPS, Camera, Thrust monitoring unit, Application unit, etc. In such attacks, a vehicle does not prepare a secure sequence of moves to maneuver in a tight place. For vehicles that are not fully autonomous some typical attacks include Sybil attack, denial of service attack, timing attack, message tampering, illusion attack, and node impersonation. These attacks are also applied to fully autonomous vehicles but are not subject of disclosure in this application. This application discloses attacks associated with wireless communication and means of detecting and mitigating them for moving, flying and stationary objects. These attacks can be flooding attacks, data playback attacks, data alteration attacks, blackhole attacks, spam attacks, and cryptographic replication attacks. This application focuses on attacks that alter the information data (TOD, OID, and DID) used for navigation.

The NPS of vehicle/object (IoT device) 900 as a component of object control system OSC that communicates with IoT network, SD, and SOMC is prone to cyber-attack. Cyber-attack can tamper with the information data (TOD, OID, and DID) NPS uses for navigation and protection. This can result in various accidents and loss of life. Cyber-attack can also be used to assassinate passengers of a moving vehicle or guide a robot to do criminal acts. There are several ways that cyber-attack on a NPS can happen. There are two very critical and easy ways of cyber-attack. One is through master IoT device that communicates with IoT network (WiFi, 5G, 6G, beyond 5G and 6G) and a second way is through slave IoT device of NPS that collect DID. It is also possible to attack through Bluetooth and other wireless capabilities that moving object 900 possesses. IoT devices used by NPS (master and slave) broadcast their information which include operation frame information explained in FIGS. 14C, 14D, and 14E, a time stamp that indicate TOD at their antenna port, location coordinate, identity number, type of object, and other information data. They also send these information data in any Ethernet packet that they send to another IoT device. Master IoT device of a NPS receives OID which includes TOD from IoT network. Master IoT device can also obtain TOD from GPS. NPS has access to all these ports and their data (TOD, OID, DID, locations, etc.) and uses its AI algorithm to create a signature and reject any information data which does not match the signature.

To attack an object's NPS the attacker has three options. One is jamming both master IoT device and slave IoT devices. This action results in jamming all objects with an NPS in vicinity of attacker which results in chao. Therefore, this approach can not be used if a particular object with NPS is targeted. Second is Jamming GPS that results in all objects with NPS lose access to their location coordinates and some to update their TOD. However, the location coordinates of stationary objects are fixed and does not change. An object's NPS through master IoT device or slave IoT device obtains the location coordinates of stationary objects in its vicinity and by exchanging time stamps estimates its distance from a stationary object then from these two data estimates a reasonably accurate location coordinate. To avoid losing TOD during jamming, object's NPS can use a clock with long holdover during which TOD is hold within acceptable drift. If an object's NPS does not have a clock with long holdover it can obtain as well as update its TOD by requesting from a nearby NPS that have a clock with holdover.

The third type of attack is a targeted and specific attack at an object's NPS. This application discloses various ways that a specific attack can be carried out and ways to mitigate the attack. This specific attack is based on altering the data that a NPS needs to operate correctly. The data are detected information data (DID), time of day (TOD) and operation information data (OID). The important data in OID are absolute time, time slot duration, operation frame duration, and operation frame start time. Operation frame structure and time slot structure are usually part of a standard known by NPS or obtained through IoT network (from SOMC and SD). Slave IoT devices used by the NPS provide their DID which includes operation frame duration (received from IoT devices in surrounding environment), operation frame start time, mac address of slave IoT devices belonging to objects in vicinity of NPS, distance from slave IoT devices belonging to objects in vicinity of NPS (using time stamps), distance from objects in vicinity of NPS (using ranging radar, Lidar, image sensor, or ultrasonic sensor), RSSI of broadcast or Ethernet packets received from stave IoT devices belonging to other objects, location coordinates of objects in vicinity of NPS received from their broadcast or Ethernet packets, the TOD calculated from exchange of time stamps with slave IoT devices belonging to objects in vicinity of NPS. Master IoT device communicates with IoT network, obtains TOD and OID which includes operation frame duration, the start time of operation frame, an absolute time, and a time slot for NPS.

The above TOD, DID, and OID can be altered by cyber-attack. If TOD that IoT network provides for the NPS is altered due to an attack, then all the NPSs that get their TOD from that IoT network will be affected. If TOD that GPS provides for NPS is altered due to an attack, then all NPSs in vicinity of attacker will be affected. However, a sudden change which requires higher than normal update to TOD can be easily detected. The amount of TOD increment and higher than normal number of consecutive increments in a specific period can be sign of an attack by imitating IoT network. The same applies to master IoT devices of NPSs that obtain their TOD from GPS. TOD can also be obtained by NPS's slave IoT devices by exchanging time stamps as described earlier. Since there are several slave IoT devices in vicinity of NPS it means that multiple sources of obtaining TOD need to be attacked to alter TOD. Therefore, altering TOD for an attacker is not a good option due to multiple sources and ease of detecting.

An attacker can intercept communication between an NPS's master IoT device and IoT network to obtain operation information data, time slot (TS) information, absolute time for the TS and other information related to operation of NPS. The operation information data that an NPS receives from IoT network are operating carrier frequency for ranging, operating channel, bandwidth, data rate, over the air protocol, in case of Lidar operating wavelength, and effective radiation power.

To attack through a slave IoT device an attacker needs to acquire TOD, operation frame duration, operation frame start TOD. By knowing these three parameters an attacker may be able to interrupt operation of an NPS. TOD can be obtained from GPS. Operation frame information can be obtained from a stationary NPS or a moving NPS as explained earlier by using the time stamp of two consecutive broadcast packet of an NPS's slave IoT device, master IoT device or by detecting the information data shared in broadcast or ethernet packets. The time slot duration can be calculated from time stamps of two adjacent packets. An attacker can also obtain the operation frame structure and timings from an IoT network.

Figure 15:
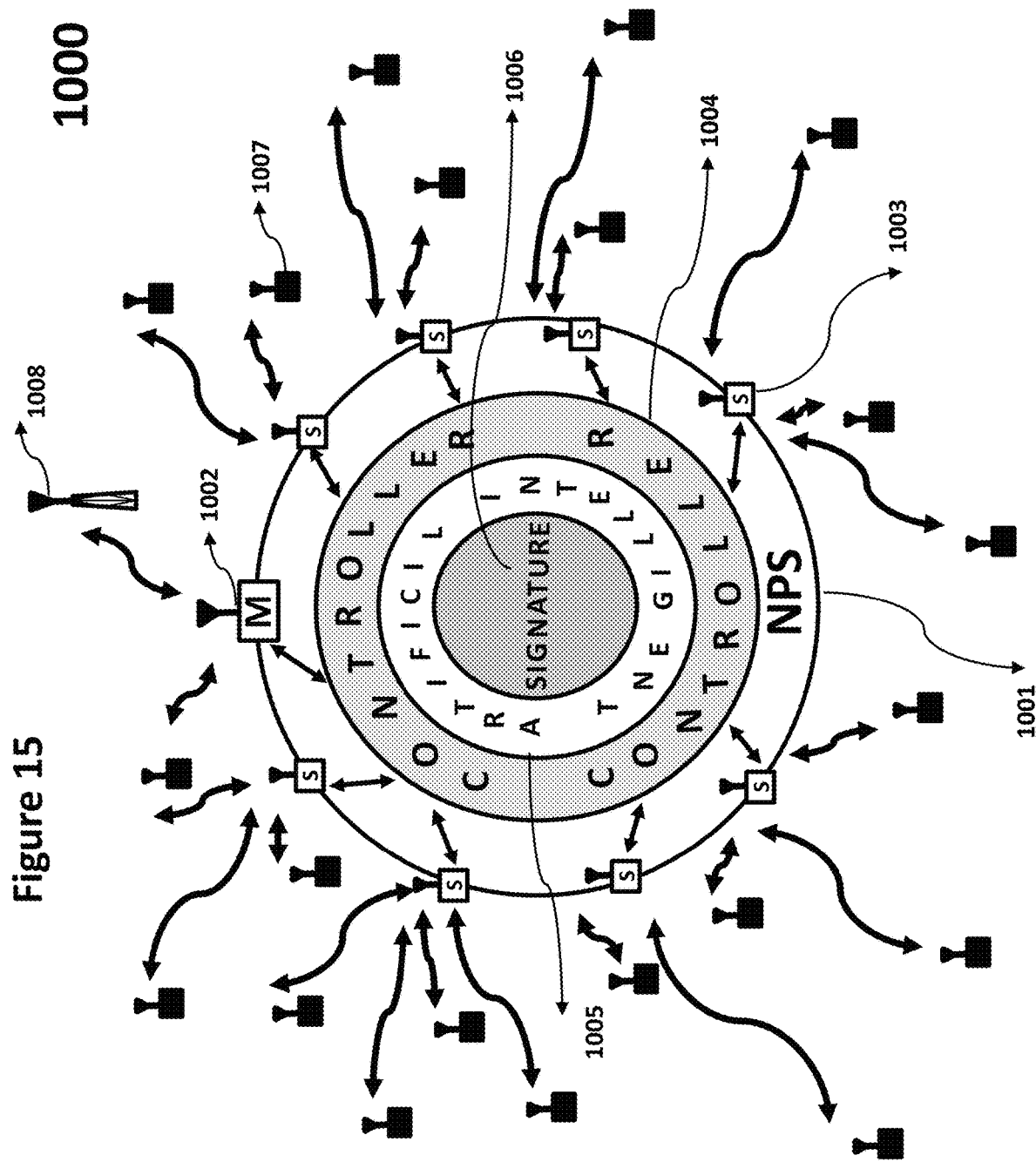
FIG. 15 illustrate sources that create a signature to mitigate cyber-attack.

FIG. 15 shows cyber-attack mitigation 1000 using a signature. An attacker tries to alter the operation information data (TOD, OID, and DID) to interrupt or force an NPS make a wrong decision which results in an accident with possible loss of life. As shown in FIG. 15, NPS 1001 obtains its operation information data by master IoT device 1002 through IoT network 1008 (from SOMC and SD) which uses a terrestrial radio unit (RU), a mobile RU (which is a flying balloon RU or a low earth orbit satellite RU) as well as slave IoT device 1003 (through other object's slave IoT device 1007). The information data (TOD, OID, and DID) is received by NPS's controller 1004 and for decision making the appropriate data is sent to artificial intelligent (AI) algorithm. Controller creates a signature from the information data it receives from master IoT device and slave IoT devices. All these devices (1002, and 1003) can provide TOD, operation frame duration, operation frame start time, absolute times for the time slots slave IoT devices receive from a broadcast or ethernet packet, absolute time master IoT device receives for NPS, RSSI of received broadcast (or Ethernet packets), distance from an external object using ranging (LIDAR, RADAR, Ultrasonic), mac address of external slave IoT device 1007, distance from slave IoT device 1007 through exchange of time stamps, time stamp received by slave IoT device 1003 or master IoT device 1002 from a broadcast or Ethernet packet of an external slave or master IoT device 1007, type of object uses slave or master IoT device 1007, weather conditions from slave or master IoT device 1007, traffic light status from slave or master IoT device 1007, and identity code of the NPS (object) an external slave or master IoT device 1007 uses.

The signature is in form of a database table that its first column is the identity (source of data) for those objects in the environment that have NPS (moving, flying, stationery and fix), GPS and IoT network. Column one also identifies four (rear, front, left, and right of the moving object with NPS) rows for each ranging device Radar, Lidar, Ultrasonic, and Image sensor. So, column one is identity code for the source of data. Column 2 shows type (model) of the object that data is obtained from, column 3 is the MAC address of the objects with NPS (source of received data) in surrounding environment, column 4 belongs to distance of the object in the surrounding environment from NPS (where signature resides), column 5 shows the TOD obtained from an object with NPS (in surrounding environment) using time stamp (by the object with NPS where signature resides), and column 5 also shows TOD obtained from IoT network or/and GPS by the object with NPS where signature resides. Column 6 shows the operation frame duration obtained from IoT network, and objects with an NPS in surrounding environment (by the object with NPS where signature resides). Column 7 stores the operation frame start time obtained from IoT network and other objects with NPS (by the object with NPS where signature resides). Column 8 is the absolute time received from IoT network and from NPS of other objects in surrounding environment (by the object with NPS where signature resides). Column 9 is the received RSSI of a slave IoT device belonging to an object's NPS in surrounding environment (of the object with NPS where signature resides). Column 10 is the ERP of the objects with NPS in surrounding environment (of the object with NPS where signature resides). Column 11 shows the time stamp received from NPS of objects in surrounding environment (of the object with NPS where signature resides). Column 12 is the weather condition received from other objects with NPS (by the object with NPS where signature resides). Column 13 is traffic light status received from traffic light objects with NPS (by the object with NPS where signature resides). Column 14 is miscellaneous data received from various objects (by the object with NPS where signature resides). Columns of the signature database table with variable data (distance, RSSI, time stamp, weather condition, traffic light status, and miscellaneous data) have a defined tolerance. In case of the columns of the signature database table with fixed data (operation frame duration, start of operation frame, ERP, TOD, absolute time, and weather condition), if the data from one source changes, it is expected that data from other sources change to the same value. An example is operation frame duration. If an IoT network changes operation frame duration, then all objects attached to the IoT network change their operation frame duration to the new value at the same time. The NPS receives the fixed data from different sources, and it is not easy for an attacker to alter these data. If this happens and an attacker alters these data through one of the sources, by using the signature database table it will be detected and ignored and the attacker will be identified and may be reported.

Based on the above if an attacker imitates the IoT network it can only alter the fixed operation data that an object's NPS obtains from IoT network. Since the object's NPS also obtains the TOD, structure of operation frame (duration, and start time), and absolute times from other sources (object's NPS) in its vicinity and all these data are in its signature database table it will easily detect by the its controller's artificial intelligence (AI) whether the operation information data from IoT network is from an attacker.

If an attacker tries targeted attack to alter data through slave IoT or master IoT device of an object's NPS then it requires to synchronize its operation with the object's NPS. To do this attacker first needs to obtain TOD from GPS or IoT network. Next attacker needs to obtain operation frame information. There are two ways of obtaining operation frame information and they are:

register with IoT network as a moving object with an NPS to obtain operation frame information, a time slot, and an absolute time. At this point attacker can transmit and receive broadcast and Ethernet packets. To attack a specific object's NPS the attacker needs to find the address of broadcast or Ethernet packet of the object's NPS. Attacker first needs to identify the time slot of the object's NPS that wants to attack. This is not a simple task unless attacker gets close to the object's NPS that is subject of attack. Let's assume that attacker finds the time slot of the object's NPS. Attacker can not alter any of the fixed data that object's NPS uses for operation because object's NPS has multiple sources for the fixed data in the signature database table. If object's NPS does not use other devices for ranging (Radar, Lidar, ultrasonic sensor, or image sensor) to provide distance of other objects in the surrounding environment, then the attacker may be able to force the object's NPS make a wrong decision by activating the wrong protection device or navigation device which may results in accident and loss of life. This is not easy because the attacker must get several parameters right. These parameters as explained in FIG. 10C and elsewhere are operating frequency band, operating channel, operating modulation, operating delay spread, Doppler shift, ERP, RSSI, t1, and t4. The probability that attacker has all the parameters right is extremely low and if the attacker gets everything right the worst decision that the AI of an object's NPS makes is to activate the protection devices. If attacker imitates a traffic light and try to broadcast fake traffic light information the fake data will be detected because object's NPS has the surrounding area map information. If there is a traffic light, object's NPS receives the traffic light status from broadcast packets from various sources in its surrounding environment and from traffic light IoT device 1007.

obtain TOD from GPS or IoT network, then monitor broadcast packets and Ethernet packets from objects in surrounding environment that have NPS. Next attacker can retrieve time stamp from two consecutive broadcast packet belonging to the same source to obtain operation frame information. Attacker also can retrieve time stamp for two consecutive packets that belong to two different sources to calculate a time slot duration. Once attacker obtains all these data, next needs to find the time slot that belongs to the object's NPS targeted for attack. An attacker can also obtain most of above operation information data by detecting a broadcast packet or Ethernet packet from an object in vicinity of attacker provided the data is not encrypted and if the data is encrypted it can decrypt the data.

If attacker obtains all these data, like the scenario that was explained above faces a very difficult task to make the object's NPS that is being attacked to make a wrong decision.

Various embodiments are thus described. While embodiments have been described, it should be appreciated that the embodiments should not be construed as limited by such description, but rather construed according to the following claims.

The invention claimed is:

1. An object control system (OCS) configured to control an object that is at least one of a moving object, a flying object, and a stationary object in a smart environment, the system comprising:
   a plurality of cells with an area in a square meter or feet to cover the smart environment;
   a cell within said plurality of cells has at least one of a square shape, a circle shape, a hexagon shape, and an arbitrary shape;
   an operation frame for said cell that has a duration time and a start time of a first frame;
   an Internet of Things (IoT) device used by said object during operation within said cell or transition to a neighbor cell to communicate with at least one of an IoT network, and a broadcast packet of said stationary object located at a boundary of said neighbor cell to:
   obtain an operation information data that includes a time of day (TOD), said duration time, a time slot, a time slot duration, and an absolute time that is a start TOD of said time slot, a frequency, a bandwidth, and a wavelength; and
   after receiving the operation information data, it use the operation information data to perform at least one of a ranging of said neighbor cell in the smart environment, and a transmission or reception of a broadcast packet;
   said object that is being controlled by said OCS, uses said time slot within the operation frame in said cell to activate a plurality of devices that help navigation in said cell.

2. The OCS of claim 1, wherein said plurality of cells have at least one of an equal area and a different area.

3. The OCS of claim 2, further said cell is divided in smaller cells in a location that is at least one of a big city with congested traffic, said cell with a low-speed limit, a heavy traffic road, and a heavy traffic freeway.

4. The OCS of claim 1, wherein the operation frame is the same for each said cell within said plurality of cells.

5. The OCS of claim 1, wherein said object in said cell within said plurality of cells uses said frequency, said bandwidth, and said wavelength to monitor said smart environment.

6. The OCS of claim 5, further said frequency, said bandwidth, and said wavelength is the same or different for said cell and said neighbor cell.

7. The OCS of claim 1, wherein said cell within said plurality of cells is a satellite cell or a terrestrial cell and the IoT network uses a low earth orbit satellite Radio Unit (RU) or a terrestrial RU to communicate with the object.

8. The OCS of claim 7, further said stationary object in said terrestrial cell that is located at said boundary of said neighbor cell uses its IoT device to broadcast in its broadcast packet at least one of said operation information data, said frequency, said bandwidth, and said wavelength used in said neighbor cell.

9. The OCS of claim 1, wherein when the IoT network is not available said object in said neighbor cell search for a vacant time slot to operate until said IoT network is available again and provides the operation information data for said object.

10. The OCS of claim 1, wherein a device within said plurality of devices is at least one of a RADAR, a LIDAR, an ultrasonic sensor, an image sensor or camera, an IoT ranging device, and an internal or an external sensor.

* * * * *